(12) United States Patent
Desberg et al.

(10) Patent No.: US 11,697,469 B2
(45) Date of Patent: Jul. 11, 2023

(54) PERSONAL MOBILITY VEHICLES WITH DETACHABLE DRIVE ASSEMBLY

(71) Applicant: RAZOR USA LLC, Cerritos, CA (US)

(72) Inventors: Ian Desberg, Cerritos, CA (US); Marco Alferez, Cerritos, CA (US)

(73) Assignee: Razor USA LLC, Cerritos, CA (US)

( * ) Notice: Subject to any disclaimer, the term of this patent is extended or adjusted under 35 U.S.C. 154(b) by 262 days.

(21) Appl. No.: 16/426,965

(22) Filed: May 30, 2019

(65) Prior Publication Data

US 2019/0367116 A1 Dec. 5, 2019

Related U.S. Application Data

(60) Provisional application No. 62/679,328, filed on Jun. 1, 2018.

(51) Int. Cl.
| | |
|---|---|
| *B62K 3/00* | (2006.01) |
| *B62M 11/00* | (2006.01) |
| *B62L 1/00* | (2006.01) |
| *B62J 43/10* | (2020.01) |
| *B62J 43/23* | (2020.01) |
| *B62J 45/41* | (2020.01) |
| *B62K 11/10* | (2006.01) |

(52) U.S. Cl.
CPC .............. *B62K 3/002* (2013.01); *B62J 43/10* (2020.02); *B62J 43/23* (2020.02); *B62J 45/41* (2020.02); *B62L 1/00* (2013.01); *B62M 11/00* (2013.01); *B62K 11/10* (2013.01); *B62K 2202/00* (2013.01); *B62K 2204/00* (2013.01)

(58) Field of Classification Search
CPC .... B62K 3/002; B62K 11/10; B62K 2202/00; B62K 2204/00; B62M 11/00; B62M 11/02; B62J 99/00; B62J 45/40; B62L 1/00; A63C 2203/12; A63C 17/014; A63C 17/12
See application file for complete search history.

(56) References Cited

U.S. PATENT DOCUMENTS

| | | |
|---|---|---|
| 213,546 A | 3/1879 | Cornelius |
| 215,081 A | 5/1879 | Turnbull |
| 252,970 A | 1/1882 | Price et al. |
| 253,735 A | 2/1882 | Marshall |
| 304,949 A | 9/1884 | Mitchell |

(Continued)

FOREIGN PATENT DOCUMENTS

| | | |
|---|---|---|
| AU | 2005100475 | 6/2005 |
| CH | 598051 | 4/1978 |

(Continued)

OTHER PUBLICATIONS

U.S. Appl. No. 29/591,292, filed Jan. 18, 2017, Huang et al.

(Continued)

*Primary Examiner* — Kevin Hurley
*Assistant Examiner* — Marlon A Arce
(74) *Attorney, Agent, or Firm* — Knobbe, Martens, Olson & Bear, LLP

(57) ABSTRACT

Various powered mobility systems, such as scooters and wheeled boards, are disclosed. The powered mobility system can be a drive assembly, which can include a motor, transmission assembly, driving wheel, and power supply. The drive assembly can be detachable from the rest of the personal mobility vehicle.

27 Claims, 44 Drawing Sheets

(56) References Cited

U.S. PATENT DOCUMENTS

| | | |
|---|---|---|
| 311,936 A | 2/1885 | Wisewell |
| 319,839 A | 6/1885 | Nelson |
| 321,434 A | 7/1885 | Hanson |
| 321,466 A | 7/1885 | Wall |
| 329,927 A | 11/1885 | Mendenhall |
| 1,018,512 A | 2/1912 | Mees |
| 1,075,250 A | 10/1913 | Gingold |
| 1,194,102 A | 8/1916 | Webb |
| 1,387,091 A | 8/1921 | Woolley et al. |
| 1,550,985 A | 8/1925 | Schluesselburg |
| 1,603,529 A | 10/1926 | Faust |
| 1,632,997 A | 6/1927 | Connolly |
| 1,728,063 A | 9/1929 | James |
| 1,784,761 A | 12/1930 | Smith |
| 1,854,188 A | 4/1932 | Gregory |
| 1,935,187 A | 11/1933 | Kitselman |
| 2,051,762 A | 8/1936 | Vincent |
| 2,077,274 A | 4/1937 | Silkman |
| 2,126,359 A | 8/1938 | Vogt |
| 2,136,306 A | 11/1938 | McCloy |
| 2,216,359 A | 10/1940 | Spencer |
| 2,413,530 A | 12/1946 | Taylor |
| 2,430,037 A | 11/1947 | Vincent |
| 2,474,082 A | 6/1949 | Wutz |
| 2,509,324 A | 5/1950 | Horn |
| 2,857,008 A | 10/1958 | Antonio |
| 3,087,739 A | 4/1963 | Ware |
| 3,252,713 A | 5/1966 | Heller |
| 3,288,251 A | 11/1966 | Sakwa |
| 3,331,612 A | 7/1967 | Tietge |
| D214,252 S | 5/1969 | Andersen |
| 3,476,399 A | 11/1969 | Finn |
| 3,570,620 A | 3/1971 | Fisher et al. |
| 3,671,055 A | 6/1972 | Aarup |
| D226,440 S | 3/1973 | Bentley |
| 4,003,582 A | 1/1977 | Maurer |
| 4,037,852 A | 7/1977 | Bayer et al. |
| 4,043,566 A | 8/1977 | Johnson |
| 4,061,350 A | 12/1977 | Schmidt, Jr. et al. |
| 4,094,372 A | 6/1978 | Notter |
| 4,127,282 A | 11/1978 | Gorlach |
| 4,152,001 A | 5/1979 | Christianson |
| 4,168,076 A | 9/1979 | Johnson |
| 4,180,278 A | 12/1979 | Gottlieb |
| 4,185,847 A | 1/1980 | Johnson |
| 4,272,091 A | 6/1981 | Ried, Jr. |
| 4,398,735 A | 8/1983 | Evans et al. |
| 4,402,521 A | 9/1983 | Mongeon |
| 4,403,784 A | 9/1983 | Gray |
| 4,417,737 A | 11/1983 | Suroff |
| 4,504,072 A | 3/1985 | Klawitter |
| 4,508,187 A | 4/1985 | Wenzel |
| 4,523,767 A | 6/1985 | Le Page |
| 4,546,841 A | 10/1985 | Sipiano |
| 4,681,333 A | 1/1987 | Rouge et al. |
| 4,645,223 A | 2/1987 | Grossman |
| 4,708,352 A | 11/1987 | Vullierme |
| 4,709,937 A | 12/1987 | Lin et al. |
| 4,738,456 A | 4/1988 | Creason |
| D299,260 S | 1/1989 | Vullierme |
| 4,842,091 A | 6/1989 | Badsey |
| 4,844,491 A | 7/1989 | Wheelwright |
| 4,930,794 A | 6/1990 | Chan |
| 4,955,626 A | 9/1990 | Smith et al. |
| 4,998,358 A | 3/1991 | Girardelli |
| 5,046,747 A | 9/1991 | Nielsen |
| 5,062,630 A | 11/1991 | Nelson |
| 5,092,614 A | 3/1992 | Malewicz |
| D326,290 S | 5/1992 | Badsey |
| 5,143,388 A | 9/1992 | Chen |
| 5,232,235 A | 8/1993 | Brooks |
| 5,236,058 A | 8/1993 | Yamet et al. |
| 5,263,725 A | 11/1993 | Gesmer et al. |
| 5,330,026 A | 7/1994 | Hsu et al. |
| 5,347,681 A | 9/1994 | Wattron et al. |
| 5,513,863 A | 5/1996 | Klamer et al. |
| 5,513,865 A | 5/1996 | Brooks et al. |
| 5,547,204 A | 8/1996 | Gamzo |
| 5,662,187 A | 9/1997 | McGovern |
| 5,730,241 A | 3/1998 | Shyr et al. |
| 5,741,018 A | 4/1998 | Huang |
| D395,479 S | 6/1998 | Gamzo |
| 5,797,466 A | 8/1998 | Gendle |
| 5,829,543 A | 11/1998 | Diaz |
| 5,848,660 A | 12/1998 | McGreen |
| 5,860,657 A | 1/1999 | Kroher |
| D410,268 S | 5/1999 | Yung |
| 5,915,707 A | 6/1999 | Steffen |
| 5,950,754 A | 9/1999 | Ondrish, Jr. |
| 5,971,411 A | 10/1999 | Jones et al. |
| 5,997,018 A | 12/1999 | Lee |
| D421,282 S | 2/2000 | Orr |
| 6,029,763 A | 2/2000 | Swisher |
| 6,050,357 A | 4/2000 | Staelin et al. |
| D424,979 S | 5/2000 | Hanagan et al. |
| 6,059,062 A | 5/2000 | Staelin |
| 6,070,885 A | 6/2000 | Ferone |
| 6,139,035 A | 10/2000 | Tsai |
| D433,718 S | 11/2000 | Mcgreen |
| 6,158,752 A | 12/2000 | Kay |
| D435,873 S | 1/2001 | Lee |
| D435,874 S | 1/2001 | Cheng |
| 6,179,307 B1 | 1/2001 | Mao |
| 6,189,898 B1 | 2/2001 | Benoit |
| D438,911 S | 3/2001 | Chen |
| D438,912 S | 3/2001 | Barrera |
| D439,623 S | 3/2001 | Barrera |
| 6,199,652 B1 | 3/2001 | Mastroianni et al. |
| 6,206,387 B1 | 3/2001 | Tsai |
| 6,206,388 B1 | 3/2001 | Ouboter |
| 6,227,324 B1 | 5/2001 | Sauve |
| 6,234,501 B1 | 5/2001 | Chen |
| 6,241,264 B1 | 6/2001 | Page |
| D444,824 S | 7/2001 | Udwin et al. |
| D445,145 S | 7/2001 | Yang |
| D446,259 S | 8/2001 | Udwin et al. |
| D447,187 S | 8/2001 | Powers |
| D447,188 S | 8/2001 | Lan |
| 6,270,095 B1 | 8/2001 | Chang |
| 6,273,205 B1 | 8/2001 | Tsai |
| 6,283,485 B1 | 9/2001 | Tsai |
| 6,286,843 B1 | 9/2001 | Lin |
| 6,296,082 B1 | 10/2001 | Tsai |
| 6,298,952 B1 | 10/2001 | Tsai |
| 6,299,186 B1 | 10/2001 | Kao et al. |
| 6,302,415 B1 | 10/2001 | Wang et al. |
| D450,355 S | 11/2001 | Chan |
| D452,284 S | 12/2001 | McGinnis |
| D453,198 S | 1/2002 | Dudley |
| 6,406,039 B1 | 1/2002 | Chen |
| D453,804 S | 2/2002 | Robinson |
| 6,345,678 B1 | 2/2002 | Chang |
| 6,345,827 B1 | 2/2002 | Benoit |
| D454,377 S | 3/2002 | Hsu et al. |
| 6,352,270 B1 | 3/2002 | Wu |
| D456,460 S | 4/2002 | Tseng |
| 6,378,880 B1 | 4/2002 | Lin |
| 6,382,366 B1 | 5/2002 | Chang |
| 6,386,330 B1 | 5/2002 | Wei |
| 6,394,213 B1 | 5/2002 | Tsai |
| 6,409,190 B1 | 6/2002 | Tsai |
| D459,761 S | 7/2002 | Chen |
| 6,416,060 B1 | 7/2002 | Chen |
| 6,416,063 B1 | 7/2002 | Stillinger et al. |
| 6,428,021 B1 | 8/2002 | Tung |
| 6,428,050 B1 | 8/2002 | Brandley et al. |
| 6,443,470 B1 | 9/2002 | Ulrich et al. |
| D464,379 S | 10/2002 | Lin |
| 6,462,493 B2 | 10/2002 | Lan |
| 6,467,560 B1 | 10/2002 | Anderson |
| 6,481,728 B2 | 11/2002 | Chen |
| 6,481,729 B2 | 11/2002 | Herman et al. |
| 6,481,913 B2 | 11/2002 | Chen |
| D468,236 S | 1/2003 | Pollitzer et al. |

(56) References Cited

U.S. PATENT DOCUMENTS

| | | |
|---|---|---|
| D471,597 S | 3/2003 | Chen |
| D471,598 S | 3/2003 | Chen |
| 6,533,054 B1 | 3/2003 | Fey |
| D472,596 S | 4/2003 | Schnuckle et al. |
| D473,905 S | 4/2003 | Schnuckle et al. |
| D475,093 S | 5/2003 | Furter et al. |
| 6,557,861 B2 | 5/2003 | Saylor |
| 6,557,873 B2 | 5/2003 | Nardone |
| 6,604,593 B1 | 8/2003 | Mullet |
| 6,612,592 B1 | 9/2003 | Soo |
| 6,619,416 B2 | 9/2003 | Lan |
| 6,619,679 B2 | 9/2003 | Lan |
| D482,750 S | 11/2003 | Magerer et al. |
| 6,672,607 B2 | 1/2004 | Chung |
| 6,676,138 B1 | 1/2004 | Rosso |
| 6,679,505 B2 | 1/2004 | Yang |
| D486,532 S | 2/2004 | Christianson |
| 6,739,421 B1 | 5/2004 | Miya |
| D492,367 S | 6/2004 | Dennis |
| 6,796,394 B1 | 9/2004 | Lin |
| D497,397 S | 10/2004 | Sramek |
| 6,832,660 B2 | 12/2004 | Dodd |
| D505,469 S | 5/2005 | Joung et al. |
| D513,629 S | 1/2006 | Sramek |
| 6,981,711 B2 | 1/2006 | Seta |
| D516,132 S | 2/2006 | Sramek |
| 7,007,977 B1 | 3/2006 | Gallagher |
| D527,536 S | 9/2006 | Mcoy |
| 7,150,461 B2 | 12/2006 | Schnuckle et al. |
| 7,156,405 B1 | 1/2007 | Ming |
| 7,163,210 B1 | 1/2007 | Rehkemper et al. |
| 7,204,330 B1 | 4/2007 | Lauren |
| 7,214,337 B2 | 5/2007 | Grande |
| 7,226,063 B2 | 6/2007 | Paddock |
| 7,232,139 B2 | 6/2007 | Cole |
| 7,351,265 B2 | 4/2008 | Vitale et al. |
| D569,447 S | 5/2008 | Thomas |
| D574,296 S | 8/2008 | Keski-Luopa |
| 7,419,171 B1 | 9/2008 | Ka |
| 7,431,110 B2 | 10/2008 | Greenwood et al. |
| D579,987 S | 11/2008 | Hong |
| 7,584,974 B2 | 9/2009 | Jackman et al. |
| D603,463 S | 11/2009 | Jessie, Jr. |
| 7,610,972 B2 | 11/2009 | Adams et al. |
| 7,654,356 B2 | 2/2010 | Wu |
| D623,701 S | 9/2010 | Dalgaard et al. |
| 7,900,731 B2 | 3/2011 | McKinzie |
| 7,976,035 B2 | 7/2011 | Chan |
| 7,980,567 B2 | 7/2011 | Yu et al. |
| 7,988,159 B2 | 8/2011 | Chen |
| D645,522 S | 9/2011 | Powers et al. |
| 8,025,300 B1 | 9/2011 | Jordan |
| D654,963 S | 2/2012 | Powers et al. |
| D656,560 S | 3/2012 | Patterson et al. |
| 8,186,693 B2 | 5/2012 | Kortschot |
| 8,251,377 B2 | 8/2012 | Green et al. |
| 8,292,018 B2 | 10/2012 | Huang |
| 8,292,308 B2 | 10/2012 | Green et al. |
| D671,600 S | 11/2012 | Horne |
| D672,400 S | 12/2012 | Pizzi |
| 8,348,284 B2 | 1/2013 | Green |
| D678,124 S | 3/2013 | Canni et al. |
| D681,759 S | 5/2013 | Treadway et al. |
| D684,217 S | 6/2013 | Hadley |
| D686,674 S | 7/2013 | Hadley et al. |
| D687,499 S | 8/2013 | Horne |
| D691,671 S | 10/2013 | Chen et al. |
| D692,963 S | 11/2013 | Radtke et al. |
| D693,414 S | 11/2013 | Hadley et al. |
| D695,644 S | 12/2013 | Timonen |
| D698,868 S | 2/2014 | Chan |
| 8,668,039 B2 | 3/2014 | Tuli |
| 8,672,074 B2 | 3/2014 | Ganeous |
| 8,684,121 B2 | 4/2014 | Treadway |
| 8,727,359 B2 | 5/2014 | Green |
| D710,949 S | 8/2014 | Huang |
| 8,813,892 B2 | 8/2014 | Hadley et al. |
| D714,396 S | 9/2014 | Talios |
| D715,870 S | 10/2014 | Talios |
| 8,870,200 B2 | 10/2014 | Chen |
| D717,881 S | 11/2014 | Radtke et al. |
| 8,925,935 B2 | 1/2015 | Powers et al. |
| 8,985,602 B2 | 3/2015 | Chan |
| D727,833 S | 4/2015 | Talios et al. |
| 9,027,690 B2 | 5/2015 | Chavand |
| 9,045,189 B2 | 6/2015 | Lovley, II et al. |
| 9,056,241 B2 | 6/2015 | Green |
| D736,324 S | 8/2015 | Lu et al. |
| 9,114,821 B1 | 8/2015 | Xu |
| D738,435 S | 9/2015 | O'Connell |
| D741,969 S | 10/2015 | Green |
| D748,738 S | 2/2016 | Hadley et al. |
| D750,180 S | 2/2016 | Edlauer |
| 9,321,504 B2 | 4/2016 | Hadley et al. |
| D755,899 S | 5/2016 | Castrucci et al. |
| D756,464 S | 5/2016 | Edlauer |
| D756,465 S | 5/2016 | Byrne et al. |
| 9,339,720 B2 | 5/2016 | Kortschot |
| D764,615 S | 8/2016 | Treadway et al. |
| 9,452,345 B2 | 9/2016 | Doerksen et al. |
| D772,990 S | 11/2016 | Allais |
| D774,145 S | 12/2016 | Hadley et al. |
| D774,601 S | 12/2016 | Mizrahi et al. |
| D777,844 S | 1/2017 | Connell |
| D778,806 S | 2/2017 | Welford |
| 9,592,876 B2 | 3/2017 | Lovley, II et al. |
| 9,616,318 B2 | 4/2017 | Rogers |
| 9,630,085 B2 | 4/2017 | Treadway et al. |
| 9,660,500 B2 | 5/2017 | Huang |
| 9,682,309 B2 | 6/2017 | Huang |
| 9,764,218 B2 | 9/2017 | Treadway et al. |
| 9,808,705 B2 | 11/2017 | Treadway et al. |
| D806,176 S | 12/2017 | Peng |
| D810,623 S | 2/2018 | Adcock |
| D810,836 S | 2/2018 | Hadley |
| D811,489 S | 2/2018 | Hadley et al. |
| 9,919,200 B2 | 3/2018 | Mo |
| D815,215 S | 4/2018 | Desberg |
| 9,950,244 B1 | 4/2018 | Sargis |
| D817,228 S | 5/2018 | Kroll et al. |
| D818,541 S | 5/2018 | Huang |
| 9,956,473 B2 | 5/2018 | Chiu |
| 9,987,547 B2 | 6/2018 | Ruschkowski |
| D824,805 S | 8/2018 | Karka |
| 10,071,303 B2 | 9/2018 | Pikulski |
| D829,826 S | 10/2018 | Liu et al. |
| D830,468 S | 10/2018 | Liu |
| 10,099,745 B2 | 10/2018 | Hadley et al. |
| D834,097 S | 11/2018 | Lin et al. |
| 10,124,851 B2 | 11/2018 | Lovley, II et al. |
| 10,137,356 B2 | 11/2018 | Kortschot |
| D836,727 S | 12/2018 | Wilson et al. |
| 10,144,480 B2 * | 12/2018 | Tan ................... B62K 15/006 |
| D837,303 S | 1/2019 | Desberg |
| D839,358 S | 1/2019 | Cao |
| D839,359 S | 1/2019 | Hadley |
| 10,189,533 B2 | 1/2019 | Lovley, II et al. |
| D842,409 S | 3/2019 | Novick |
| D842,758 S | 3/2019 | Hall et al. |
| D849,153 S | 5/2019 | Zhang et al. |
| D849,601 S | 5/2019 | Li et al. |
| D855,115 S | 7/2019 | Yan |
| D858,646 S | 9/2019 | Yang |
| D861,538 S | 10/2019 | Frahm |
| D866,675 S | 11/2019 | Desberg |
| D872,192 S | 1/2020 | Hadley |
| D873,349 S | 1/2020 | Huang |
| 10,737,743 B2 | 8/2020 | Hadley et al. |
| D910,766 S | 2/2021 | Hadley |
| D911,455 S | 2/2021 | Huang |
| D912,180 S | 3/2021 | Desberg et al. |
| D914,102 S | 3/2021 | Hadley et al. |
| 10,933,299 B2 * | 3/2021 | Zhang ................... A63C 17/04 |
| 11,033,799 B2 | 6/2021 | Kortschot |

(56) References Cited

U.S. PATENT DOCUMENTS

| | | | |
|---|---|---|---|
| D941,928 S | 1/2022 | Hadley | |
| D941,929 S | 1/2022 | Hadley | |
| D941,930 S | 1/2022 | Hadley | |
| 11,338,883 B2 | 5/2022 | Hadley et al. | |
| 2001/0030405 A1 | 10/2001 | Wu et al. | |
| 2002/0005309 A1 | 1/2002 | Patmont et al. | |
| 2002/0074756 A1 | 6/2002 | Tsai | |
| 2002/0079855 A1 | 6/2002 | Parks | |
| 2002/0093161 A1 | 7/2002 | Udwin et al. | |
| 2002/0105152 A1 | 8/2002 | Miller | |
| 2002/0105157 A1 | 8/2002 | Chen | |
| 2002/0109313 A1 | 8/2002 | Johnsen | |
| 2002/0134604 A1 | 9/2002 | Lan | |
| 2002/0145264 A1 | 10/2002 | Hung | |
| 2002/0149165 A1 | 10/2002 | Lin | |
| 2002/0158437 A1 | 10/2002 | Carbonero | |
| 2002/0167146 A1 | 11/2002 | Chang | |
| 2002/0170763 A1 | 11/2002 | Townsend | |
| 2002/0180169 A1 | 12/2002 | Kwok | |
| 2003/0020244 A1 | 1/2003 | Sung | |
| 2003/0042058 A1 | 3/2003 | Chen | |
| 2003/0127816 A1 | 7/2003 | Schnuckle et al. | |
| 2003/0168273 A1 | 9/2003 | Ducharme et al. | |
| 2003/0221888 A1 | 12/2003 | McKinney, Jr. et al. | |
| 2004/0041359 A1 | 3/2004 | Im | |
| 2004/0129472 A1 | 7/2004 | Cheng | |
| 2004/0217562 A1 | 11/2004 | Haugen et al. | |
| 2005/0006859 A1 | 1/2005 | Farrelly et al. | |
| 2005/0006866 A1 | 1/2005 | Chen | |
| 2005/0012289 A1 | 1/2005 | Wang et al. | |
| 2005/0012290 A1 | 1/2005 | McClain | |
| 2005/0116430 A1 | 6/2005 | Chen | |
| 2005/0121866 A1 | 6/2005 | Kamen et al. | |
| 2005/0127629 A1 | 6/2005 | Nelson et al. | |
| 2005/0173175 A1 | 8/2005 | Lee | |
| 2006/0049595 A1 | 3/2006 | Crigler et al. | |
| 2006/0125200 A1 | 6/2006 | Cole | |
| 2006/0279055 A1 | 12/2006 | Morabito | |
| 2007/0045976 A1 | 3/2007 | Wu | |
| 2007/0126191 A1 | 6/2007 | Kay, III | |
| 2008/0197594 A1 | 8/2008 | Ling | |
| 2008/0203691 A1 | 8/2008 | Hsu | |
| 2009/0071740 A1 | 3/2009 | Palmer | |
| 2009/0160150 A1 | 6/2009 | Johnson | |
| 2009/0200768 A1 | 8/2009 | Armand et al. | |
| 2009/0273152 A1 | 11/2009 | Chung | |
| 2010/0090422 A1 | 4/2010 | Chan et al. | |
| 2010/0123295 A1 | 5/2010 | Landau | |
| 2011/0031711 A1* | 2/2011 | Grossman | B62J 6/16 |
| | | | 280/87.041 |
| 2011/0056177 A1 | 3/2011 | Goto | |
| 2012/0086181 A1 | 4/2012 | Kinnaman | |
| 2013/0026734 A1 | 1/2013 | Zhang et al. | |
| 2013/0081891 A1* | 4/2013 | Ulmen | A63C 17/12 |
| | | | 180/181 |
| 2013/0087983 A1 | 4/2013 | Ngai | |
| 2013/0186698 A1 | 7/2013 | Sarokhan | |
| 2013/0270016 A1 | 10/2013 | Donnell et al. | |
| 2013/0282216 A1 | 10/2013 | Edney | |
| 2013/0320648 A1 | 12/2013 | Eckert et al. | |
| 2014/0090916 A1 | 4/2014 | Lovely, II et al. | |
| 2014/0158446 A1 | 6/2014 | Treadway | |
| 2014/0332297 A1 | 11/2014 | Kortschot | |
| 2015/0196831 A1 | 7/2015 | Treadway et al. | |
| 2015/0306511 A1 | 10/2015 | Norman et al. | |
| 2015/0352430 A1 | 12/2015 | Treadway et al. | |
| 2016/0129963 A1 | 5/2016 | Ying et al. | |
| 2016/0213999 A1 | 7/2016 | Treadway et al. | |
| 2016/0256767 A1 | 9/2016 | Cerboneschi | |
| 2017/0182397 A1 | 6/2017 | Zhang | |
| 2017/0182398 A1 | 6/2017 | Garcia Elena | |
| 2017/0240239 A1* | 8/2017 | Huang | B62K 3/002 |
| 2017/0259162 A1 | 9/2017 | Mo | |
| 2018/0015355 A1* | 1/2018 | Desberg | A63C 17/006 |
| 2018/0029659 A1 | 2/2018 | Desberg | |
| 2019/0084605 A1 | 3/2019 | Berendzen et al. | |
| 2019/0193809 A1 | 6/2019 | Hadley | |
| 2019/0263468 A1 | 8/2019 | Huang | |
| 2019/0314709 A1 | 10/2019 | Kortschot | |
| 2020/0307735 A1 | 10/2020 | Paris et al. | |
| 2021/0094651 A1 | 4/2021 | Hadley et al. | |
| 2021/0236910 A1 | 8/2021 | Behrmann | |
| 2022/0118344 A1 | 4/2022 | Kortschot | |

FOREIGN PATENT DOCUMENTS

| | | |
|---|---|---|
| CN | 2273210 Y | 1/1998 |
| CN | 2448414 Y | 9/2001 |
| CN | 2452873 | 10/2001 |
| CN | 1143702 C | 3/2004 |
| CN | 2619503 Y | 6/2004 |
| CN | 2717494 Y | 8/2005 |
| CN | 2785659 Y | 6/2006 |
| CN | 2915189 Y | 6/2007 |
| CN | 200966900 Y | 10/2007 |
| CN | 204021174 U | 12/2014 |
| CN | 104787183 | 7/2015 |
| CN | 104941171 A | 9/2015 |
| CN | 105148496 A | 12/2015 |
| CN | 106422285 A | 2/2017 |
| CN | 205952205 | 2/2017 |
| CN | 206138715 U | 5/2017 |
| CN | 108295457 A | 7/2018 |
| CN | 108325204 A | 7/2018 |
| CN | 109927829 | 6/2019 |
| DE | 4424297 | 1/1996 |
| DE | 4424297 A1 | 1/1996 |
| DE | 201 07 388 U1 | 7/2001 |
| EP | 0 995 468 | 4/2000 |
| GB | 2 441 394 | 9/2008 |
| JP | 56085381 | 7/1981 |
| JP | 2001-225775 A | 8/2001 |
| JP | 3081197 U | 10/2001 |
| KR | 200378761 Y1 | 3/2005 |
| WO | WO 96/20762 | 7/1996 |
| WO | WO 2000/03773 | 1/2000 |
| WO | WO 2002/089933 | 11/2002 |
| WO | WO 2008/006275 | 1/2008 |
| WO | WO 2008/019482 | 2/2008 |
| WO | WO 2015/095368 | 6/2015 |
| WO | WO 2015/114614 | 8/2015 |
| WO | WO 2016/128488 | 8/2016 |
| WO | WO 2017/050247 | 3/2017 |
| WO | WO 2017/127464 A1 | 7/2017 |
| WO | WO 2018/013994 A1 | 1/2018 |
| WO | WO 2019/0232248 | 12/2019 |
| WO | WO 2022/032136 | 2/2022 |

OTHER PUBLICATIONS

U.S. Appl. No. 29/637,724, filed Feb. 21, 2018, Hadley.
International Preliminary Report on Patentability in International Application No. PCT/US2019/034710, dated Dec. 1, 2020, in 7 pages.
https://www.amazon.com/Razor-Turbo-Jetts-Electric-Wheels/dp/BK07H6RB4MX?th=1 (Year: 2018).
International Search Report and Written Opinion in corresponding International Patent Application No. PCT/US2019/34710, dated Aug. 16, 2019 in 15 pages.
Office Action in corresponding Australian Patent Application No. 2019278877, dated Sep. 10, 2022, in 3 pages.
Extended Search Report in corresponding European Patent Application No. 19811374.8, dated Dec. 20, 2021, in 11 pages.
Razor Jetts Heel Wheels, Purple, One Size, https://www.amazon.ca/Razor-Jetts-Heel-wheels-purple/dp/B073XQJZSX/, Jul. 14, 2017, in 1 page.
Kids Roller Skates—Heel Wheel Roller Skates Attachable Shoe, https://www.amazon.ca/Kids-Roller-Skates-Attachable-Trainer/dp/B08R21VVDJ/, Dec. 19, 2020, in 1 page.

* cited by examiner

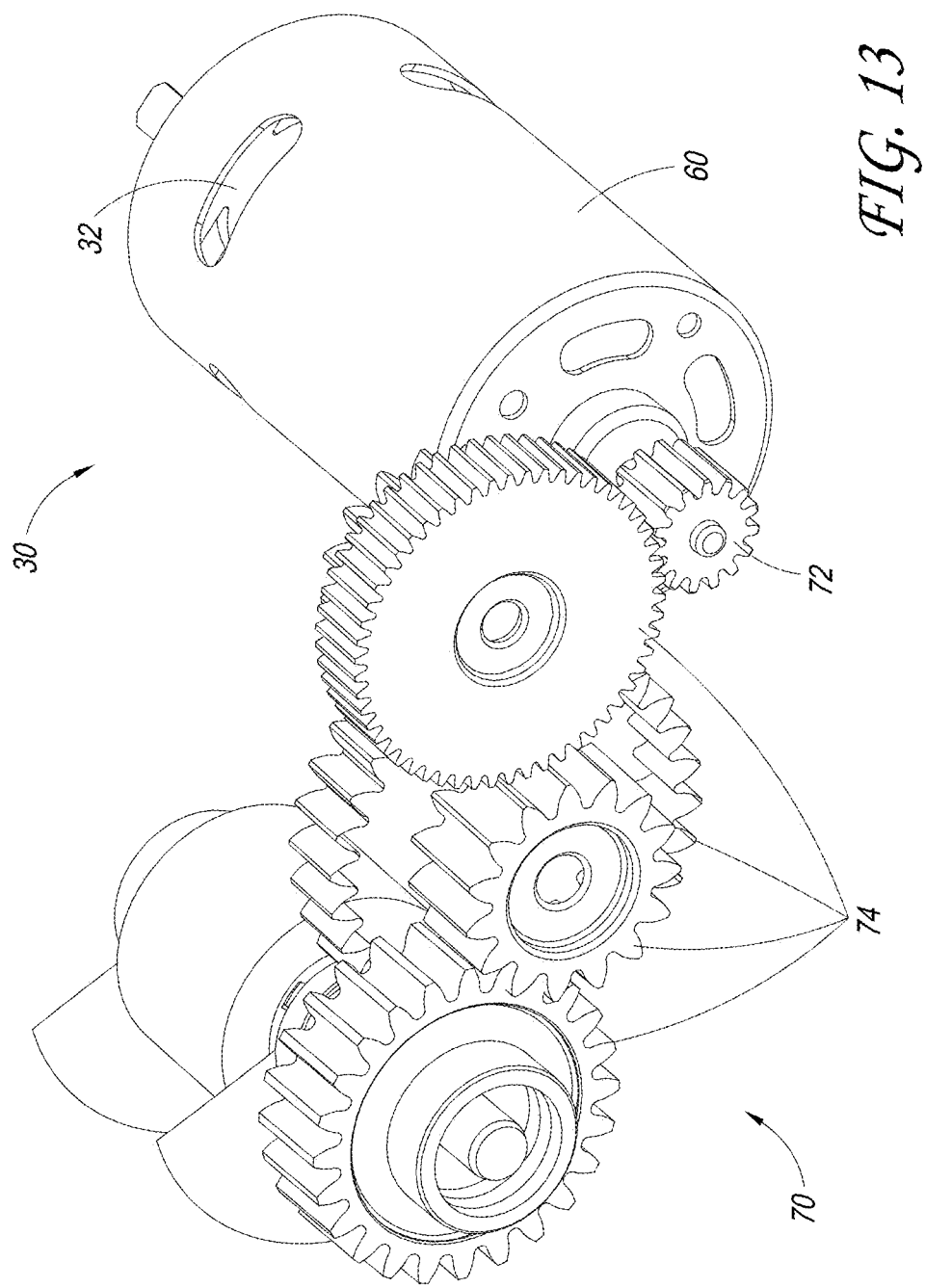

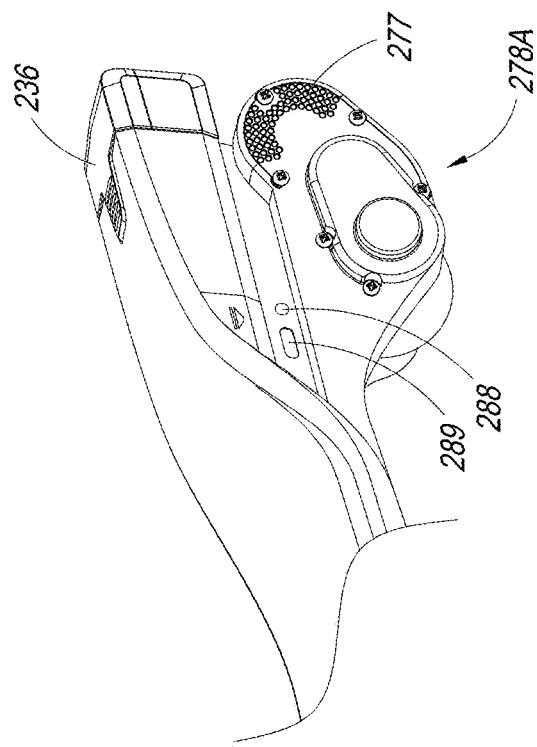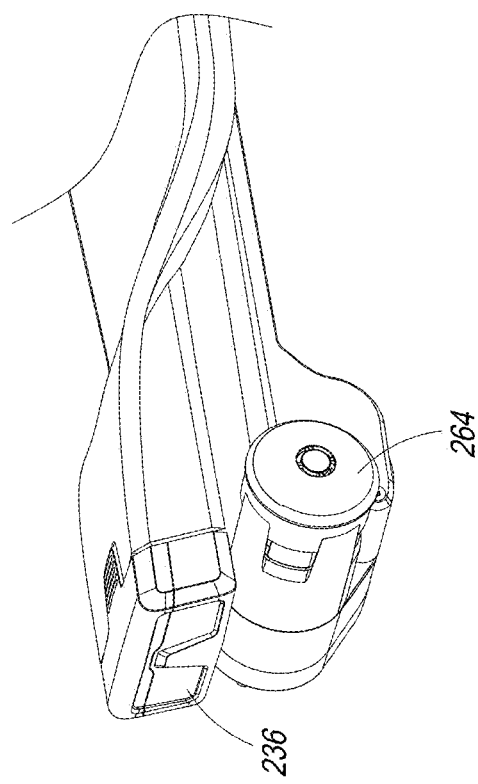
FIG. 35

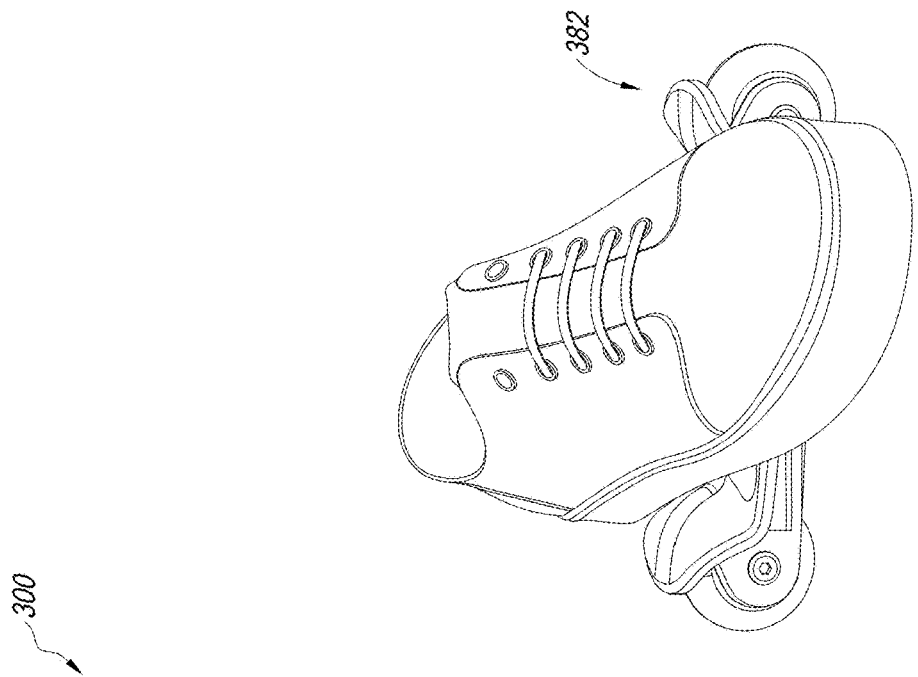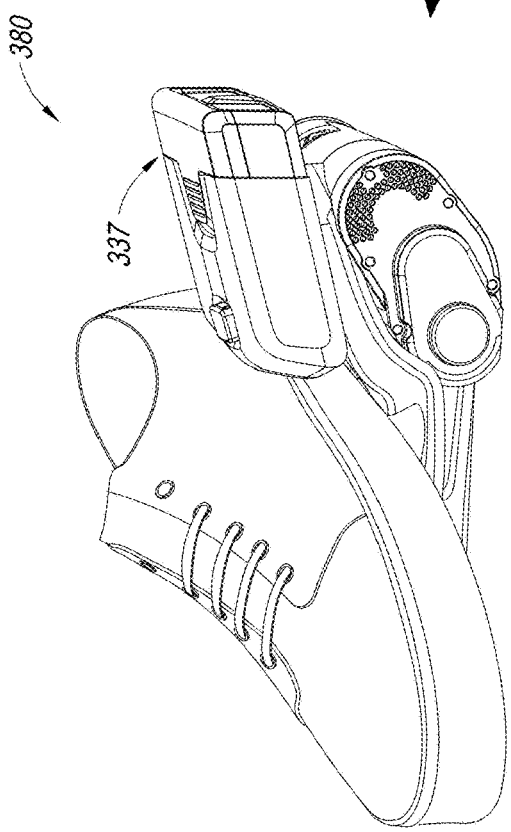
FIG. 43

PERSONAL MOBILITY VEHICLES WITH DETACHABLE DRIVE ASSEMBLY

CROSS REFERENCE

This application claims the priority benefit under at least 35 U.S.C. § 119 of U.S. Provisional Patent Application No. 62/679,328, filed Jun. 1, 2018, the entirety of which is incorporated by reference herein.

BACKGROUND

Field

Embodiments of the disclosure relate generally to personal mobility vehicles, such as electric scooters and wheeled boards.

Description of Certain Related Art

Personal mobility vehicles, such as scooters and wheeled boards, have become popular recreational products, as well as useful transportation devices. Scooters and wheeled boards typically have multiple two wheels and a steering mechanism. Some scooters and wheeled boards include braking mechanisms.

SUMMARY OF CERTAIN FEATURES

A need still exists for new and/or improved designs, which may provide a new riding experience or unique functionality. The systems, methods, vehicles, and devices described herein have innovative aspects, no single one of which is indispensable or solely responsible for their desirable attributes.

Various personal mobility vehicles and powered mobility systems are described in this disclosure. In some embodiments, the vehicle can include a body. The body can include a support surface and can be configured to support a user. In some embodiments, the vehicle can include a plurality of wheels. The plurality of wheels can include one or more rear wheels and one or more front wheels. In some embodiments, the vehicle can include a drive assembly. The drive assembly can include a motor and driving wheel, which can be driven by the motor. In some embodiments, the drive assembly can include a transmission assembly. The transmission assembly can comprise a gear transmission. In some embodiments, the gear transmission can comprise at least a driving gear connected to the drive shaft and a driven gear configured to spin the driving wheel. In certain embodiments, the drive assembly can include a power supply. In some embodiments, the power supply can be configured to power the drive assembly and to cause the motor to spin the driving wheel. In some embodiments, the power supply can be configured to be selectively removed from the power supply housing. In some embodiments, the drive assembly can include a brake mechanism. For example, the drive assembly can include a brake operated by a user's foot.

The drive assembly can be configured to be selectively attached and detached from the body of the vehicle. This can enable the vehicle to be adapted for various uses. For example, in a situation in which a user is seeking speed (e.g., for tricks or to arrive at a destination rapidly) a drive assembly with a higher power motor can be attached to the body. In a situation in which a user is seeking endurance (e.g., for longer riding time and/or for travel to a far destination) a drive assembly with a lower power motor can be attached to the body. Further, in a situation in which a user is seeking torque (e.g., for off road use and/or for hill climbing) a drive assembly with an appropriate transmission can be attached to the body. Additionally, an attachable and detachable drive assembly can facilitate maintenance, repair, and/or replacement of the driving mechanism separate from the rest of the scooter. For example, if the drive assembly were to experience a failure, only the drive assembly can be sent for repair, while the remainder of the body can be retained by the user. A replacement drive assembly can be attached to the body, thereby maintaining the user's ready access to transportation and/or avoiding an interruption of the user's transportation.

According to some embodiments, a personal mobility vehicle can include a body. The body can include a support surface and can be configured to support a user. The personal mobility vehicle can include a plurality of wheels, such as a driving wheel and a front wheel. The personal mobility vehicle can include a drive assembly. The drive assembly can be configured to be selectively detached from the body. The drive assembly can include a motor, a drive shaft, a power supply housing, a transmission housing, and/or a power supply. The transmission housing can include a gear transmission with at least a driving gear connected to the drive shaft and a driven gear configured to spin the driving wheel. The power supply can be configured to power the drive assembly and to cause the motor to spin the driving wheel.

In some embodiments, the power supply is configured to be selectively removed from the power supply housing.

In some embodiments, the personal mobility vehicle can include a second front wheel.

In some embodiments, the drive assembly can include the driving wheel.

In some embodiments, the personal mobility vehicle includes a pressure sensor and a controller. The pressure sensor can be in functional communication with a controller. The pressure sensor can be configured to cause the controller to detect shifts of the user's weight and to change a speed of the motor.

In some embodiments, the body includes a channel configured to slidably receive a portion of the drive assembly. The drive assembly can include at least one actuator configured to disengage a locking mechanism securing the drive assembly with the body.

In some embodiments, the personal mobility vehicle includes a braking mechanism. The braking mechanism can extend rearwardly from the body and/or over at least a portion of the driving wheel. The drive assembly can include the braking mechanism.

In some embodiments, the personal mobility vehicle is a wheeled board. The personal mobility vehicle can be a wheeled board, such as a skateboard. The personal mobility vehicle can include a steering system with an axle, an axle bearing surface, and/or a pivot member. In some embodiments, the personal mobility vehicle is a scooter.

According to some embodiments, a drive assembly can be configured for use in a personal mobility vehicle. The drive assembly can include a driving wheel, a power supply housing, a motor, a drive shaft, a transmission assembly, a power supply, and/or a locking mechanism. The transmission assembly can include a gear transmission. The gear transmission can include at least a driving gear connected to the drive shaft and a driven gear configured to spin the driving wheel. The power supply can be configured to power the drive assembly and to cause the motor to spin the driving wheel. The locking mechanism can be configured to selectively secure the drive assembly to the personal mobility vehicle.

In some embodiments, the power supply is configured to be selectively removed from the power supply housing.

In some embodiments, the drive assembly includes a braking mechanism extending over at least a portion of the driving wheel. The drive assembly can include at least one actuator configured to disengage the locking mechanism.

In some embodiments, the motor is configured to communicate with a controller of the personal mobility vehicle. The controller can be configured to receive signals from a pressure sensor on the personal mobility vehicle.

According to some embodiments, a personal mobility vehicle can include a powered skate and a non-powered skate. The powered skate can include a body, a first wheel, a second wheel, and/or a drive assembly. The body of the powered skate can include a first foot support surface. The first wheel can be disposed on a first end of the powered skate and the second wheel can be disposed on a second end of the powered skate opposite the first end. One of the first and second wheels of the powered skate can be a driving wheel. The drive assembly can include a power supply housing, a motor, a drive shaft, a transmission assembly, and/or a power supply. The transmission assembly can include a gear transmission. The gear transmission can include at least a driving gear connected to the drive shaft and a driven gear configured to spin the driving wheel. The power supply can be configured to power the drive assembly and to cause the motor to spin the driving wheel. The power supply can be configured to be selectively removed from the power supply housing. The non-powered skate can include a body, a first wheel, and/or a second wheel. The body of the non-powered skate can include a second foot support surface. The first wheel can be disposed on a first end of the non-powered skate and the second wheel can be disposed on a second end of the non-powered skate opposite the first end. A direction of travel of the personal mobility vehicle can be generally perpendicular to a longitudinal axis of a user's foot.

In some embodiments, the drive assembly can include the driving wheel.

In some embodiments, the drive assembly can be configured to be selectively detached from the body of the powered skate.

In some embodiments, each wheel of the powered skate can have an axis of rotation disposed to a lateral side of the first foot support surface. Each wheel of the non-powered skate can have an axis of rotation disposed to a lateral side of the second foot support surface.

In some embodiments, the powered skate can be a leading skate and the non-powered skate can be a trailing skate.

BRIEF DESCRIPTION OF THE DRAWINGS

These and other features, aspects, and advantages are described below with reference to drawings of an example embodiment, which are intended to illustrate, but not to limit, the present disclosure.

FIG. 13 is a perspective view of an embodiment of a transmission that can be included in the drive assembly of FIGS. 10 and 11.

FIG. 35 is a partial view of the rear portion of the wheeled board of FIG. 23.

FIG. 43 is a perspective view of another embodiment of a personal mobility vehicle, namely a pair of wheeled skates, with a user's shoes illustrated for purposes of presentation.

DETAILED DESCRIPTION OF CERTAIN EMBODIMENTS

Embodiments of systems, components and methods of assembly and manufacture will now be described with reference to the accompanying figures, wherein like numerals refer to like or similar elements throughout. Although several embodiments, examples, and illustrations are disclosed below, the inventions described herein extend beyond the specifically disclosed embodiments, examples and illustrations, and can include other uses of the inventions and obvious modifications and equivalents thereof. Embodiments of the inventions can comprise several novel features and no single feature is solely responsible for its desirable attributes or is essential to practicing the inventions herein described. Throughout the following description, like numbers refer to like components.

FIGS. 1-21B

Figure 1:
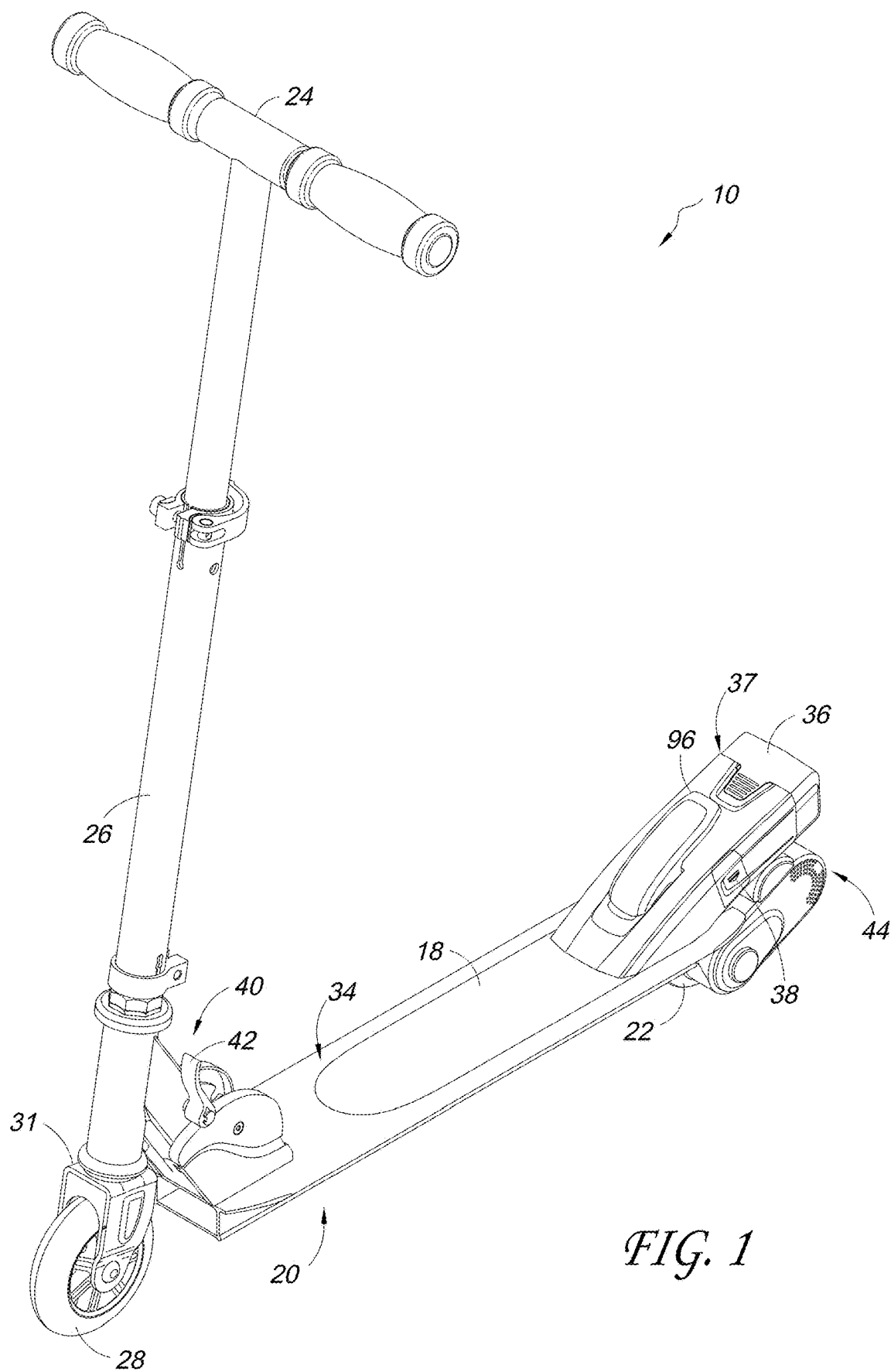
FIG. 1 is a perspective view of an embodiment of a personal mobility vehicle, namely a scooter.

FIGS. 1-21B illustrate an embodiment of a powered personal mobility vehicle, such as a scooter 10. As shown in FIG. 1, the scooter 10 includes a body 20, a rotatable shaft 26, a handlebar assembly 24, and a drive assembly 44. The scooter 10, such as the drive assembly 44, can include any of the features of the powered mobility systems described in U.S. Patent Application Publication No. 2018/0015355, which is incorporated by reference herein in its entirety.

The body 20 can include a deck, which can have platform or support surface 34. The support surface 34 can be configured to support at least one foot of the user. The illustrated support surface 34 is configured to accommodate both feet of a user, such as in one or both of a fore-and-aft or side-by-side arrangement. In some embodiments, the scooter 10 has a plurality of wheels including a front wheel 28 and a rear wheel 22 connected with the body 20. The front wheel 28 and the rear wheel 22 can be spaced apart from one another with the support surface 34 extending therebetween. The wheels 28, 22 can be generally aligned in the same plane, such as is depicted. The wheels can be located at opposite ends of the support surface 34.

As depicted, some embodiments of the scooter 10 include the rotatable shaft 26. The shaft 26 can rotate with the handlebar assembly 24 so that the handlebar assembly 24 can rotate or swivel within a head tube of the body 20. The shaft 26 can be connected with a fork 31 that connects with the front wheel 28, such that the handlebar assembly 24 can be rotated to swivel the front wheel 28 to steer the scooter 10. The fork 31 can be directly connected to sides of the front wheel 28 and/or an axle that extends through a rotational axis of the front wheel 28.

In some embodiments, the front wheel 28 is approximately the same size as the driving wheel or rear wheel 22. In some embodiments, the front wheel 28 can have a diameter that is greater than the driving wheel 22. In some embodiments, the front wheel 28 has a diameter that is less than the driving wheel 22. In some embodiments, the vehicle 10 has two front wheels. In some embodiments, the vehicle 10 has two rear wheels.

Figure 3:
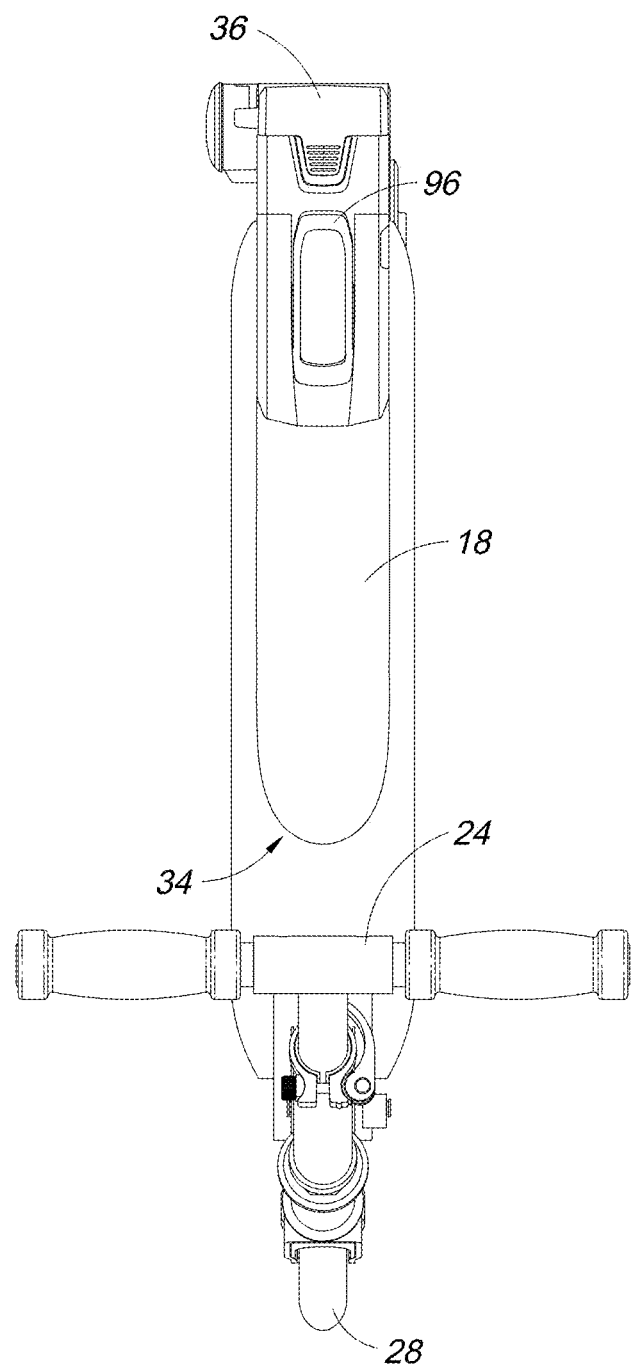
FIG. 3 is a top view of the scooter of FIG. 1.
Figure 9:
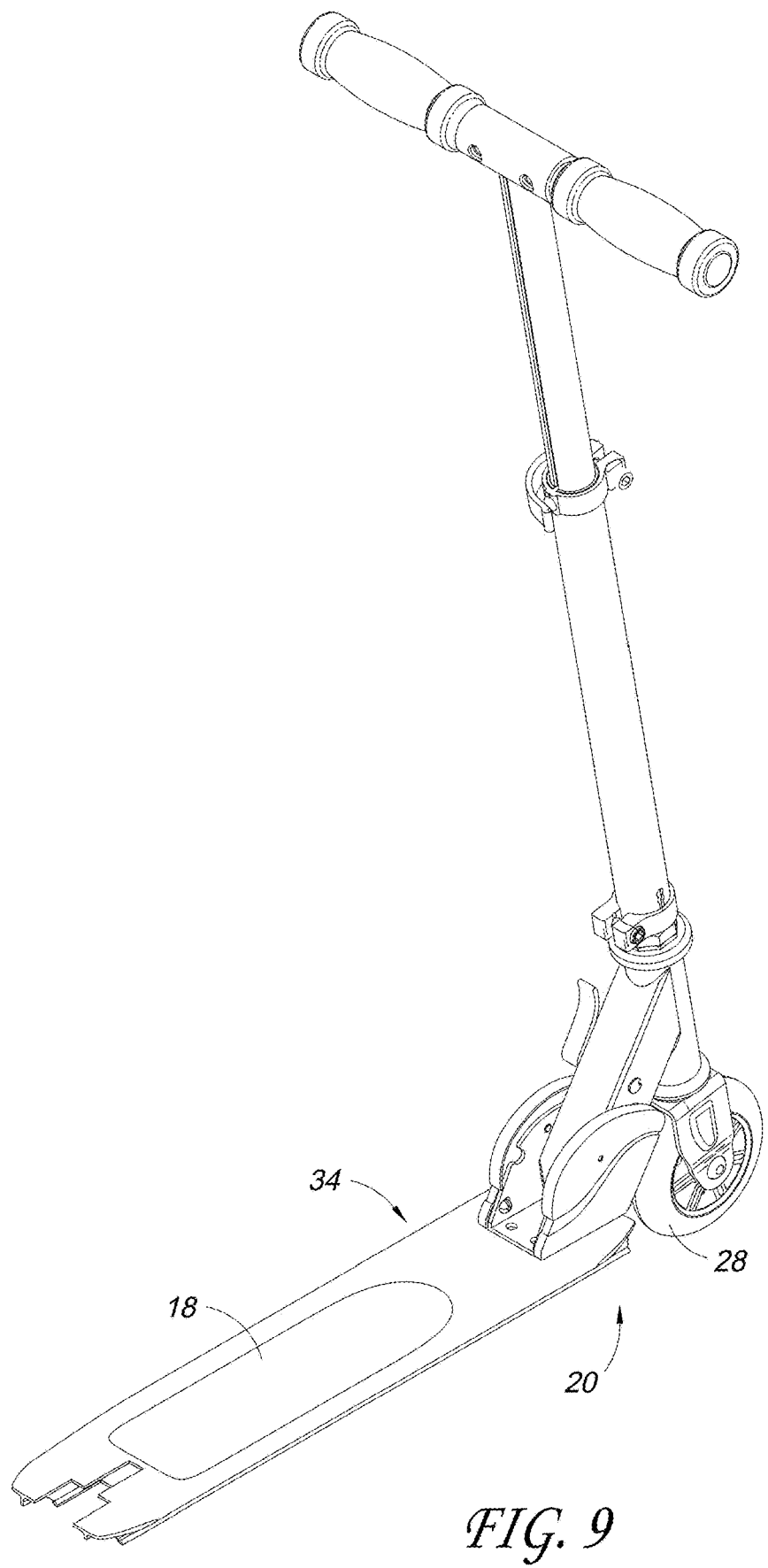
FIG. 9 is a perspective view of an embodiment of a body of the scooter of FIG. 1.

In some embodiments, the platform or support surface 34 can provide comfort and/or support to a user's feet. The support surface 34 can include one or more grips 18, such as is shown in FIGS. 3 and 9. The grips 18 can be configured to provide friction to secure the user's foot on the support surface 34. The grips 18 can include protrusions (e.g., ribs or otherwise) extending upwards from the support surface 34. The protrusions can extend laterally across a top surface of the support surface 34. In some embodiments, the grips 18 are spaced apart along the top surface of the support surface 34. In some embodiments, the grips 18 can include slots and/or cutouts in the support surface 34.

In some embodiments, the scooter 10 includes a folding assembly 40. The folding assembly 40 allows the handlebar assembly 24 and the rotatable shaft 26 to pivot relative to the body 20 such that the handlebar assembly 24 folds against the body 20 for compact transport and storage of the scooter 10. Accordingly, in some embodiments, the rotatable shaft 26 can pivot about the folding assembly 40.

Figure 5:
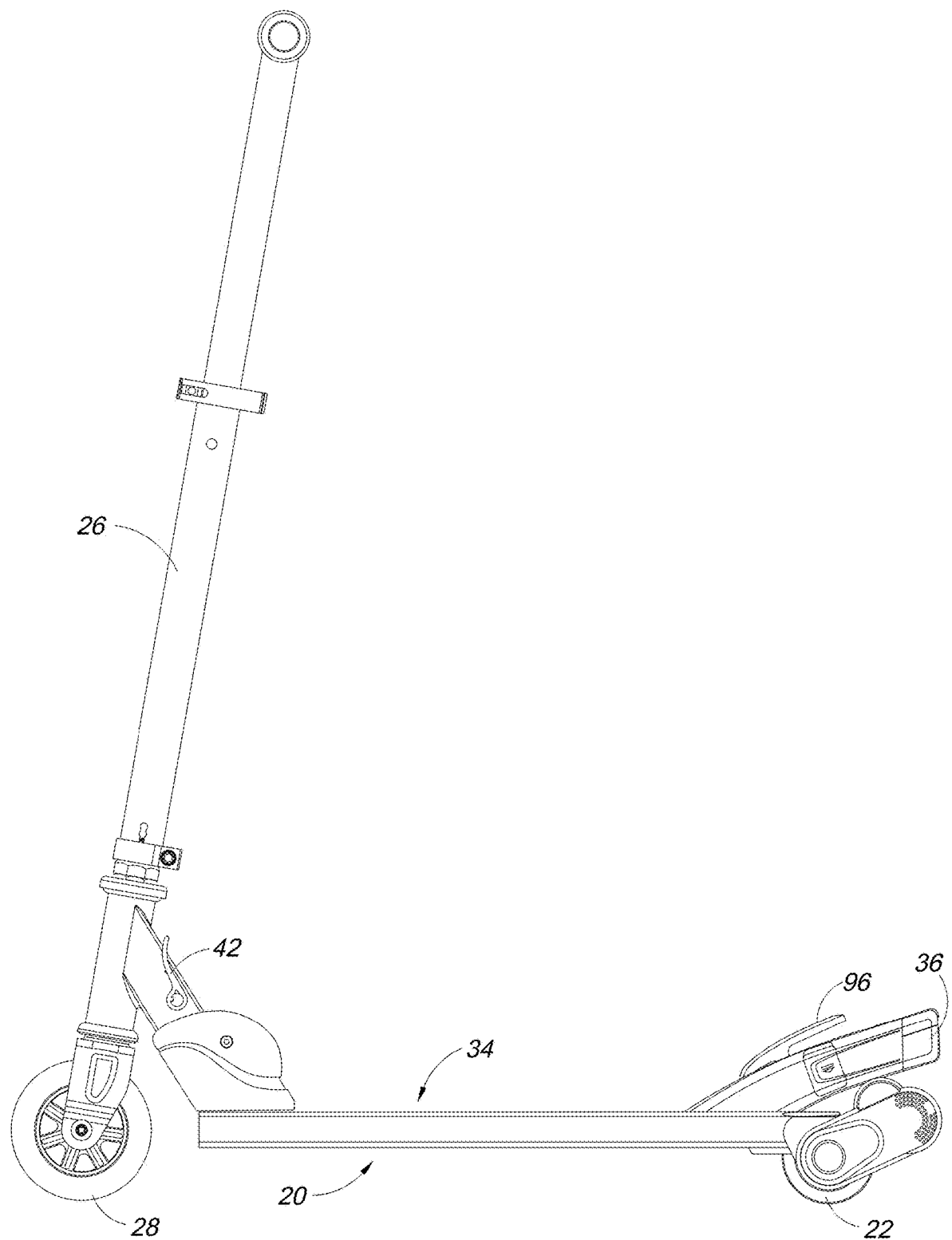
FIG. 5 is a left side view of the scooter of FIG. 1.

In some embodiments, when the scooter 10 is in the folded configuration, the handlebar assembly 24 can be positioned generally parallel to the body 20. The folding assembly 40 includes a release mechanism 42, such as is shown in FIG. 5. The release mechanism 42 can include a handle, button, lever, and/or knob, and/or any other suitable mechanisms. For example, in some embodiments, the release mechanism 42 includes a handle that, in a first position, locks the rotatable shaft 26 in a substantially upright or riding position and in a second position, allows the rotatable shaft to pivot about a pivot connection between the rotatable shaft 26 and the body 20 such that the rotatable shaft 26 is substantially parallel with a longitudinal axis of the body 20. In certain variants, the release mechanism 42 comprises a motor. In some embodiments, the release mechanism 42 is in wired and/or wireless communication with a controller 45 to receive instructions to release and/or lock the folding assembly 40. For example, the controller 45 can instruct the motor to fold or unfold the scooter 10. In some embodiments, when the scooter 10 is in the folded configuration, the handlebar assembly 24 is positioned adjacent or near a brake mechanism 96. In some embodiments, the handlebar assembly 24 abuts and/or touches the brake mechanism 96 and can cause the brake mechanism 96 to contact the rear wheel 22 or otherwise lock the rear wheel 22 to prevent rotation of the rear wheel 22.

In some embodiments, the scooter 10 comprises a motor 32, such as an electric motor. The motor 32 can be mounted to the underside of the body 20 underneath the support surface 34, mounted on a rear end of the support surface 34 adjacent the drive assembly 44, mounted on a front end of the support surface 34 adjacent the front wheel 28, mounted on the handlebar assembly 24 or fork 31, mounted on the drive assembly 44, and/or in any other location. The motor 32 can be operably coupled to the at least one rear wheel 22 to provide powered rotational force upon the at least one rear wheel 22. In some embodiments, the battery housing and the motor 32 can be located or supported at different locations on the scooter 10, including in the drive assembly 44, on top of the support surface 34, or adjacent either the front or rear wheel 28, 22. In some embodiments, the battery housing and the motor 32 can be located in the same location.

Figure 7:
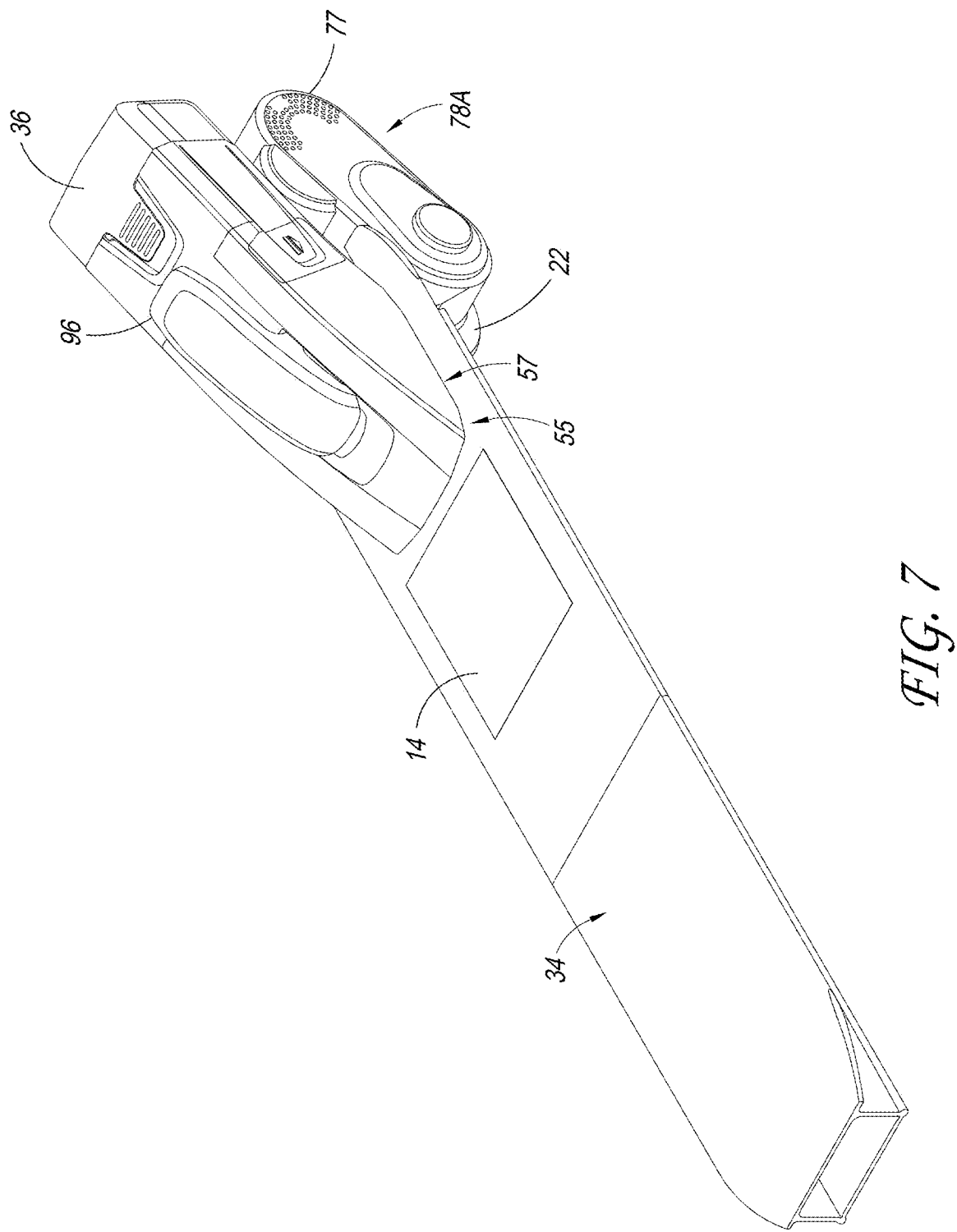
FIG. 7 is a perspective view of a portion of the scooter of FIG. 1.
Figure 15:
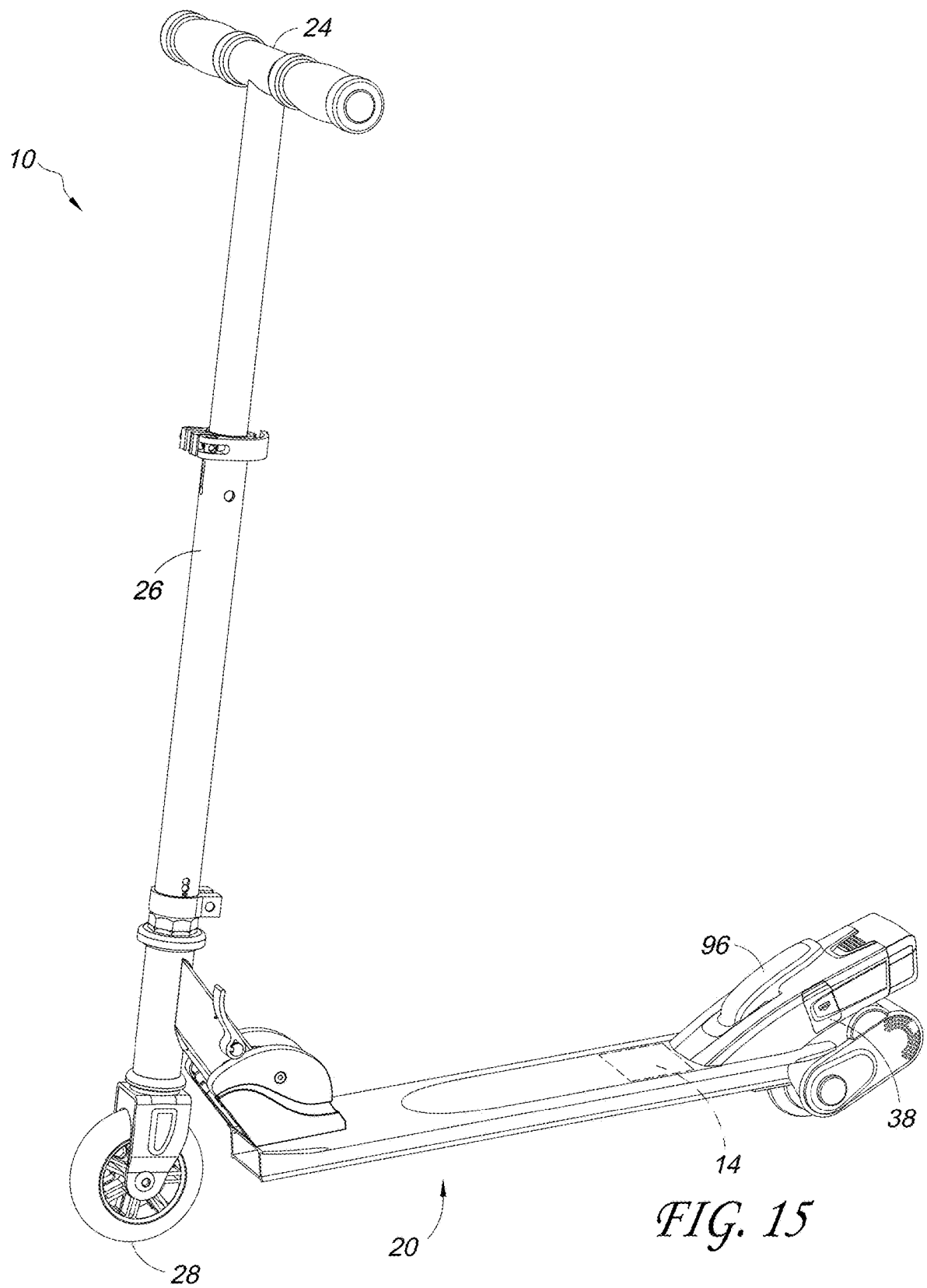
FIG. 15 is another perspective view of the scooter of FIG. 1.
Figure 16:
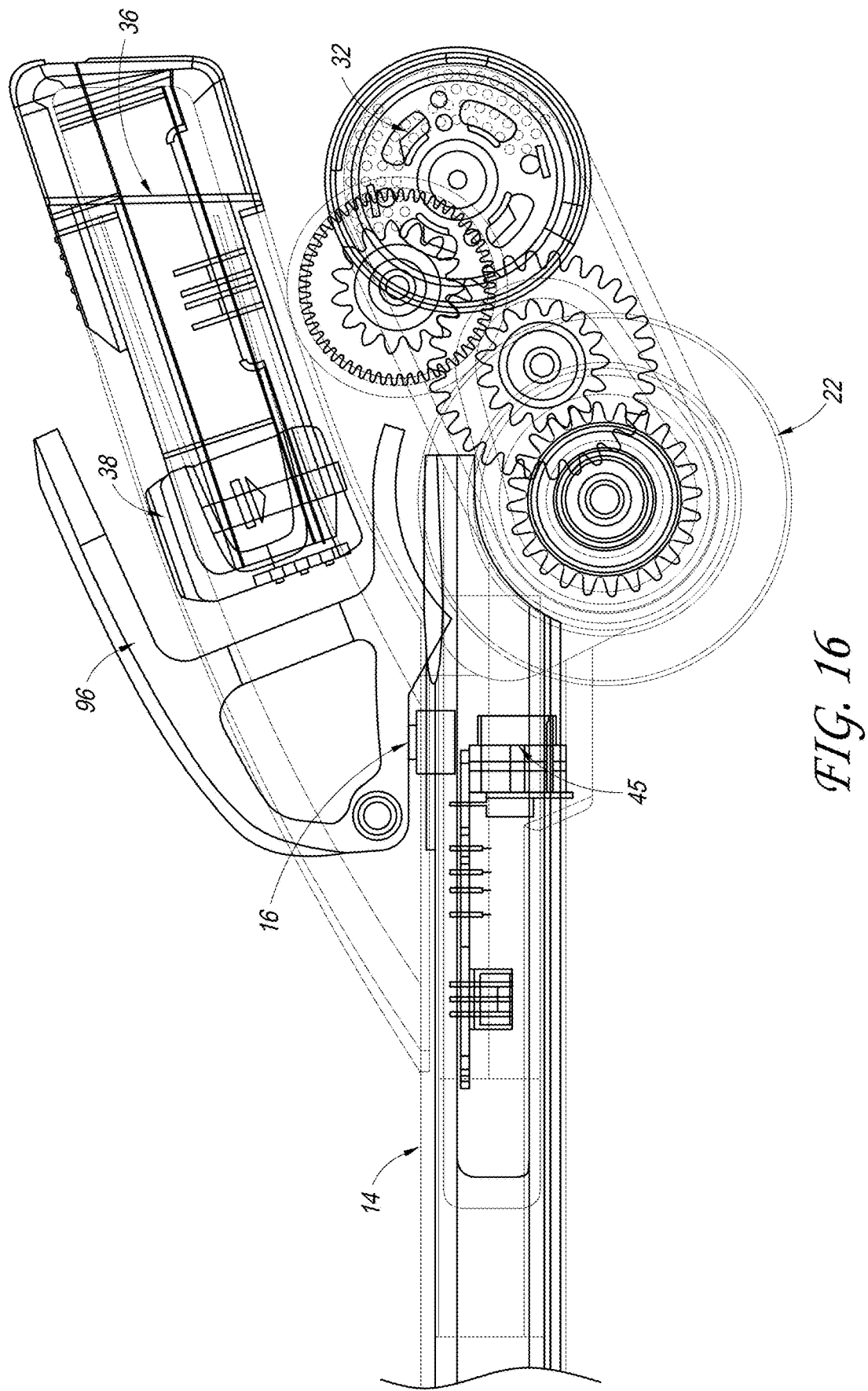
FIG. 16 is a cross-sectional side view of the drive assembly of FIGS. 10 and 11.

In some embodiments, the scooter 10 includes a sensor 14 (e.g., a pressure sensor). The sensor 14 can be in functional communication with the controller 45, such as is shown in FIG. 16. The sensor 14 can be positioned on any portion of the vehicle 10. For example, the sensor 14 can be on or integrated with the platform or support surface 34, the body 20, and/or the motor assembly 30, among other regions of the scooter 10. For example, as shown in FIGS. 7 and 15, the sensor 14 can be located on the support surface 34 beneath the grip 18. A signal from the pressure sensor 14 can be used to control how much power is supplied to the driving wheel 22 from the battery 36. In some embodiments, signals from the pressure sensor 14 can be used (e.g., by the controller 45) to detect shifts of the user. For example, the signals can indicate how far a user is pushing and/or leaning forward, backward, and/or sideways on various portions of the scooter 10. Accordingly, depending on the portion of the scooter 10 on which the user is pushing, the controller 45 can adjust the motor speed of the motor 32. This can, for example, allow some embodiments to aid the user in balancing, can compensate for weight shifts by the user, or otherwise aid the user in safely riding the scooter 10.

In some embodiments, signals from the sensor 14 can be used to control the speed of the motor 32. In some embodiments, the sensor 14 can be a variable input pressure sensor. For example, in some embodiments, the controller 45 can modify the speed of the motor 32 based on the amount of pressure that the user applies to the sensor 14. In some embodiments, the harder the user steps on the sensor 14 (e.g., the more pressure that the user applies to the sensor), the faster the motor speed, and the softer the user steps on the sensor 14 (e.g., the less pressure that the user applies to the sensor), the slower the motor speed.

In some embodiments, the scooter 10 is be configured to receive and interpret various inputs from a user or otherwise. For example, the sensor 14 is configured to transmit, and the controller 45 can be configured to interpret, signals based on the duration and/or number of times that the user engages (e.g., taps, touches, or otherwise contacts) the sensor 14. For example, the scooter 10 can be responsive to multiple taps by a user on the sensor 14. In some embodiments, the scooter 10 is configured to recognize taps that occur in succession and/or within a certain period, such as within less than or equal to approximately: 1 second, 2 seconds, 3 seconds, 4 seconds, or any other suitable time period or range of times. For example, in some embodiments, when the user taps the sensor 14 twice within at least about 2 seconds and/or less than or equal to about 5 seconds, signals from the sensor 14 cause the controller 45 to increase the motor speed, such as by a predetermined amount. In some embodiments, signals from the sensor 14 can be used to control the direction of rotation of the rear wheel or driving wheel 22. For example, in some embodiments, when the user taps the sensor 14 three times within at least about 3 seconds and/or less than or equal to about 6 seconds, signals from the sensor 14 can cause the controller 45 to slow the driving wheel 22 and/or to reverse the direction of rotation of the driving wheel 22. The sensor 14 and controller 45 can be configured to send any suitable signals (e.g., regarding motor speed, direction of travel, etc.) and to respond to those signals, respectively. In some embodiments, the user can customize the scooter 10 to respond to multiple taps or varying degrees of pressure in particular ways.

In some embodiments, the sensor 14 comprises a switch 16, such as a cut-off switch. In some embodiments, the switch 16 can be configured to turn the motor 32 on and/or to enable the motor 32 to drive the scooter 10 in response to actuation of the switch. In some embodiments, the switch 16 is configured to turn the motor 32 off in response to actuation of the switch 16. In certain implementations, the switch 16 is required to receive an input (e.g., pressure from a user's foot) before the scooter 10 can be driven.

In some embodiments, the handlebar assembly 24 can include a control mechanism. In some implementations, the control mechanism comprises a throttle assembly. The throttle assembly can be connected with the controller 45, such as with a wired or wireless connection. The throttle assembly can include a drive actuator, such as a lever, that can be toggled by the user. In response to actuation of the drive actuator, the throttle assembly can send a signal to the controller 45 to increase or decrease the speed of a motor 32, and thus increase or decrease the speed of the scooter 10. In some embodiments, the throttle assembly includes a brake actuator, such as a lever. In response to actuation of the brake actuator, the throttle assembly can send a signal to the controller 45 to activate a braking assembly to slow or stop the scooter 10. In some embodiments, the throttle comprises a button, switch, lever, or other actuator available to the hand of the user while the user operates the scooter 10. Activating (e.g., depressing) the button throttle can transmit a signal (e.g., an electric or RF signal) to the controller 45, which signals for power to be transferred from the battery to the electric motor 32, resulting in rotational power being transferred from the electric motor 32 to the driving wheel. In certain embodiments, the drive actuator comprises a hand lever mechanism, or other similar hand actuated mechanisms.

In some embodiments, the scooter 10 can include a display, such as an LCD, LED screen, or otherwise. The display can provide a visual indication of a characteristic of the scooter, such as battery level, speed, distance, direction, or other information. In some embodiments, the display indicates the amount of battery power remaining. The display may indicate the battery power as a digital percentage display, or as a color gradient (such as green, yellow, red), or with any other visual indicator. The display may be configured to indicate when the battery should be replaced and/or recharged, or the amount of time remaining until the battery is fully discharged.

Figure 8:
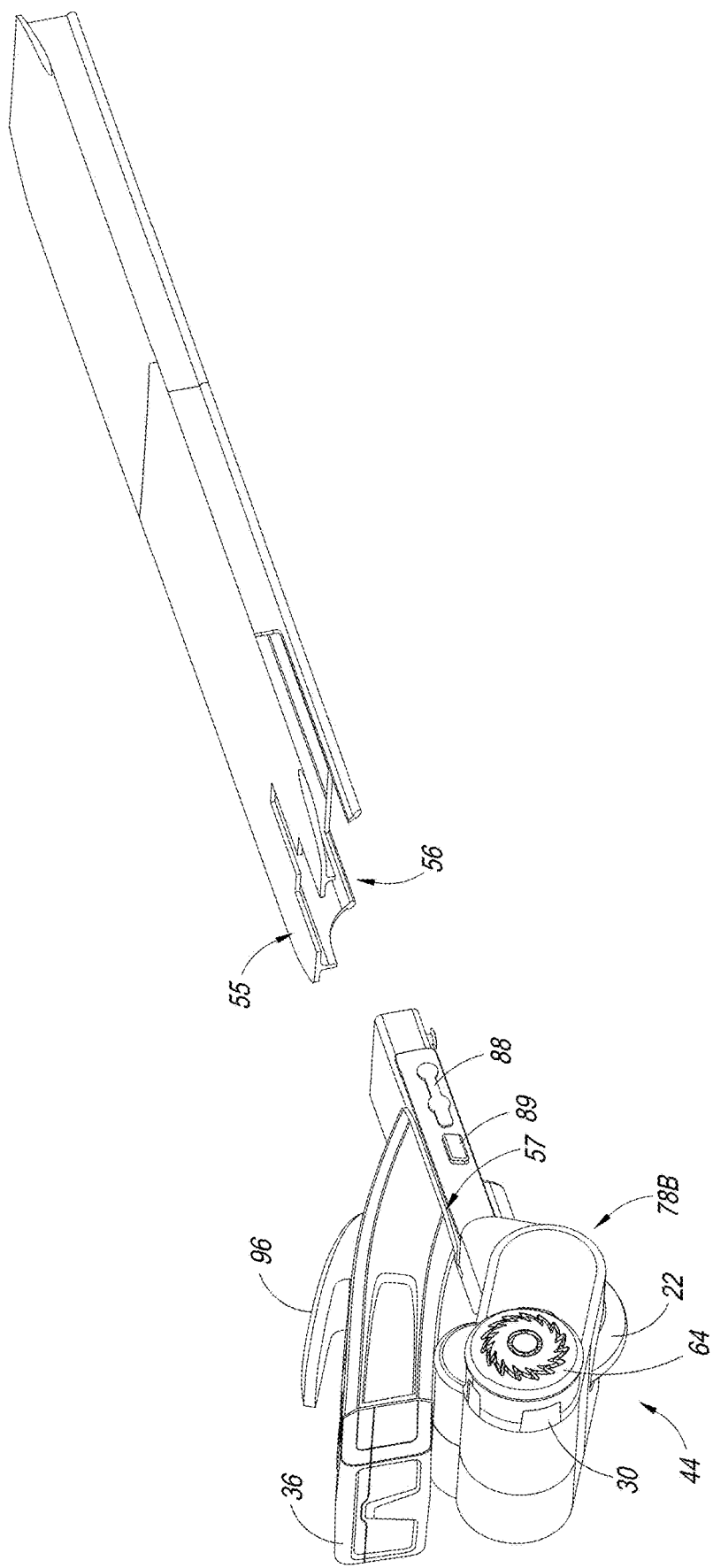
FIG. 8 is an exploded view of the portion shown in FIG. 7.
Figure 19B:
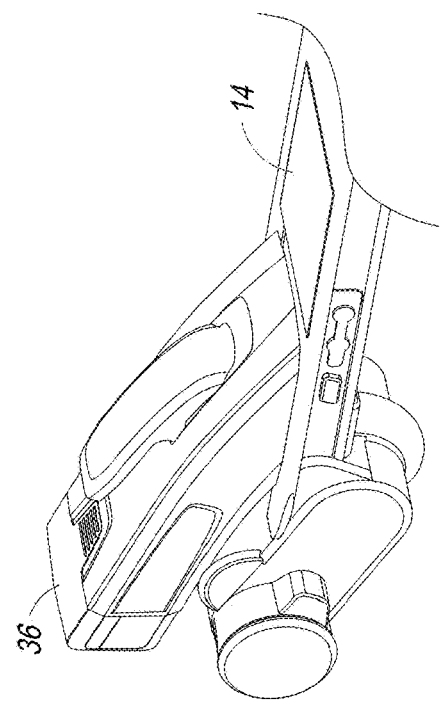
FIG. 19B is a perspective view of the rear portion of the scooter of FIG. 1 with the drive assembly attached to the body.
Figure 19A:
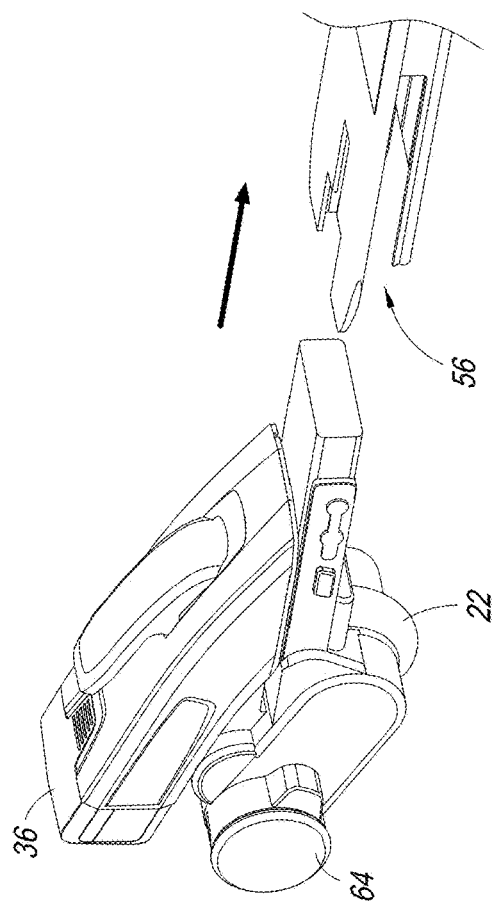
FIG. 19A is a perspective view of the rear portion of the scooter of FIG. 1 with the drive assembly in the course of being attached to the body.

In some embodiments, the scooter 10 includes a drive subsystem, such as a drive assembly 44. As illustrated, the drive assembly 44 can be positioned on a rear of the scooter 10. In some variants, the drive assembly 44 is located on a front of the scooter 10. The drive assembly 44 can be a separate and discrete assembly from the rest of the scooter 10. The drive assembly 44 can be attachable, insertable, replaceable, detachable, and/or removable from the body 20, support surface 34, and/or other suitable portion of the scooter 10. For example, as illustrated in FIGS. 8, 19A, and 19B, in some embodiments, the drive assembly 44 is insertable into and removable from the body 20 of the scooter 10.

As mentioned above, an attachable and detachable drive assembly 44 can enable the scooter 10 to be adapted for various uses. For example, in a situation in which a user is seeking more speed (e.g., for tricks or to arrive at a destination rapidly) a drive assembly 44 with a higher power motor can be attached to the scooter 10. In a situation in which a user is seeking increased endurance (e.g., for longer riding time and/or for travel to a far destination) a drive assembly 44 with a lower power motor can be attached to the scooter 10. Further, in a situation in which a user is seeking added torque (e.g., for off road use and/or for hill climbing) a drive assembly 44 with an appropriate transmission can be attached to the scooter 10. The drive assembly 44 can enable a user to adapt and/or customize the scooter 10.

Additionally, an attachable and detachable drive assembly 44 can facilitate maintenance, repair, and/or replacement of the driving mechanism separate from the rest of the scooter 10. For example, if the drive assembly 44 were to experience a failure, just the drive assembly 44 can be sent for repair, while the remainder of the scooter 10 can be retained by the user. A replacement drive assembly 44 can be attached to the scooter 10, thereby maintaining the user's ready access to transportation and/or avoiding an interruption of the user's transportation.

Figure 6:
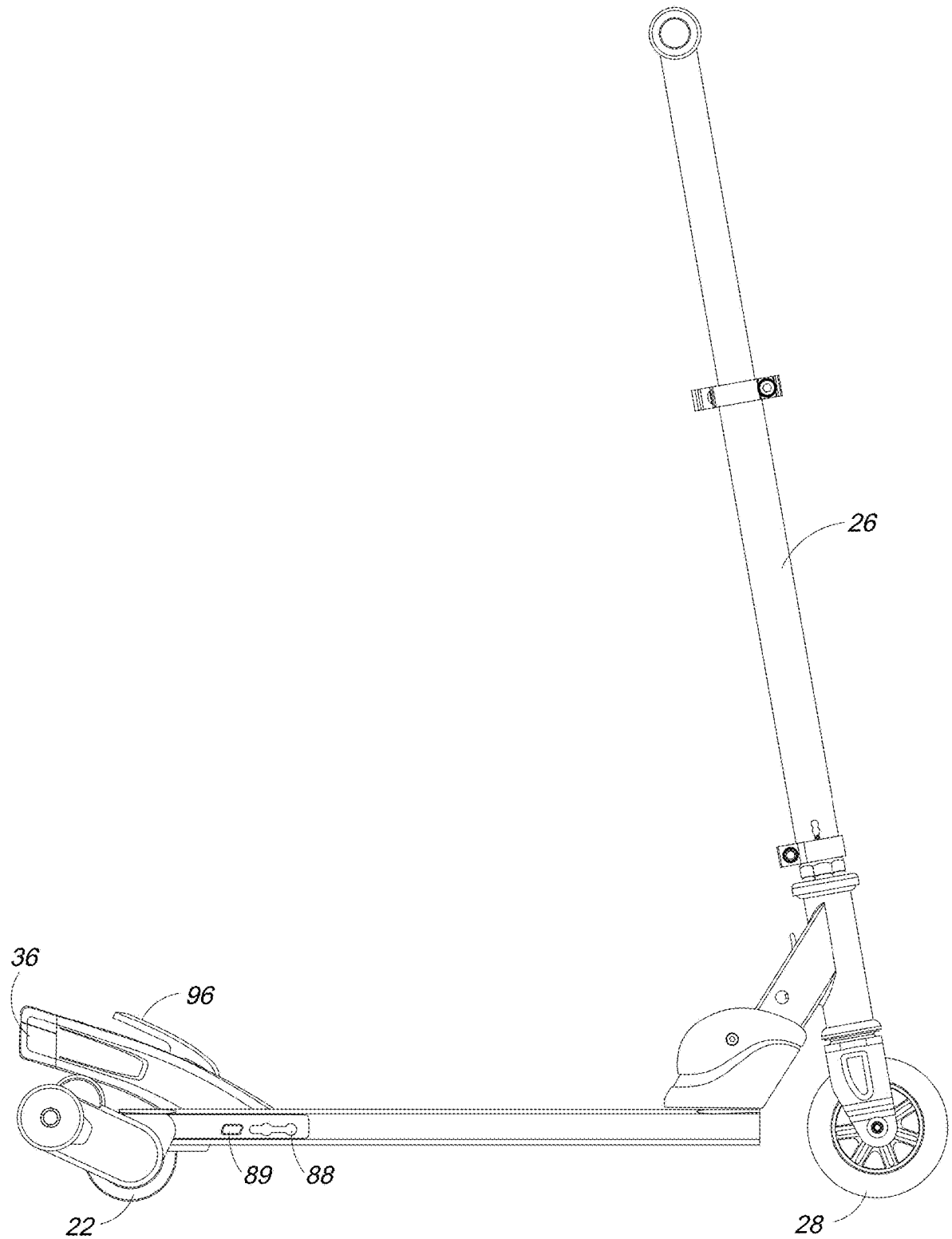
FIG. 6 is a right side view of the scooter of FIG. 1.

In some embodiments, the drive assembly 44 can engage with (e.g., slide into, snap into, etc.) the body 20. In some embodiments, the body 20 includes a cavity 56 configured to receive at least a portion of the drive assembly 44. In some embodiments, the drive assembly 44 includes a protruding portion configured to engage with the opening 56 in the body 20. In some embodiments, the cavity 56 is positioned beneath the support surface 34 of the body 20 and/or rearward of the front portion of the support surface 34. In some embodiments, the cavity 56 includes a window, slot, or opening on the side of the scooter 10 where a charging port 88 and/or a power switch 89 are visible and/or accessible to the user, such as is shown in FIG. 6. In some embodiments, a rear of the body 20 is hollow inside and/or is configured to receive a portion of the drive assembly 44. In some variants, the scooter 10 comprises an actuator (e.g., a lever) that engages or disengages a locking mechanism that secures the drive assembly 44 with the body 20.

Figure 4:
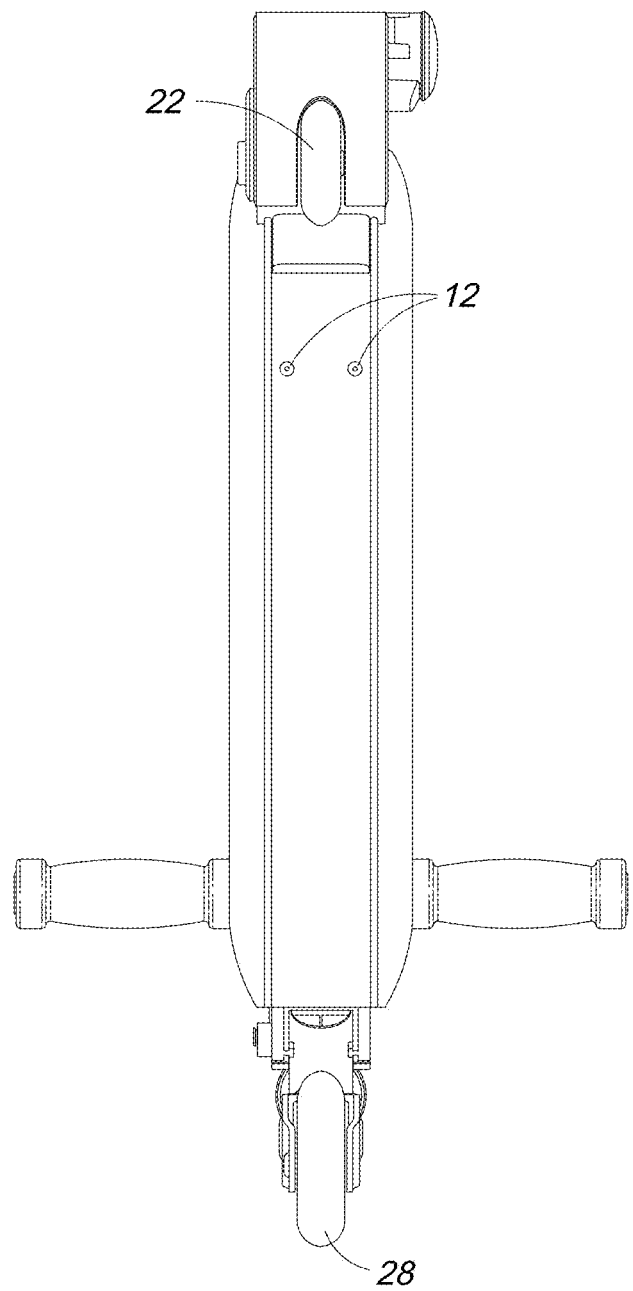
FIG. 4 is a bottom view of the scooter of FIG. 1.
Figure 21B:
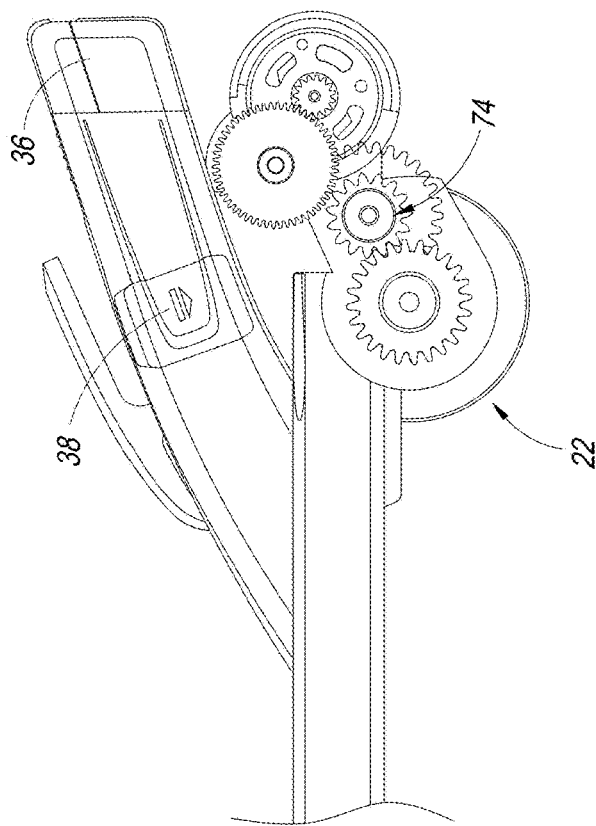
FIG. 21B is a side view of the rear portion of the scooter of FIG. 1.
Figure 21A:
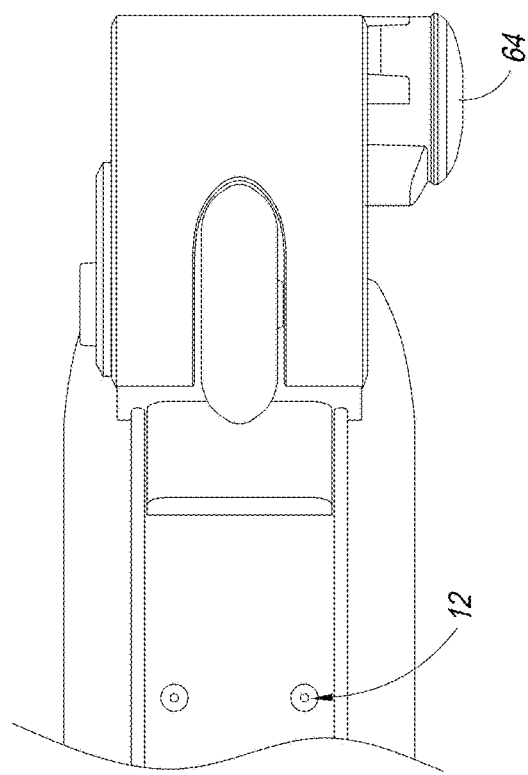
FIG. 21A is a bottom view of the rear portion of the scooter of FIG. 1.

As shown in FIGS. 7, 8, 10, and 11, the drive assembly 44 can include a gap 57. The gap 57 can be configured to receive a portion of the body 20 or support surface 34. For example, the gap 57 can receive a tongue 55 (e.g., a fin or protrusion) on the body 20. In some embodiments, the gap 57 can be positioned above the power switch 89 and charging port 88 on the drive assembly 44. In some embodiments, the drive assembly 44 is secured to the body 20 or support surface 34 by a snap-fit, screw-fit, and/or a press-fit arrangement. For example, as shown in FIGS. 4 and 21A, the drive assembly 44 can be connected to the body 20 using fasteners 12, such as screws.

In various implementations, the body 20 and the drive assembly 44 have corresponding mating features. For example, the tongue 55 of the body 20 can include a first mating feature and the drive assembly 44 can include a correspondingly shaped second mating feature. The mating features of the body 20 and the drive assembly 44 can engage together. This can aid in positioning (e.g., aligning) the drive assembly 44 relative to the body 20. In certain implementations, one of the first and second mating features comprises a pillar, projection, rib, or otherwise that is received in a corresponding slot, recess, groove, or otherwise of the other of the first and second mating features. For example, as illustrated in FIG. 8, the body 20 can include a stepped recess in the tongue 55 and the drive assembly 44 can include a projection (not shown) that is correspondingly shaped as and/or received in the stepped feature.

In some embodiments, the support surface 34 and the drive assembly 44 are configured to interface or engage. In some embodiments, the support surface 34 extends over at least a portion of the drive assembly 44 when the drive assembly 44 is engaged with the body 20 and/or support surface 34. In some embodiments, the support surface 34 extends above at least a portion of the rear wheel 22 of the scooter 10 when the drive assembly 44 is secured to the body 20 and/or support surface 34. In some embodiments, substantially the entirety of the support surface 34 is positioned lower than the battery 36. In some embodiments, the support surface 34 has a generally constant height and/or width along the longitudinal axis of the vehicle 10. In some embodiments, the height and/or width of the support surface 34 varies along the longitudinal axis of the vehicle 10.

The drive assembly 44 can include a driving wheel 22. The drive assembly 44 and a motor 32 (see FIG. 13) can operably be connected with the driving wheel 22. The driving wheel 22 can be a rear wheel of the scooter. The driving wheel 22 can be a front wheel of scooter. In certain embodiments, torque from the motor 32 is transmitted to the driving wheel 22 via a transmission, such as a gear set or gear assembly. In some embodiments, the drive assembly 44 can include a transmission assembly housing 78. As shown in FIGS. 7, 8, 10, and 11, the housing 78 can include first and second housing portions 78A, 78B.

Figure 11:
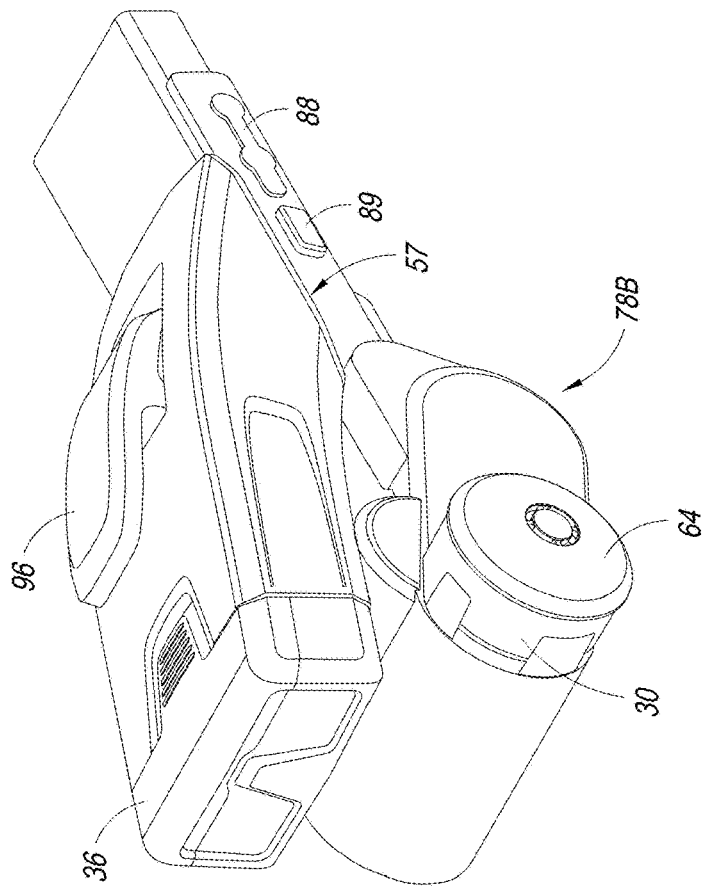
FIGS. 10 and 11 are perspective views of an embodiment of a drive assembly that can be used with the scooter of FIG. 1.
Figure 10:
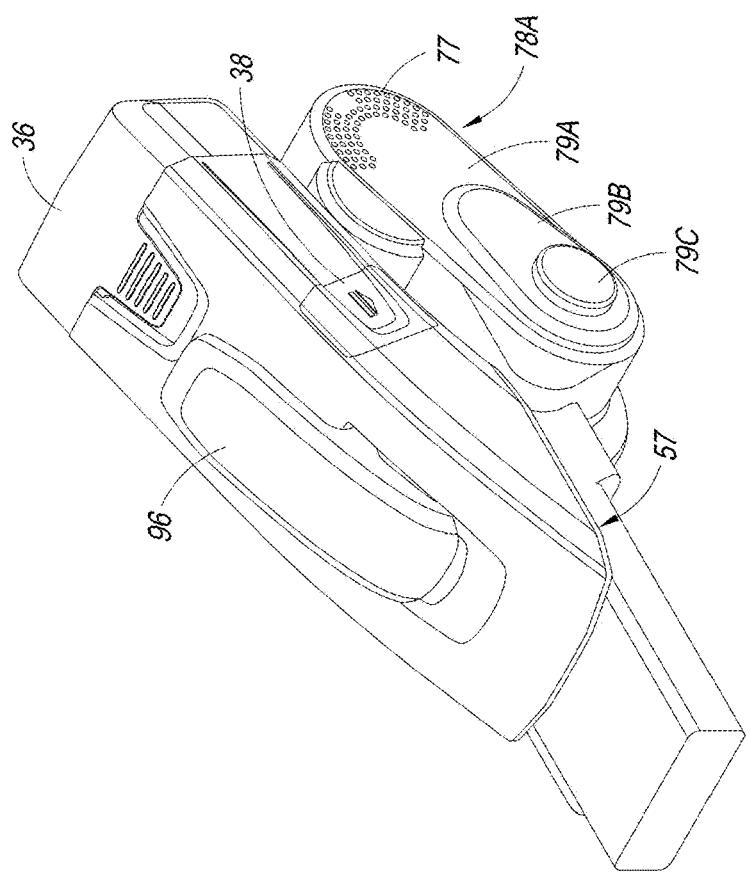
Figure 12:
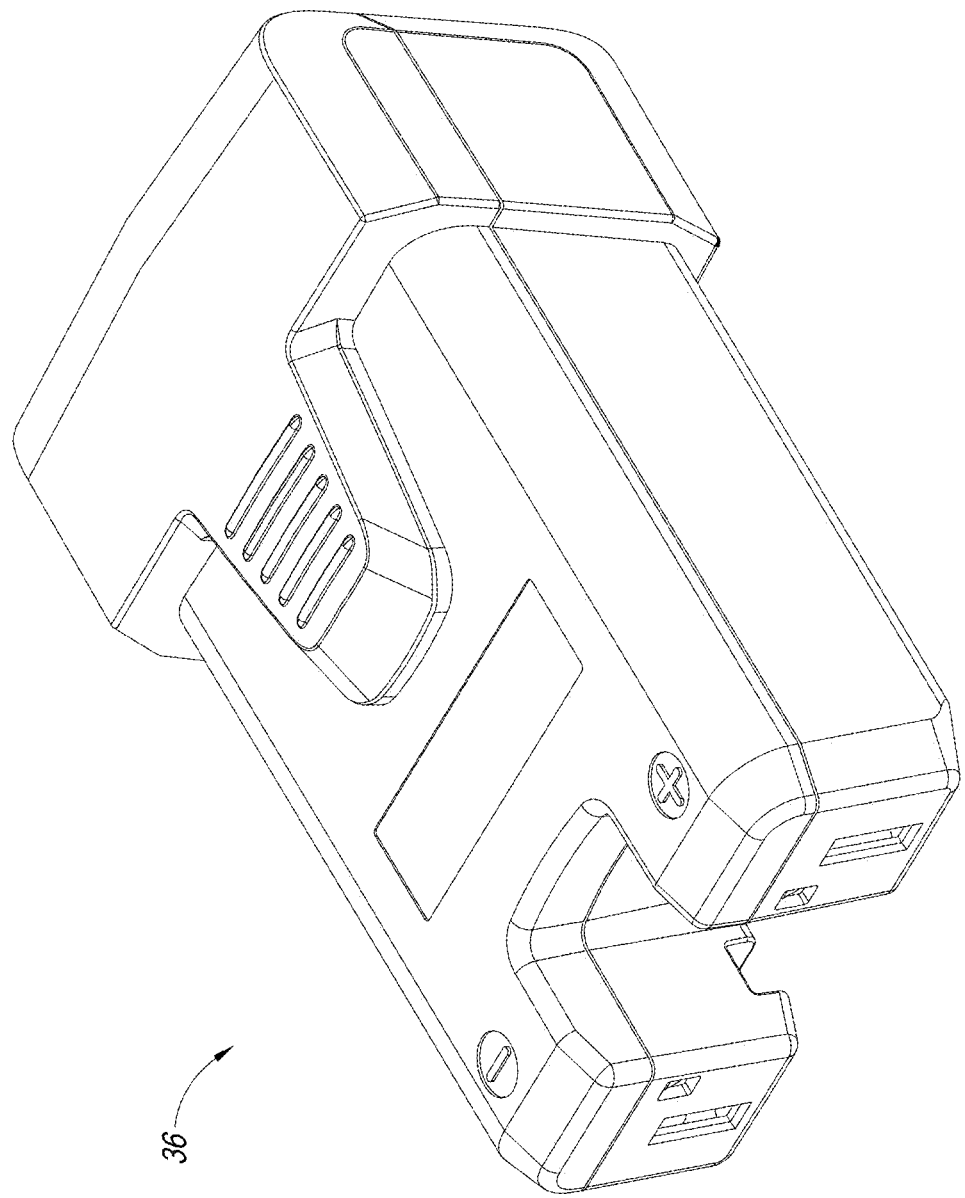
FIG. 12 is a perspective view of an embodiment of a battery that can be included in the drive assembly of FIGS. 10 and 11.

In some embodiments, the drive assembly 44 can include a power supply, such as a battery 36. In some variants, the battery 36 is configured to disconnect from the scooter 10. An example of the battery 36 disconnected from the scooter 10 is illustrated in FIG. 12. As shown in FIGS. 10 and 11, when connected with the scooter 10, in some embodiments, the battery 36 can be disposed above (e.g., directly above) at least a portion of the motor assembly 30. The battery 36 can be stored in a battery storage compartment 37. In some embodiments, the battery storage compartment 37 faces generally rearwardly and/or extends generally horizontally outwards from the scooter 10. The battery 36 can extend beyond (e.g., rearwardly beyond) the motor assembly 30. In some embodiments, the battery storage compartment 37 extends generally horizontally outwards from the scooter 10 over at least a portion of the motor assembly 30.

Figure 17:
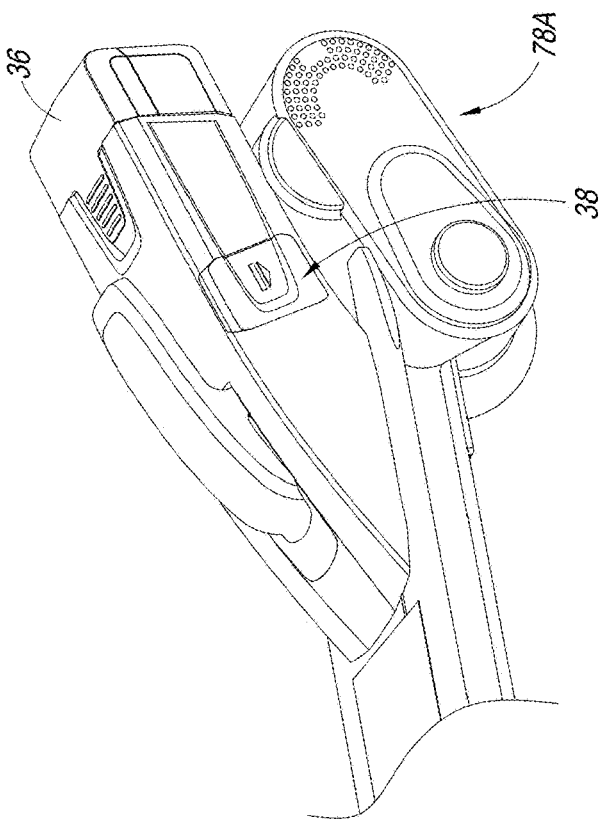
Figure 20B:
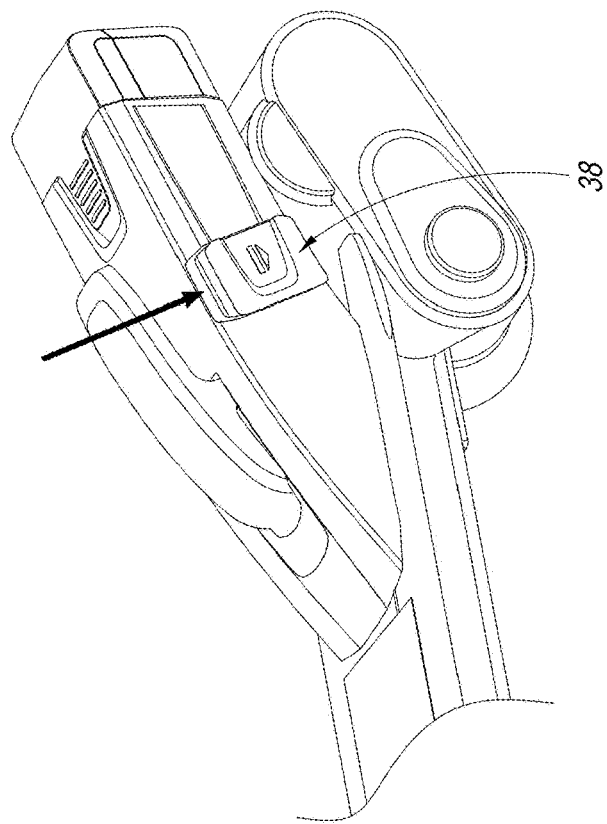
FIGS. 20A and 20B are additional perspective views of the rear portion of the scooter of FIG. 1 with a battery release in engaged and disengaged positions.
Figure 20A:
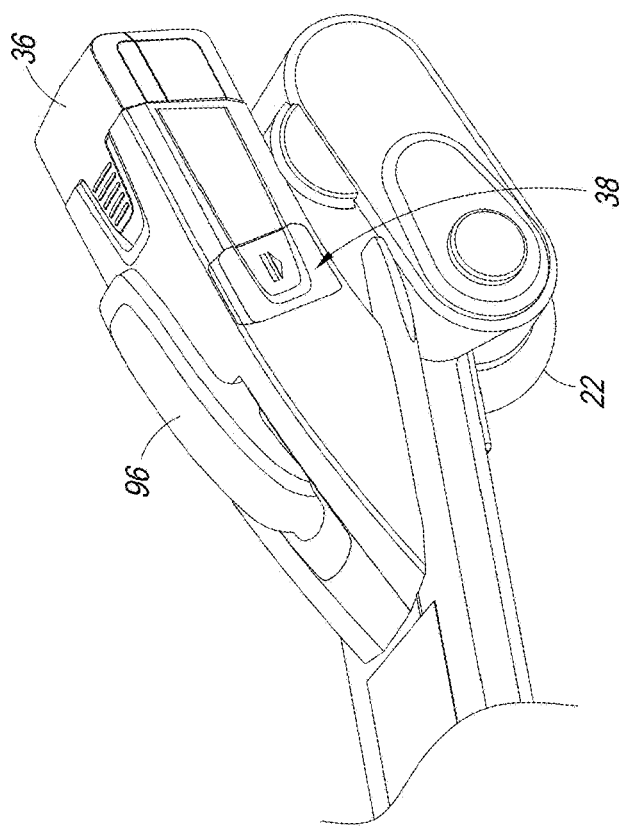

In some embodiments, the battery storage compartment 37 can include a locking mechanism 38, such as a latch, clip, or button, such as is shown in FIG. 17. The locking mechanism 38 can be released, such as by pressing an actuator of the locking mechanism 38. In some embodiments, the locking mechanism 38 can be slidable. For example, as illustrated in FIG. 20B, the locking mechanism 38 is released by being slid in a generally downward direction. In some embodiments, the locking mechanism 38 is released by being in a direction that is generally upward or to the left or the right. In certain variants, the locking mechanism 38 is released by being pushed inwards or pulled outwards relative to the motor 32. As illustrated in FIGS. 20A and 20B, in some embodiments, the locking mechanism 38 can be disposed on a lateral portion of the drive assembly 44. In some embodiments, the locking mechanism 38 can be located above the rear wheel 22 and forward of the battery 36, such as is shown in FIG. 21B. In some variants, the locking mechanism 38 can be positioned on one or both lateral sides of the drive assembly 44.

In some embodiments, the battery 36 is insertable, replaceable, and/or removable from the battery storage compartment 37 of the drive assembly 44. The battery 36 may include any type of battery, such as a lithium ion rechargeable battery. In some implementations, the battery 36 can have a discharge time of at least about 1.5 hours and/or less than or equal to about 2.5 hours. In some embodiments, the battery 36 can have a discharge time of at least approximately: 1 hour, 2 hours, 3 hours, 4 hours, 6 hours, 8 hours, or longer.

Figure 18:
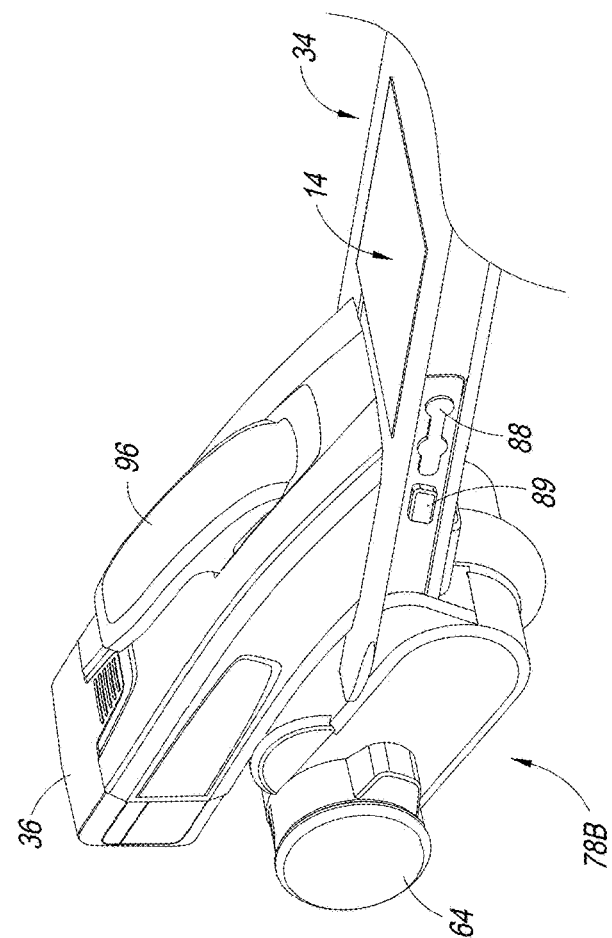
FIGS. 17 and 18 are perspective views of a rear portion of the scooter of FIG. 1.

In some embodiments, the drive assembly 44 can include a charging port 88. The charging port 88 can receive a plug to receive electrical power in order to allow the battery 36 to be charged. In some embodiments, a seal, such as a rubber boot, can cover the port 88 when not in use. In some embodiments, the charging port 88 allows the battery 36 to be charged without removal of the battery 36. In some embodiments, the charging port 88 can be positioned along a side of the support surface 34. In some embodiments, the charging port 88 can be positioned along a rear of the support surface 34. In some embodiments, the charging port 88 is positioned adjacent a power switch 89, such as is shown in FIG. 18. The charging port 88 can be positioned below the power switch 89 along a lateral side of the support surface 34. In some embodiments, activation of the power switch 89 can allow the battery 36 to supply power to the motor 32 of the motor assembly 30. In some embodiments, the battery 36 can supply power to the motor 32 through a physical connector, such as a power cable. The power cable can be coupled with the battery 36 via a charging port 88. The port 88 and/or the switch 89 can be illuminated. In some embodiments, the switch 89 can be activated by pressing the switch 89. In some embodiments, the switch 89 can be activated wirelessly, such as via Wi-Fi, Bluetooth®, mobile application, etc. For example, in some embodiments, the system includes a wired and/or wireless motor control.

As shown in FIG. 10, the first housing portion 78A can include a stepped configuration. For example, the first housing portion 78A can include a first stepped region 79A, a second stepped region 79B, and a third stepped region 79C. The first, second, and third stepped regions 79A, 79B, 79C can have respective outer surfaces that are laterally offset (e.g., non-coplanar) from each other. In some embodiments, the first stepped region 79A can have a vent portion 77. The vent portion 77 can include one or more apertures. The apertures can allow airflow from ambient to the motor 32 for cooling. In some embodiments, the apertures at least partially surround an end of the motor 32 to allow airflow to directly contact the motor 32 for cooling.

Figure 14B:
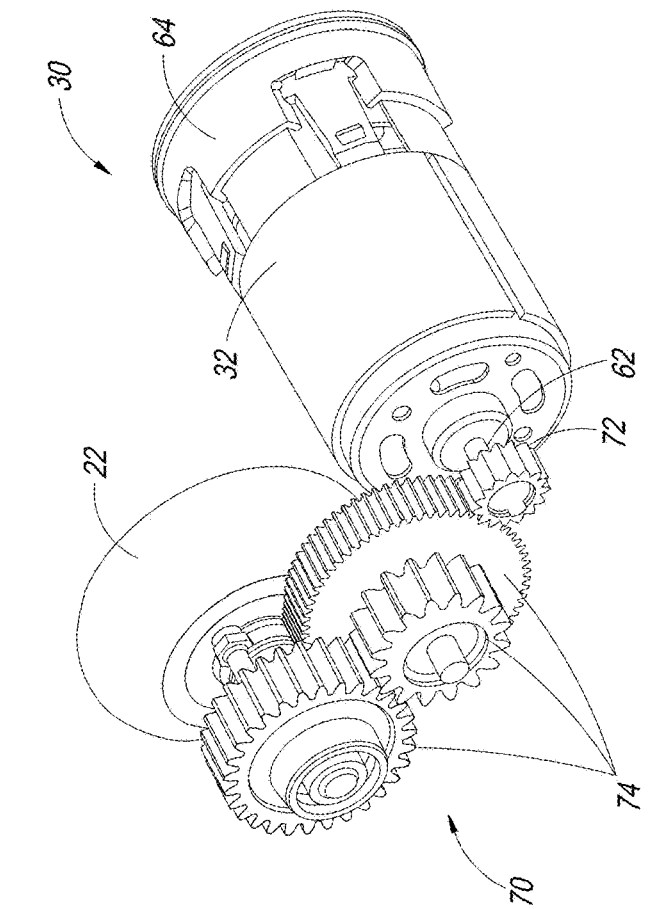
FIGS. 14A and 14B are perspective views of another embodiment of a transmission that can be included in the drive assembly of FIGS. 10 and 11.
Figure 14A:
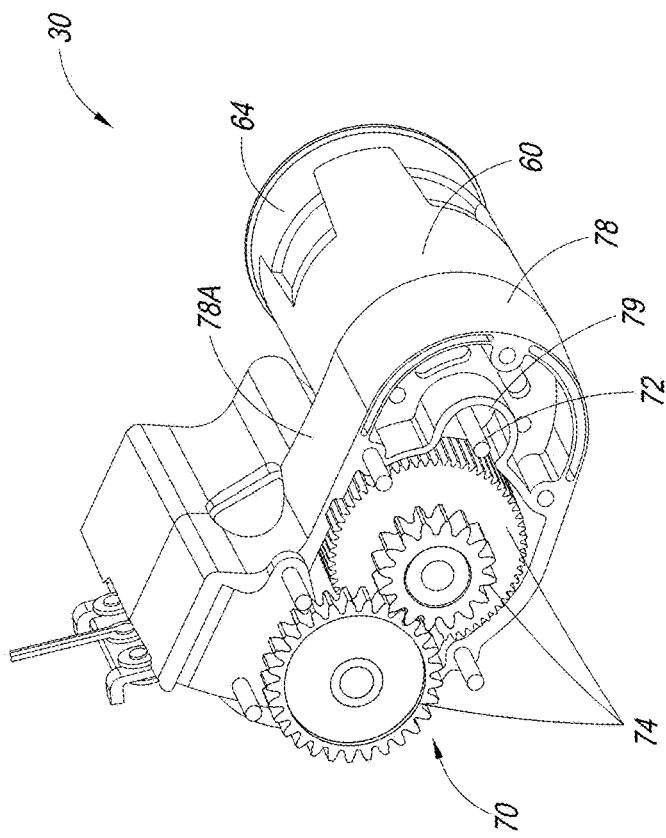

As shown in FIGS. 13, 14A, and 14B, the motor assembly 30 can include a motor 32 and a drive shaft 62. The drive shaft 62 can extend outwardly from a side of the motor. The drive shaft 62 can be coupled to a transmission assembly 70. The transmission assembly 70 can include a gear transmission configured to transmit power from the motor 32 to the driving wheel 22. In some embodiments, the transmission assembly 70 can include a plurality of gears. The plurality of gears can include a driving gear 72 and at least one driven gear 74. In some embodiments, as shown in FIG. 14B, the plurality of gears can include at least three driven gears 74. In some embodiments, the plurality of gears can include one, two, three, four, five, six, seven, and/or eight or more driven gears. For example, as shown in FIG. 13, the plurality of gears can include four driven gears. The plurality of gears can include various types of gear arrangements. For example, the plurality of gears can include spur gears, double spur gears and/or worm gears, among other gear arrangements. In some embodiments, the transmission assembly 70 comprises and/or acts as a gear reduction. This can allow the motor to drive the driving wheel 22 at a slower speed than the speed of the motor 32. As discussed above, the drive shaft 62 can engage with the driving gear 72 while the motor 32 is operated.

The plurality of gears can be at least partially surrounded by and/or enclosed within the transmission assembly housing 78. The transmission assembly housing 78 can protect the transmission assembly from dirt, rocks, and/or other potentially harmful substances that can disrupt the transmission assembly during operation. In some embodiments, the transmission assembly housing 78 at least partially surrounds the driving wheel 22. The transmission assembly housing 78 can include a recess and/or a slot to receive the transmission assembly 70. As previously mentioned, the transmission assembly housing 78 can include a first housing portion 78A and a second housing portion 78B. In some embodiments, the first housing portion 78A includes the recess and/or a slot 79 to receive the transmission assembly 70. The second housing portion 78B can connect to the first transmission assembly portion 78A to enclose the transmission assembly 70.

In some embodiments, the drive shaft 62 can be engaged and/or in axial alignment with the driving gear 72. In some embodiments, the drive shaft 62 is offset from the driving gear 72. In some embodiments, the motor 32 can spin the drive shaft 62. In some embodiments, this causes the driving gear 72 to spin at about the same speed as the drive shaft 62. Through the gear reduction, the driving gear 72 can cause at least one driven gear 74 to rotate a driving wheel shaft 76, which in turn causes the driving wheel 22 to spin. In some embodiments, the driving gear 72 is offset from the motor 32 and the diameter of the driving gear 72 can be smaller than at least one of the driven gears 74 of the transmission assembly 70. In some variants, the motor 32 can drive the driving wheel 22 at higher speeds and/or using less power (e.g., compared to certain variants without the gears). In some implementations, the driving gear 72, having a smaller diameter than at least one of the driven gears 74, causes the driving wheel 22 to rotate slower than the driving gear 72 and/or the drive shaft 62 of the motor assembly 30. The transmission of power from the motor assembly 30 to the driving wheel 22 can convert higher motor speeds to a slower driving wheel speed and/or can increase torque. The increase in torque applied by the motor 30 can allow the driving wheel 22 to be driven more efficiently, to facilitate gripping the ground, etc. In some embodiments, the ratio of the outside diameter of the driving gear 72 (e.g., a gear connected to the drive shaft 62) to the diameter of at least one of the driven gears 74 (e.g., a gear connected to the driving wheel shaft 76) is at least about: 2.0, 2.5, 3.0, 3.5, 4.0, 4.5, 5.0, 5.5, 6.0, 6.5, 7.0, 7.5, 8.0, ratios between the aforementioned ratios, or other ratios.

As illustrated in FIG. 13, the motor assembly 30 can include a motor housing 60. The motor housing 60 can surround at least a portion of the motor 32 and can be positioned above at least a portion of the driving wheel 22. For example, the motor 32 can slide into and/or be secured within the motor housing 60. In some embodiments, the motor housing 60 includes a cap 64 that can connect to the motor housing 60 to enclose the motor 30. The cap 64 can be connected to the motor housing 60 by a snap-fit, screw-fit, press-fit, and/or other suitable arrangement.

Figure 2:
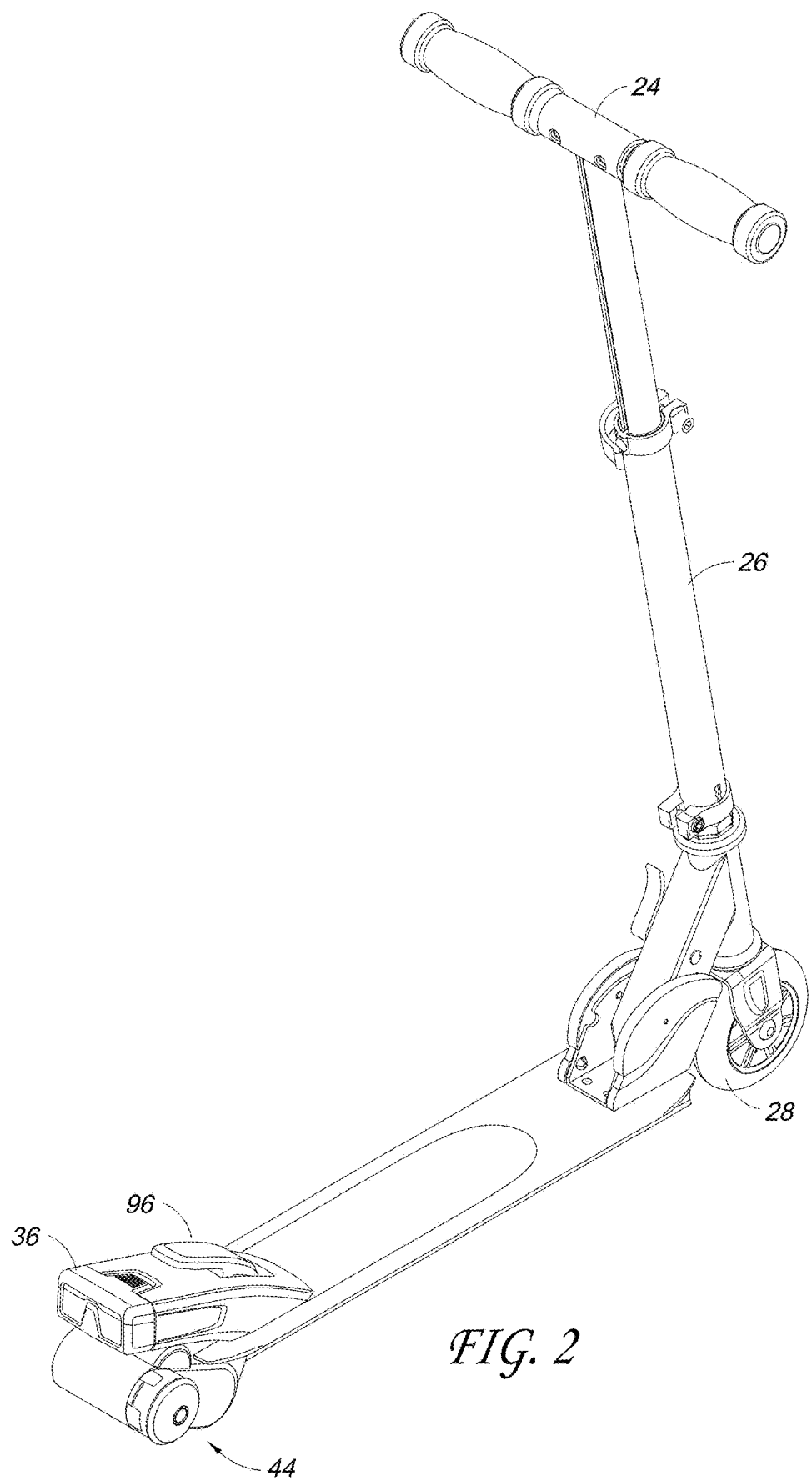
FIG. 2 is another perspective view of the scooter of FIG. 1.

Various embodiments of the scooter have a brake mechanism 96. In some embodiments, the drive assembly 44 includes a brake mechanism 96. In some embodiments, the brake mechanism 96 is positioned on other portions of the scooter 10 such as the body 20. The brake mechanism 96 may be in the form of a lever, as shown in FIGS. 1, 2, and 10. The brake mechanism 96 can be activated by a user's foot. In some implementations, the brake mechanism 96 applies pressure to the rear wheel 22 and results in a braking force due to friction between the rear wheel 22 and the brake mechanism 96. The brake mechanism 96 is integral to (e.g., part of) the drive assembly 44, or can be a separate component coupled with other components of the drive assembly 44. In some embodiments, the brake mechanism 96 comprises a rear end that is configured to engage with the rear wheel 22 and/or a front end that is configured to engage with a stop structure. The brake mechanism 96 can be biased by a biasing member, such as a spring. For example, the rear end of the brake mechanism 96 can be biased away from the rear wheel 22 and/or the front end of the brake mechanism 96 can be biased into engagement with a stop structure. In some embodiments, the brake mechanism 96 can extend rearwardly from the body 20 of the scooter 10 and can extend over at least a portion of the rear wheel 22.

FIGS. 22A-22C

Figure 22A:
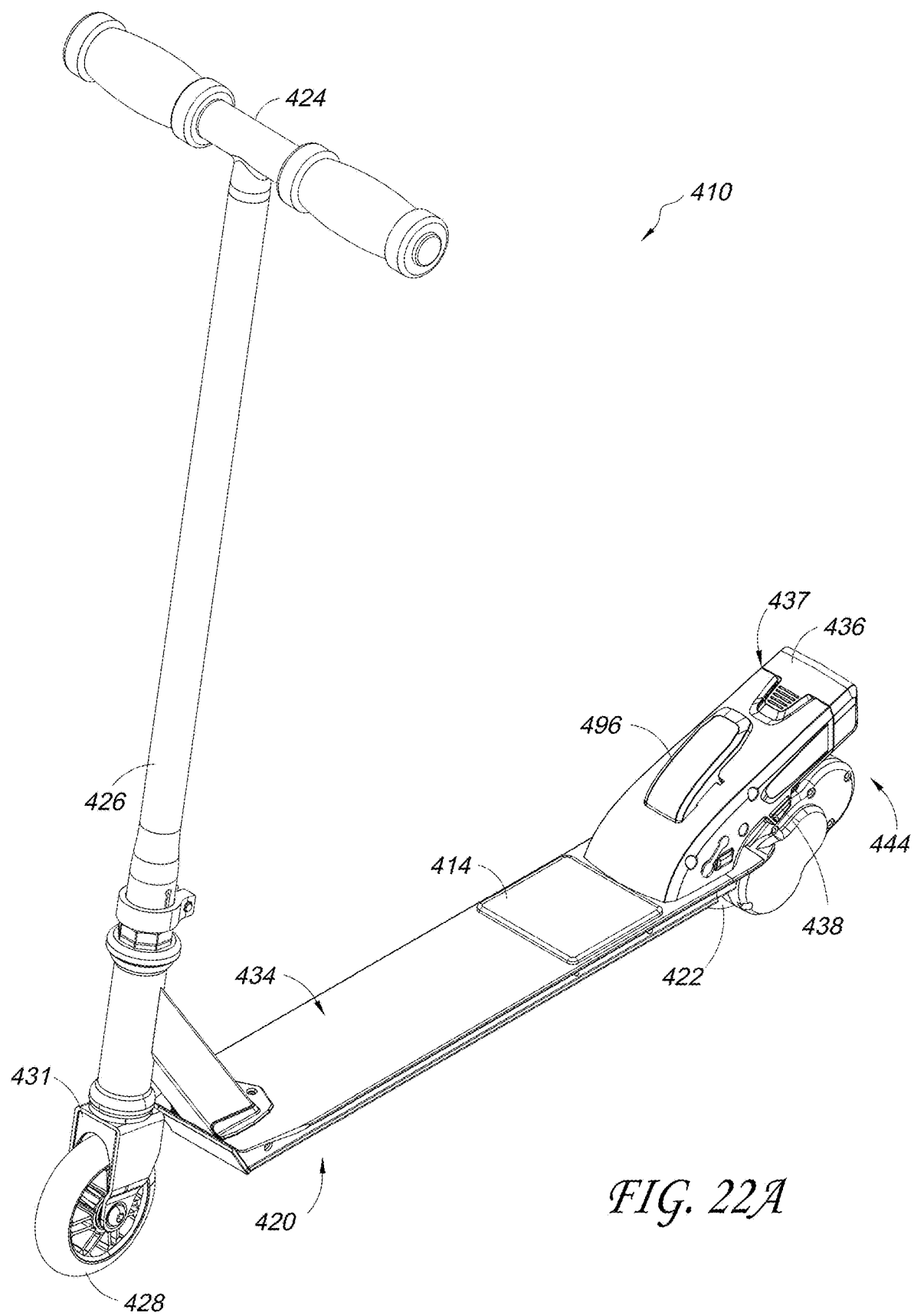
FIG. 22A is a perspective view of another embodiment of a personal mobility vehicle, namely a scooter.
Figure 22C:
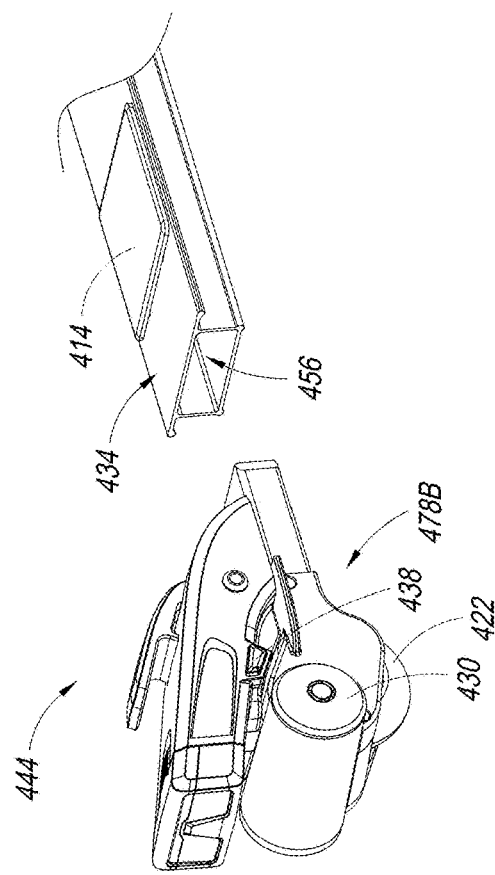
FIGS. 22B and 22C are perspective views of the rear portion of the scooter of FIG. 22A with the drive assembly in the course of being attached to the body.
Figure 22B:
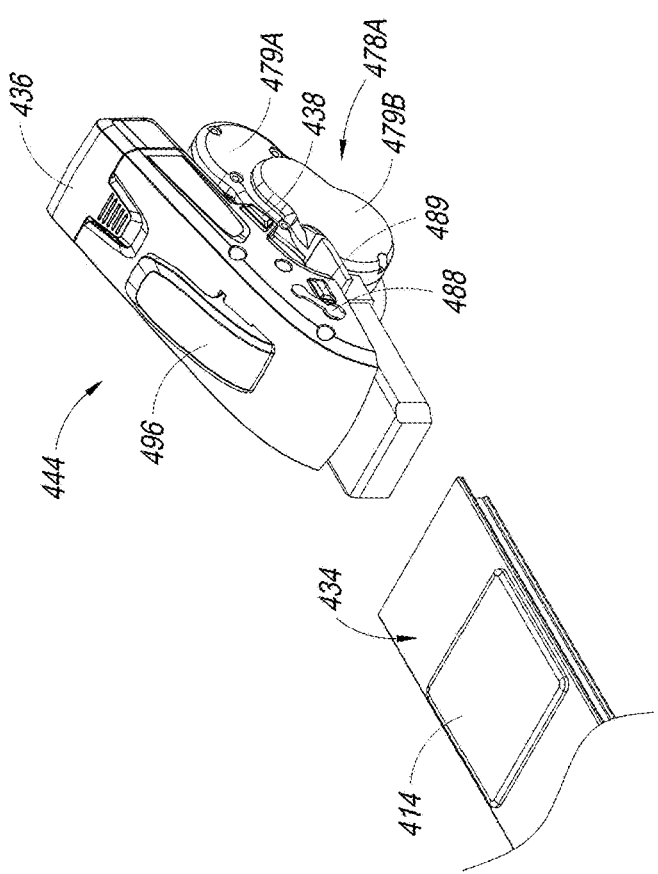
Figure 23:
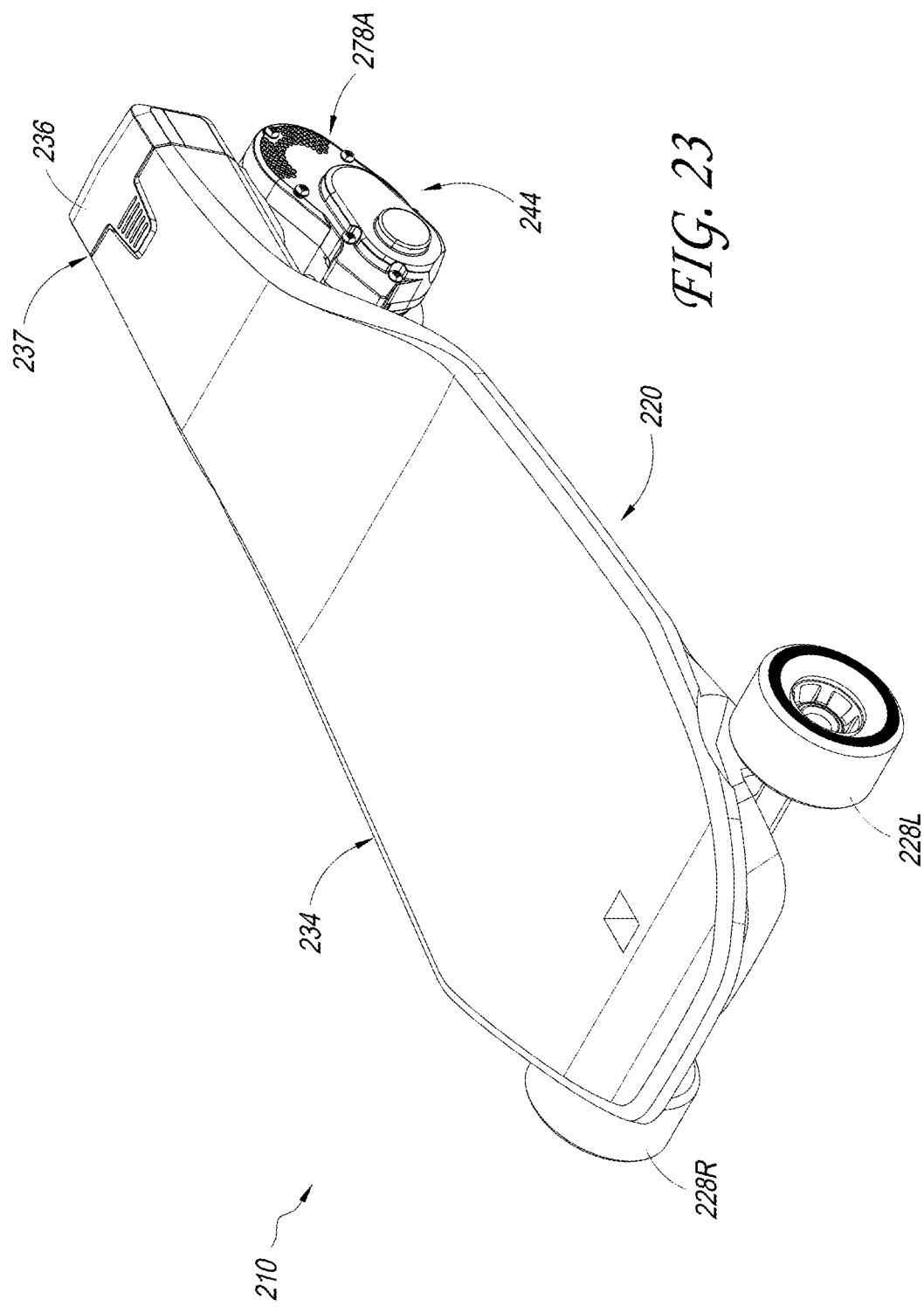
FIG. 23 is a perspective view of another embodiment of a personal mobility vehicle, namely a wheeled board.

FIGS. 22A-22C illustrate another embodiment of a powered personal mobility vehicle, such as a scooter 410. The scooter 410 can include any of the features described above and the scooter 10 can include any of the features described below. The scooter 410 is similar to the scooter 10 discussed above in many aspects. As shown in FIGS. 22A-22C, the scooter 410 can include a body 420, a rotatable shaft 426, a handlebar assembly 424, a front wheel 428, a rear wheel 422, a sensor 414, and a drive assembly 444, which can be similar to the body, sensor, and drive assembly discussed above in connection with the scooter 10. The scooter 410 can include any one, or any combination, of the features of the scooter 10. Likewise, the scooter 10 can include any of the features of the scooter 410, such as the sensor 414 and drive assembly 444 arrangements discussed below.

For example, in some embodiments, the body 420 includes a platform or support surface 434. In some embodiments, the sensor 414 (e.g., the sensor housing) is visible from the exterior of the scooter 410. For example, in some embodiments, as illustrated in FIG. 22C, a portion of the sensor 414 extends above the platform or support surface 434. In some embodiments, the sensor 414 is disposed in a recess in the platform 434.

The scooter 410 can include a folding assembly. The folding assembly can enable the handlebar assembly 424 to be foldable or rotatable relative to the platform 434. In some variants, as illustrated in FIG. 22A, the vertical position of the handlebar assembly 424 relative to the platform 434 is fixed. In some embodiments, the height of the handlebar assembly 424 is adjustable. In some embodiments, the height of the handlebar assembly 424 is fixed.

As shown in FIGS. 22B and 22C, the drive assembly 444 can include a transmission assembly housing with first and second housing portions 478A, 478B. The first housing portion 478A can include a stepped configuration. In some embodiments, the first housing portion 478A includes a plurality (e.g., two) stepped regions. For example, the first housing portion 478A can include a first stepped region 479A and a second stepped region 479B. The first and second stepped regions 479A, 479B can have respective outer surfaces that are laterally offset (e.g., non-coplanar) from each other. In some embodiments, as illustrated, the first stepped region 479A does not include a vent portion having a plurality of apertures.

In some embodiments, the drive assembly 444 can include a power supply, such as a battery 436. The battery 436 can be configured to disconnect from the scooter 410. The battery 436 can be removably stored in a battery storage compartment 437. In some variants, the battery storage compartment 437 can include a locking mechanism 438 having more than one actuator configured to release the battery 436 when actuated. For example, as illustrated in FIGS. 22B and 22C, the locking mechanism 438 can include a first actuator 438 on a first lateral side of the drive assembly 444 and a second actuator 438 on the opposite lateral side of the drive assembly 444.

FIGS. 23-42

FIGS. 23-42 illustrate another embodiment of a powered personal mobility vehicle, such as a wheeled board 210. The board 210 can include any of the features described above and the scooter 10 can include any of the features described below. The board 210 is similar to the scooter 10 discussed above in many aspects. As shown in FIGS. 23-31, the board 210 can include a body 220, a sensor 214, and a drive assembly 244, which can be similar to the body, sensor, and drive assembly discussed above in connection with the scooter 10. The board 210 can include any one, or any combination, of the features of the scooter 10. Likewise, the scooter 10 can include any of the features of the board 210, such as the steering system discussed below.

In some embodiments, the body 220 includes a platform or support surface 234. As previously discussed, in some embodiments, the vehicle 210 can include a plurality of wheels, including front wheels 228L, 228R and at least the driving wheel 222. The driving wheel 222 can be a rear wheel. In some embodiments, the vehicle 210 can have more than one rear wheel 222 (e.g., two rear wheels). In some embodiments, the front wheels 228L, 228R are the same size as the driving wheel or rear wheel 222. In some embodiments, the front wheels 228L, 228R can have diameters that are greater than the driving wheel 222. In some embodiments, the front wheels 228L, 228R have diameters that are less than the driving wheel 222. In some embodiments, the vehicle 210 has two or more rear wheels.

In some embodiments, the board 210 includes a personal mobility system such as a drive assembly 244. In some embodiments, the drive assembly 244 is insertable, replaceable, detachable, and/or removable from the body 220, support surface 234, and/or other suitable portion of the board 210. In some embodiments, the drive assembly 244 is configured to contact, or interface with, at least a portion of the body 220 or support surface 234 of the board 210. For example, the drive assembly 244 can connect to a bottom surface of the body 220. In some embodiments, the drive assembly 244 is secured to the body 220 by a snap-fit, screw-fit, press-fit, and/or other suitable arrangement.

Figure 27:
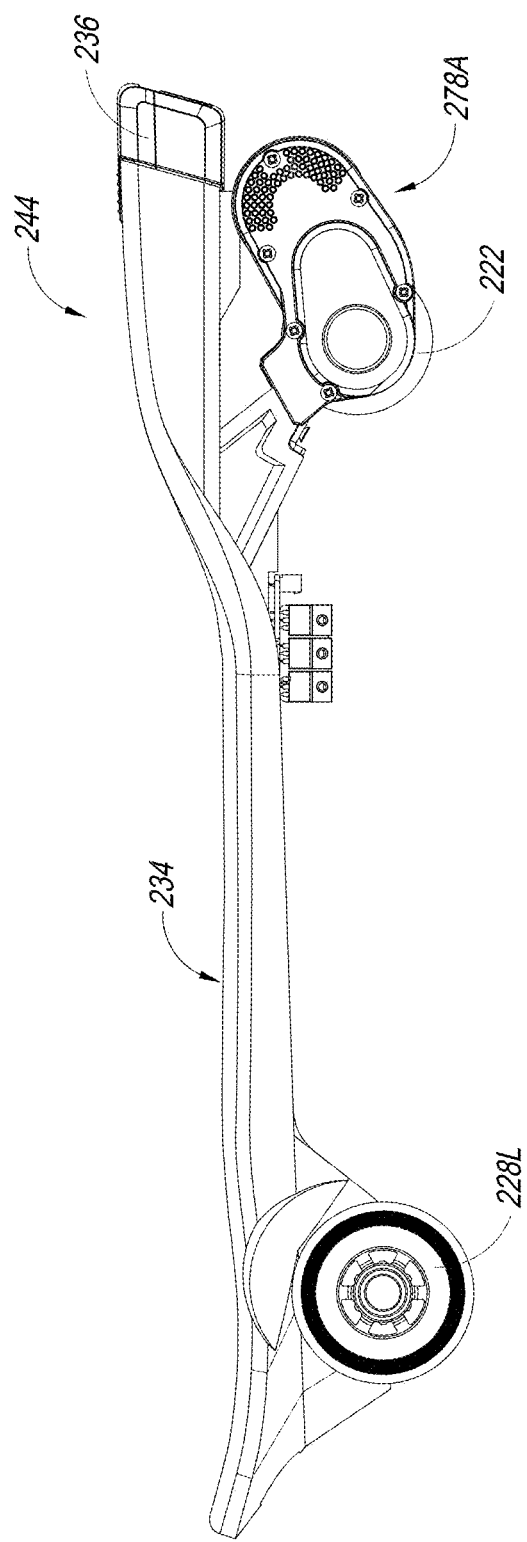
FIG. 27 is a left side view of the wheeled board of FIG. 23.
Figure 28:
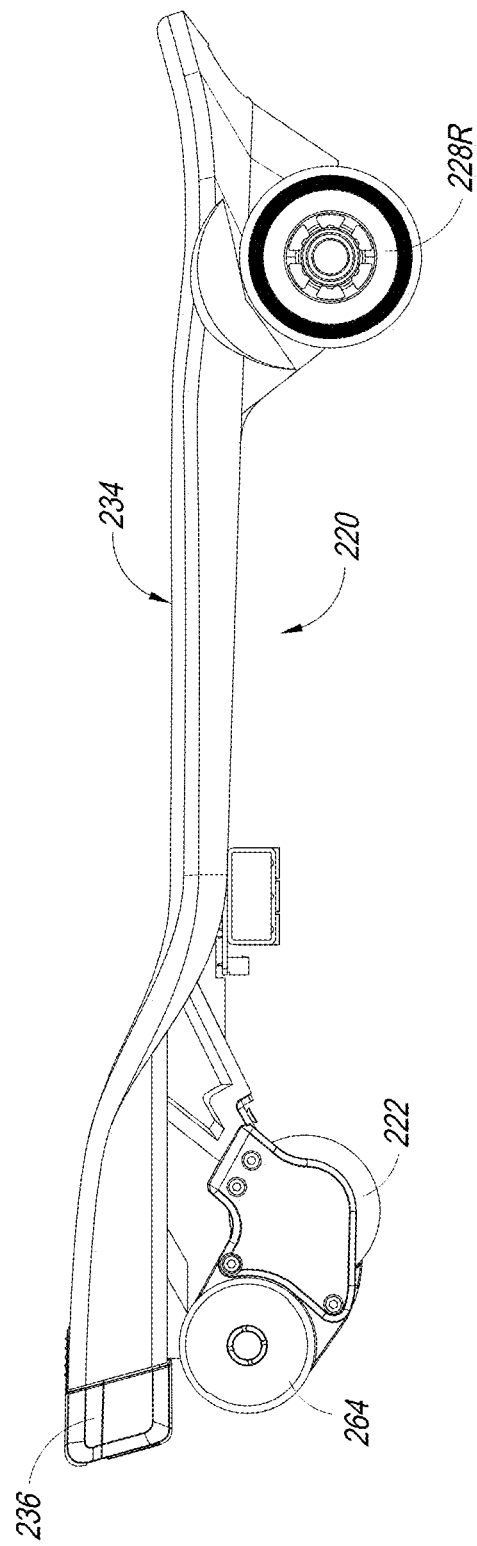
FIG. 28 is a right side view of the wheeled board of FIG. 23.
Figure 29:
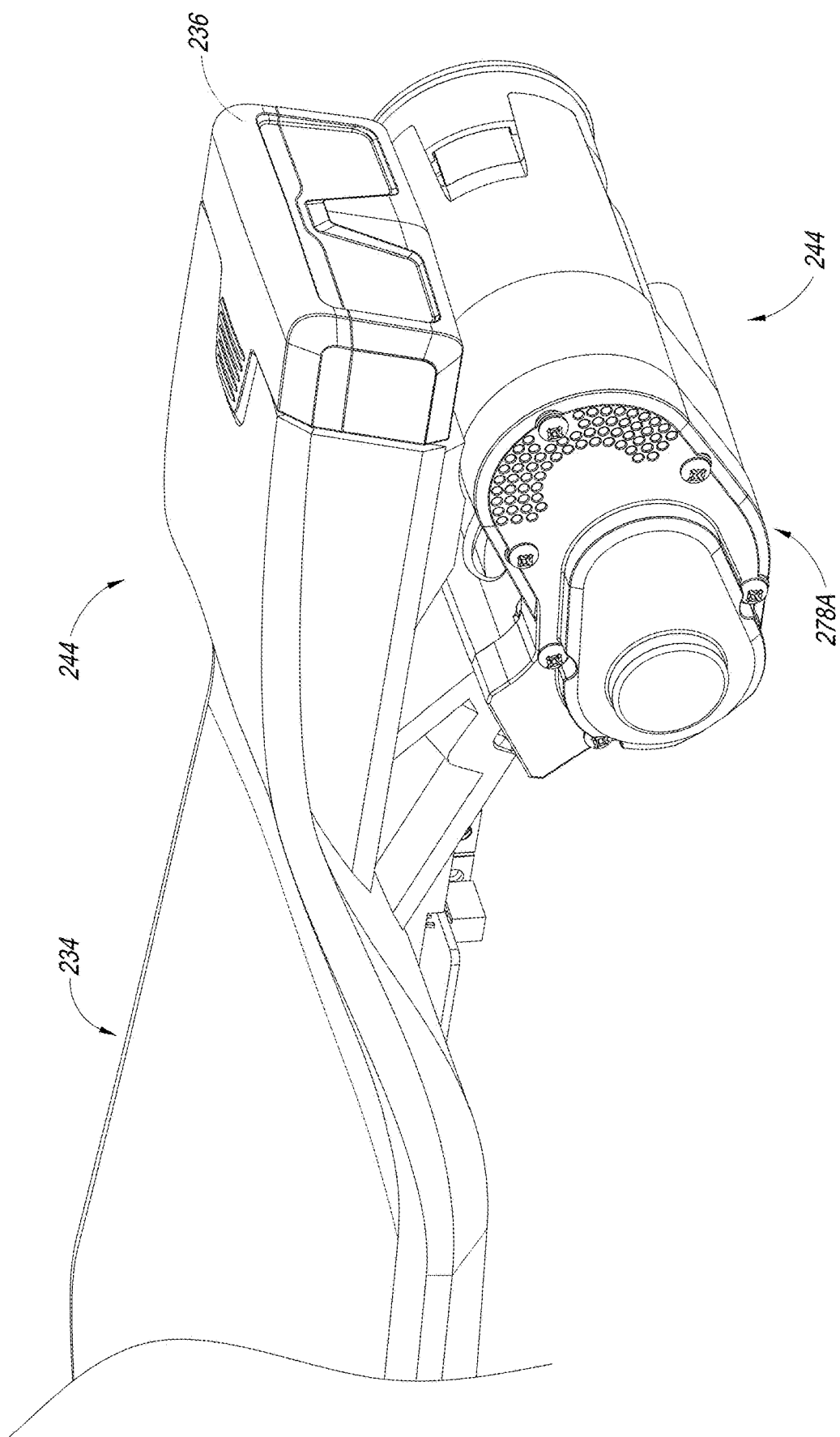
FIG. 29 is a perspective view of a rear portion of the wheeled board of FIG. 23.
Figure 30:
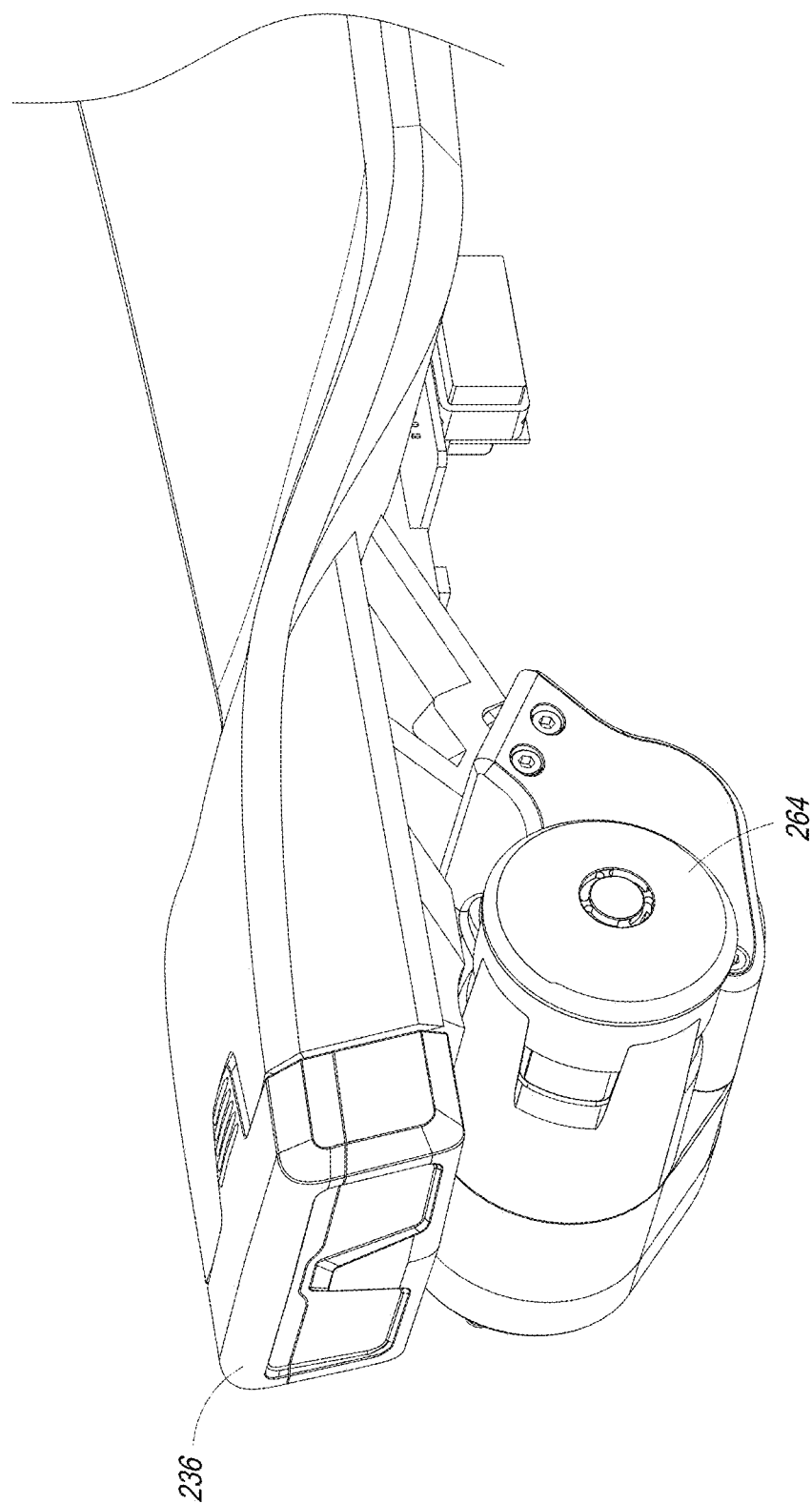
FIGS. 30-32 are additional perspective views of the rear portion of the wheeled board of FIG. 23.
Figure 31:
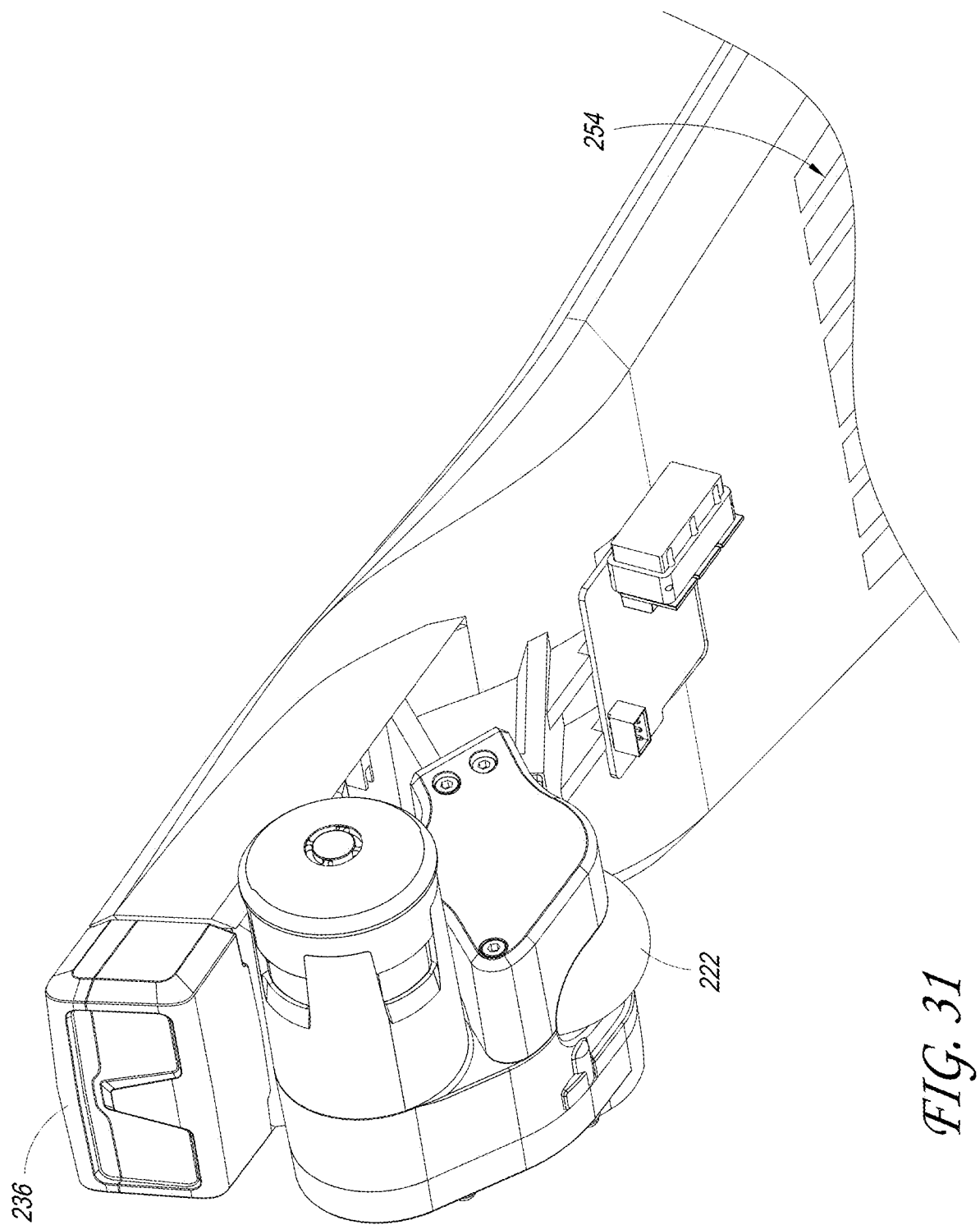
Figure 32:
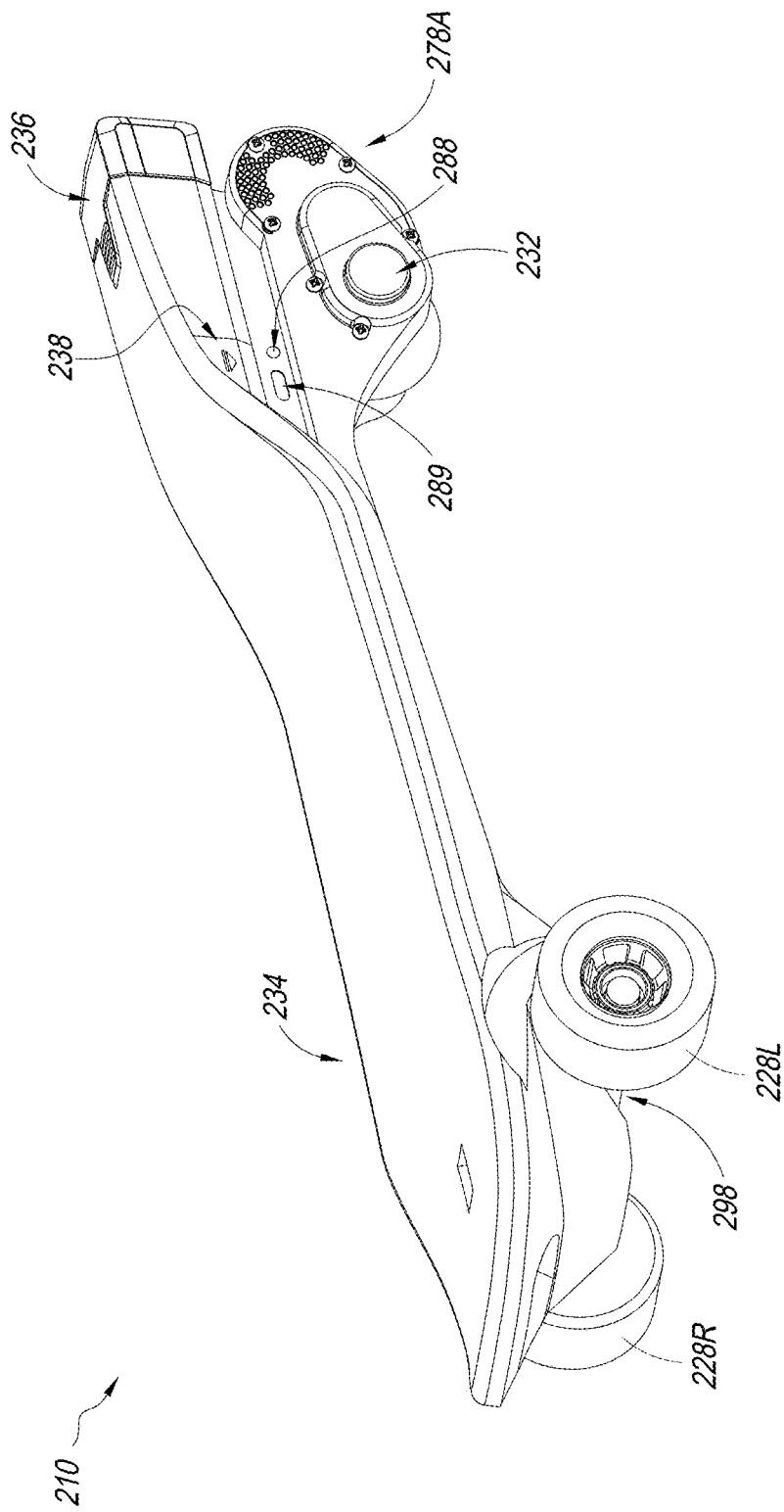
Figure 37:
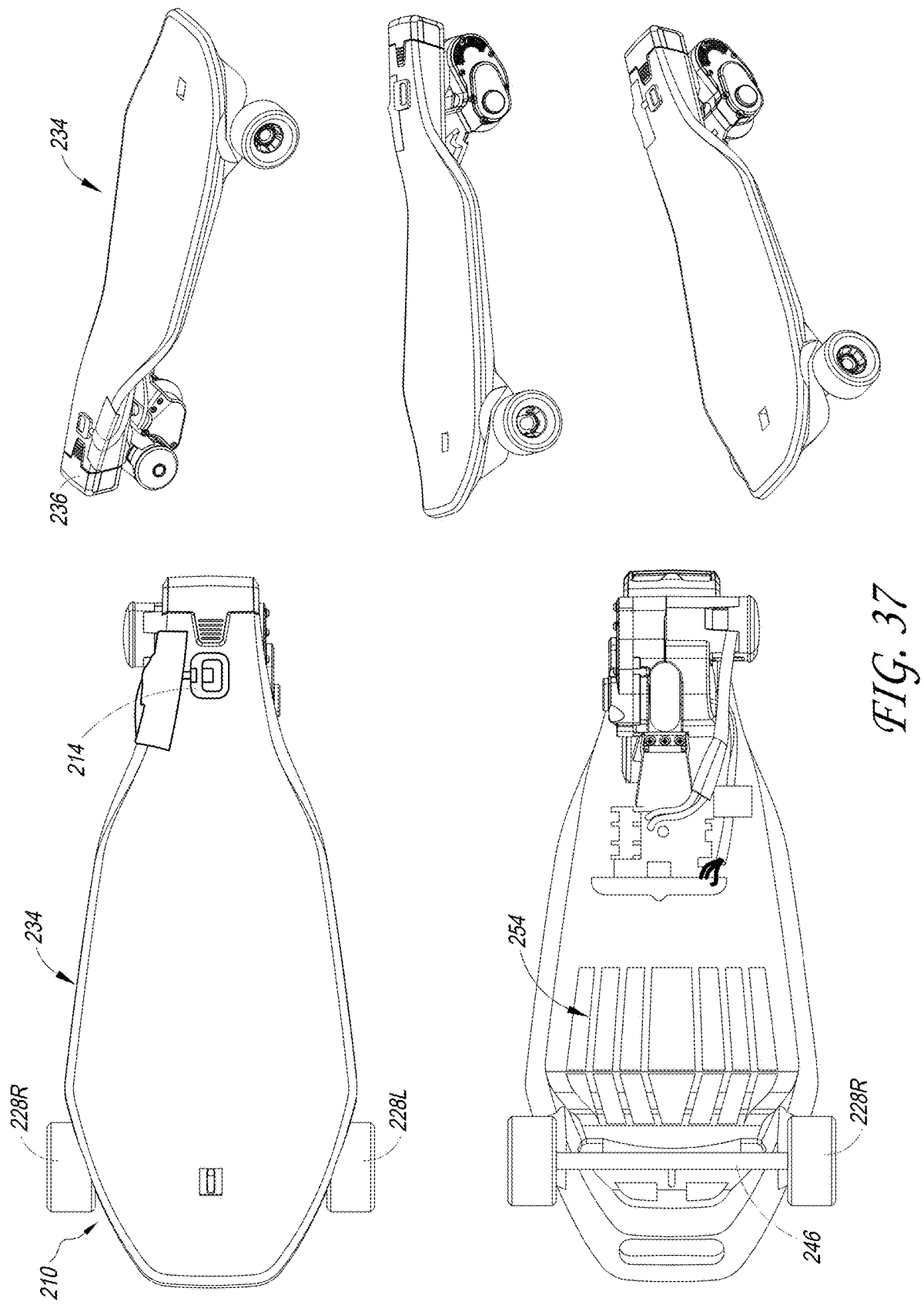
FIG. 37 depicts top, bottom, and various perspective views of the wheeled board of FIG. 23.
Figure 38:
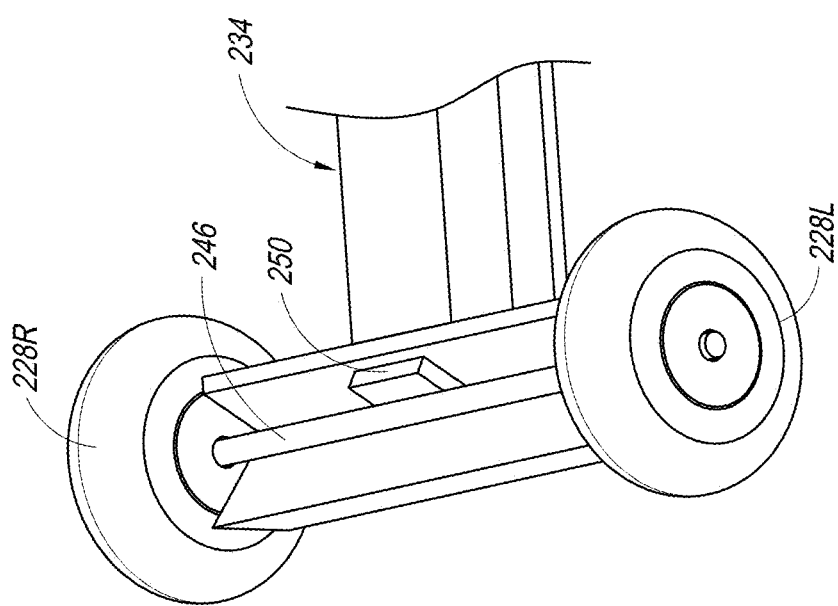
FIG. 38 is a perspective view of an embodiment of a steering system that can be used with the wheeled board of FIG. 23.

The support surface 234 can be configured to support a user, such as a rider. The shape of the support surface 234 can be oval, rectangular, or any other suitable shape. As previously discussed, in some embodiments, the width of the support surface 234 is substantially constant along the longitudinal axis of the board 210. In some embodiments, the width of the support surface 234 varies at different points along the longitudinal axis of the board 210. For example, in some embodiments, the support surface 234 is wider near the forward portion of the board 210 than it is near the rearward portion of the board 210. In some embodiments, a portion of the support surface 234 contacts a portion of the top surface of the battery 236. In some embodiments, as shown in FIG. 37, the top surface of the battery 236 can be substantially level with the support surface 234 when the drive assembly 244 is engaged with the body 220 of the board 210. In some embodiments, the support surface 234 extends above at least a portion of the rear wheel 222 of the vehicle 210 when the drive assembly 244 is secured to the body 220 and/or support surface 234. In some embodiments, the height of the support surface 234 of the board 210 varies over the length of the board 210. For example, as shown in FIG. 27, in some embodiments, the forward portion of the support surface is lower than the rearward portion of the support surface. In some embodiments, the support surface 234 is lower near the front wheels 228L, 228R and higher near the rear wheel 222.

Figure 33:
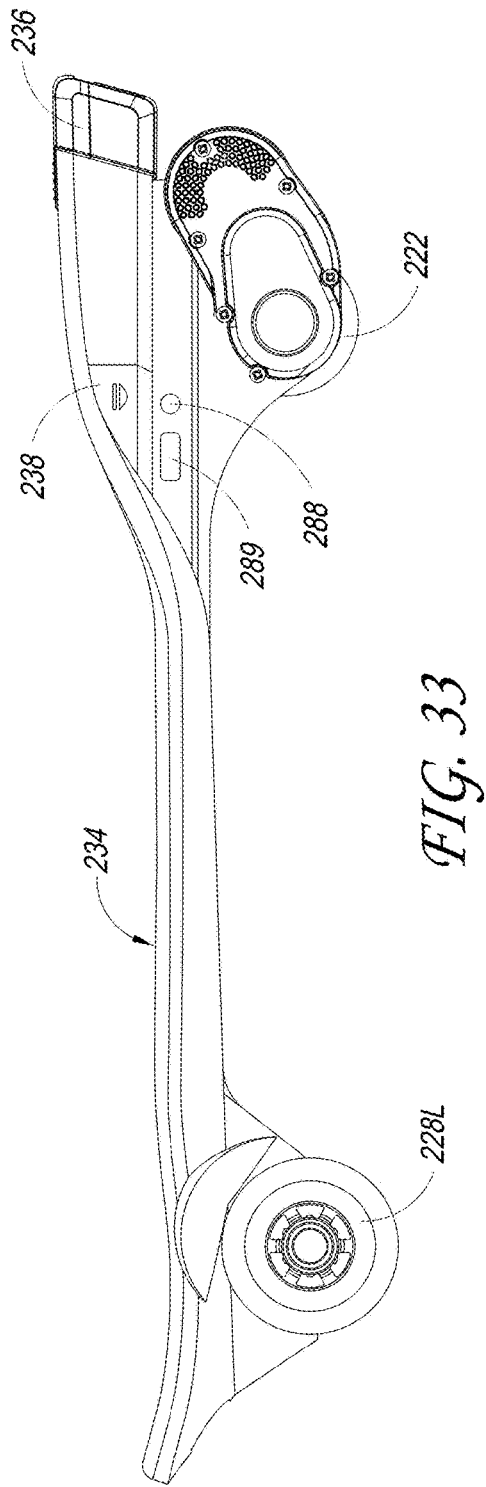
FIG. 33 is a left side view of the wheeled board of FIG. 23 with a drive assembly attached.
Figure 34:
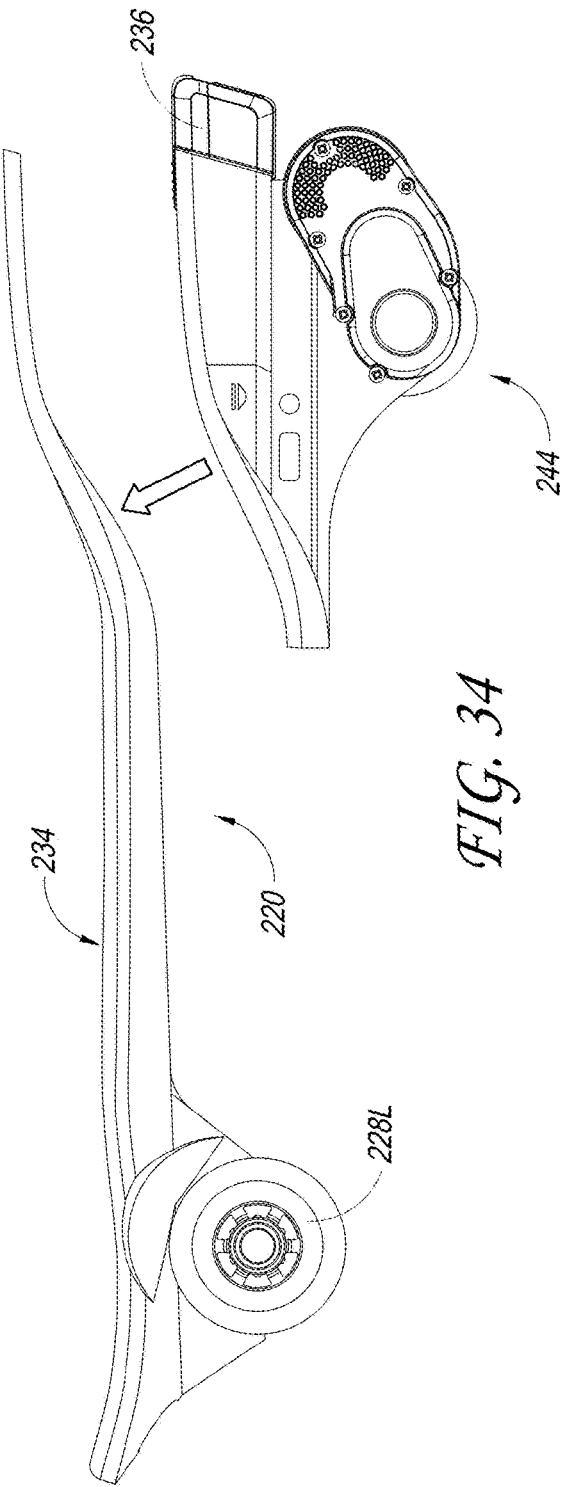
FIG. 34 is a left side view of the wheeled board of FIG. 23 with a drive assembly detached and in the course of being attached.
Figure 36:
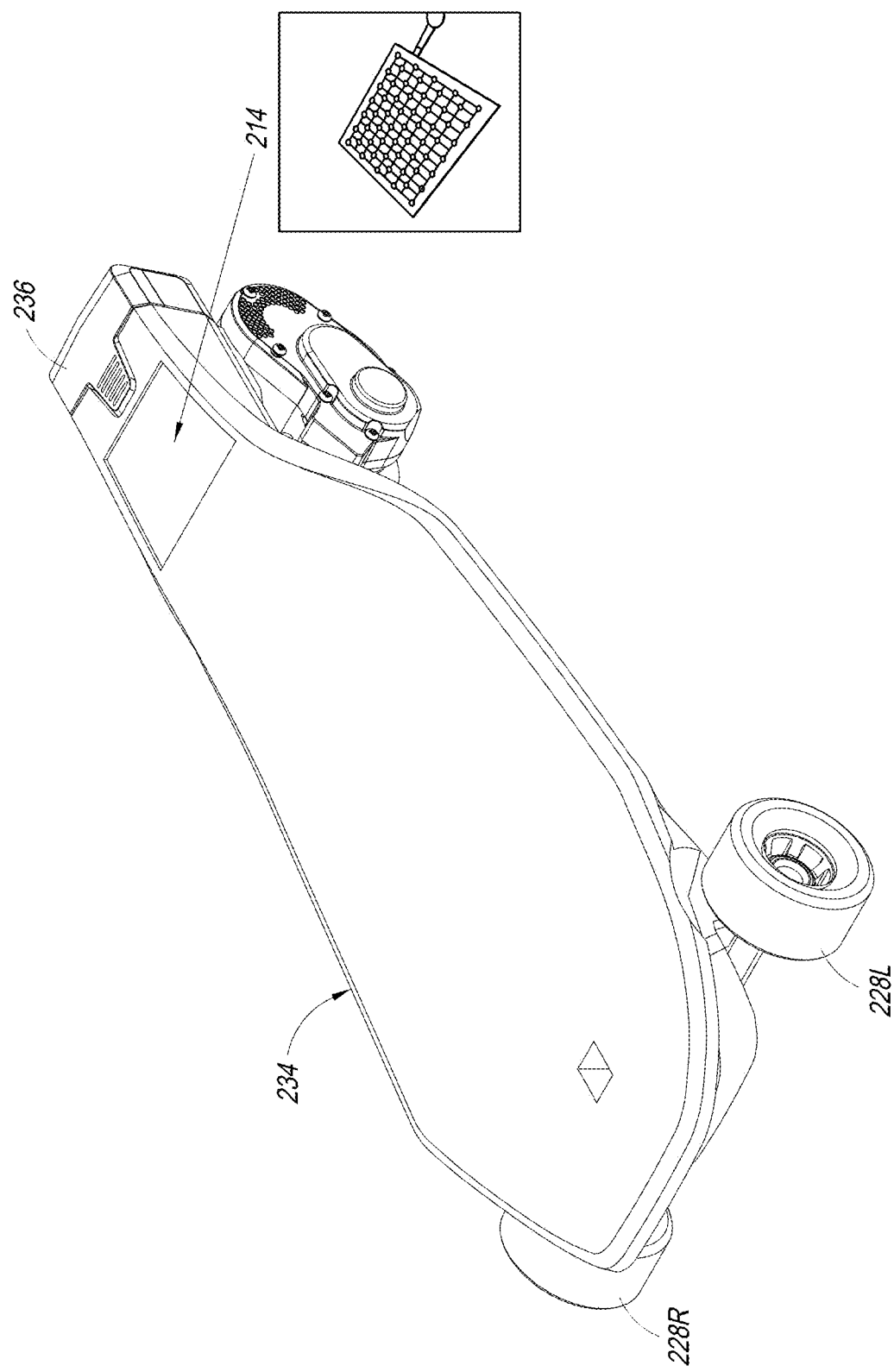
FIG. 36 is a perspective view of the wheeled board of FIG. 23.

As previously discussed, in some embodiments, the board 210 can include a charging port 288 and/or a power switch 289. In some embodiments, the charging port 288 and power switch 289 are positioned on the same portion of the vehicle 210. In some embodiments, the charging port 288 and power switch 289 are positioned on different portions of the vehicle 210. The charging port 288 and power switch 289 may each be positioned on the support surface 234, the body 220, and/or the drive assembly 244. For example, as illustrated in FIG. 33, in some embodiments, the charging port 288 and power switch 289 can be located on a lateral side of the drive assembly 244, beneath the support surface 234 and locking mechanism 238.

Figure 26:
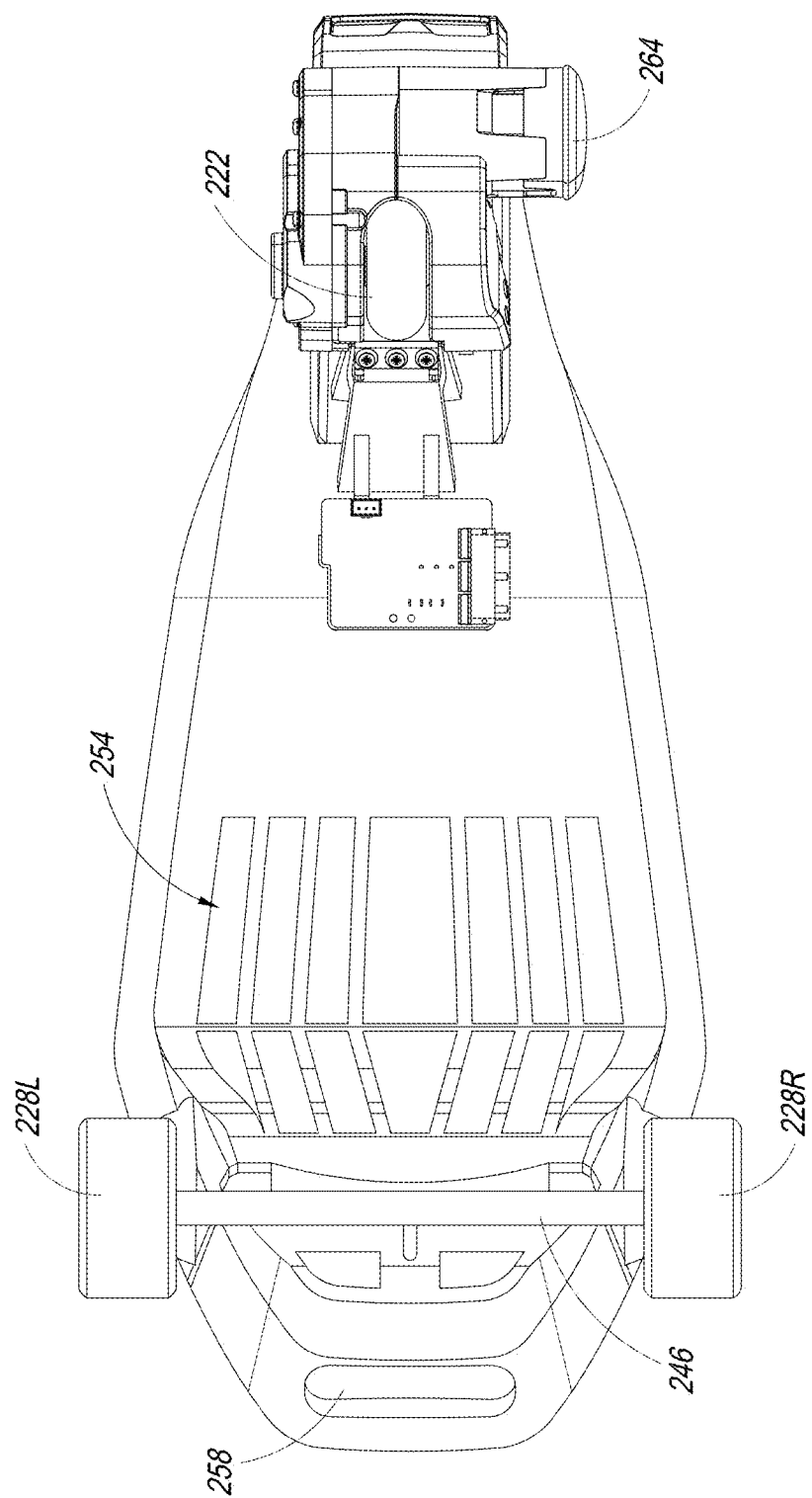
FIG. 26 is a bottom view of the wheeled board of FIG. 23.

As shown in FIG. 26, in some embodiments, the vehicle 210 may have one or more handles 258 attached to or formed therein. Such handles 258 can aid the user in transporting or riding the vehicle 210, performing maneuvers, and/or can be used to attach pulling cords and the like. In some embodiments, the forward end or front end of the device has the handle 258. In certain variants, the rear of the vehicle 210 may have the handle 258. In some embodiments, the handle 258 comprises a recess in a top and/or bottom surface of the body 220. In some embodiments, the handle 258 includes a hole (e.g., a through hole) in the support surface 234 or the body 220.

In some embodiments, the body 220 includes a recessed portion 254. The recessed portion 254 can be located on any suitable portion of the body 220. For example, in some embodiments, the recessed portion 254 is formed on the underside of the body 220, such as beneath the support surface 234. The recessed portion 254 can be configured to provide rigidity and/or strength to the board 210. In some embodiments, the recessed portion 254 includes rigidity members to enhance the strength of the board 210.

Figure 24:
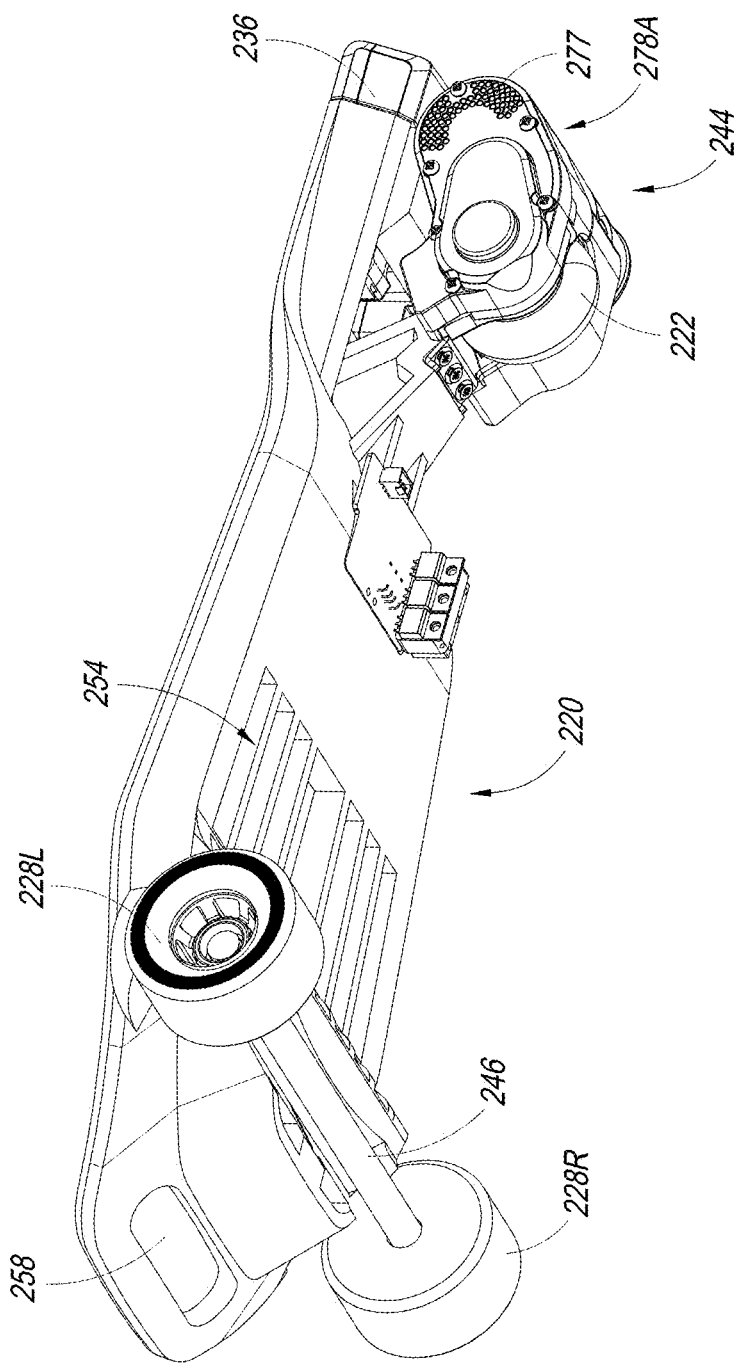
FIG. 24 is a bottom perspective view of the wheeled board of FIG. 23.
Figure 25:
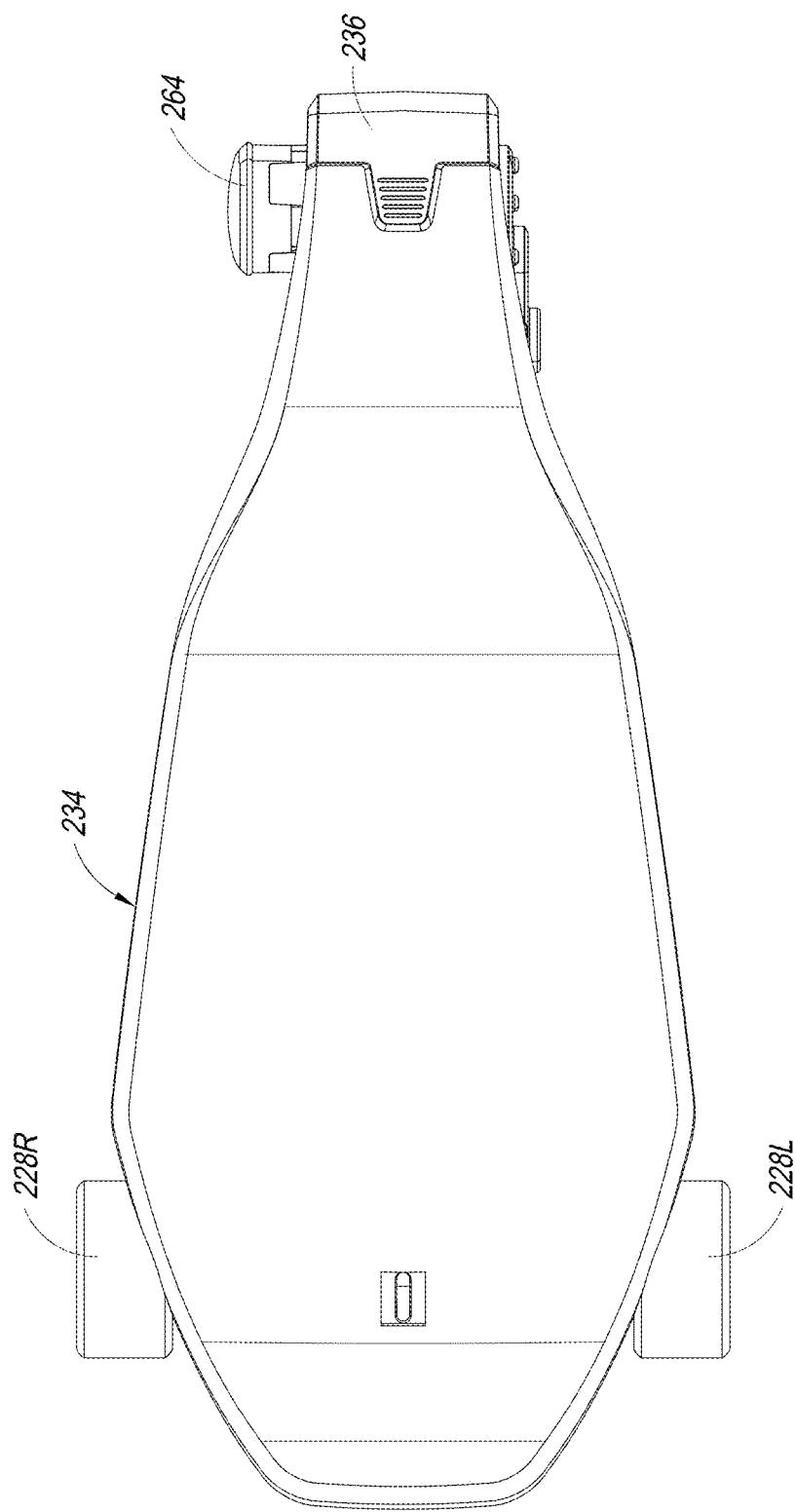
FIG. 25 is a top view of the wheeled board of FIG. 23.

In some embodiments, the vehicle 210 has a steering system 298. The steering system 298 can include an axle 246. In some embodiments, as illustrated in FIGS. 24 and 26, the axle 246 is located towards the front end of the board 210. In some embodiments, the board 210 can include a similar axle and steering system towards the rear end of the board 210. The axle 246 can connect to the wheels 228R, 228L.

As illustrated, the steering system 298 can include an axle bearing surface 248 and/or a pivot member 250. In several embodiments, the axle 246 slides and/or rotates within the surface 248 and/or about the pivot member 250. This enables the axle 246 to change direction thus allowing steering of the board 210. In various embodiments, the axle bearing surface 248 comprises a channel or recess in the bottom surface, such as in the board 210. The channel can be generally v-shaped, u-shaped, or any other suitable shape. The axle bearing surface 248 can receive the axle 246 and can guide and/or retain the axle 246 to facilitate turning the board 210. The axle 246 can move relative to and within the axle bearing surface 248. In some embodiments, the axle bearing surface 248 can be positioned at an angle to the pivot member 250. In some embodiments, the axle bearing surface 248 can be monoplanar, or multiplanar, or curved. In some embodiments, the axle bearing surface 248 can extend substantially from one end of the axle 246 to the other or from one wheel to the other.

In some embodiments, the axle bearing surface 248 can be removable, such as for replacement due to wear or to change the turning characteristics of the vehicle, or for some other reasons including cosmetic. In some embodiments, the pivot member or its contact surface with the axle 246 can be removable. Different shapes, as well as various materials and material hardness and/or resilience, can be utilized for the bearing surface and the pivot member and pivot member surface, as desired such as for different turning or performance characteristics.

The pivot member 250 can have a narrow contact region for contacting the axle 246 such as with a triangular cross-section, or some other shape that presents a narrow or sharp surface to the axle. Suitable other shapes include those having a cross-section related to or including a square, rectangle, pentagon, teardrop, round or other shape. The narrow or sharp surface can also be truncated. In some embodiments, the pivot member 250 can be a protruding portion from another part, such as a support surface, a body, or another part.

In some embodiments, the pivot member 250 provides a substantially single pivot axis. In some variants, the pivot member 250 comprises an extended pivot member 250. The extended pivot member 250 can be shaped so that the point or area of contact between the axle 246 and the pivot member 250 shifts towards the inside of the turn when the board 210 is tilted, such as by a user laterally shifting his or her weight on the board 210.

Figure 40:
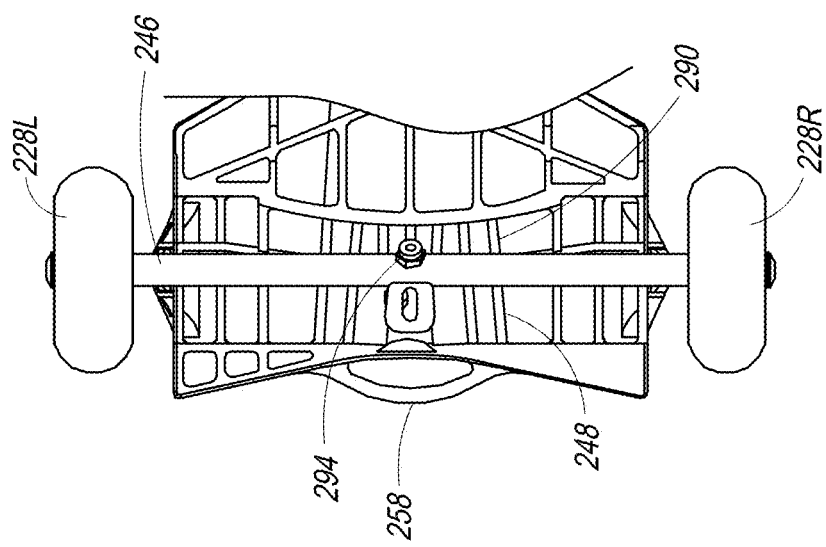
FIG. 40 is a bottom view of the steering system of FIG. 38.

A curved version of the extended pivot member 290 is depicted in FIG. 40. In some embodiments, the curved extended pivot member 290 and the axle bearing surface 248 can be separated somewhat, such as with a gap or an intervening material, wherein the intervening material is flush, protrudes out, or is recessed from the surface of the pivot member 290 and/or the axle bearing surface 248.

Figure 42:
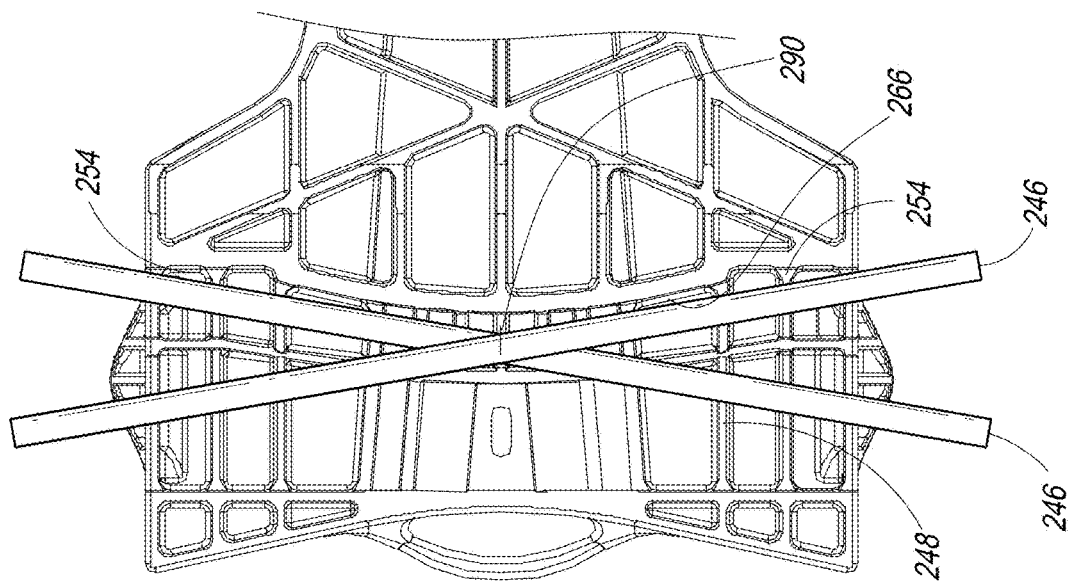
FIG. 42 is a bottom view of the steering system of FIG. 38 with an axle in different positions.
Figure 44:
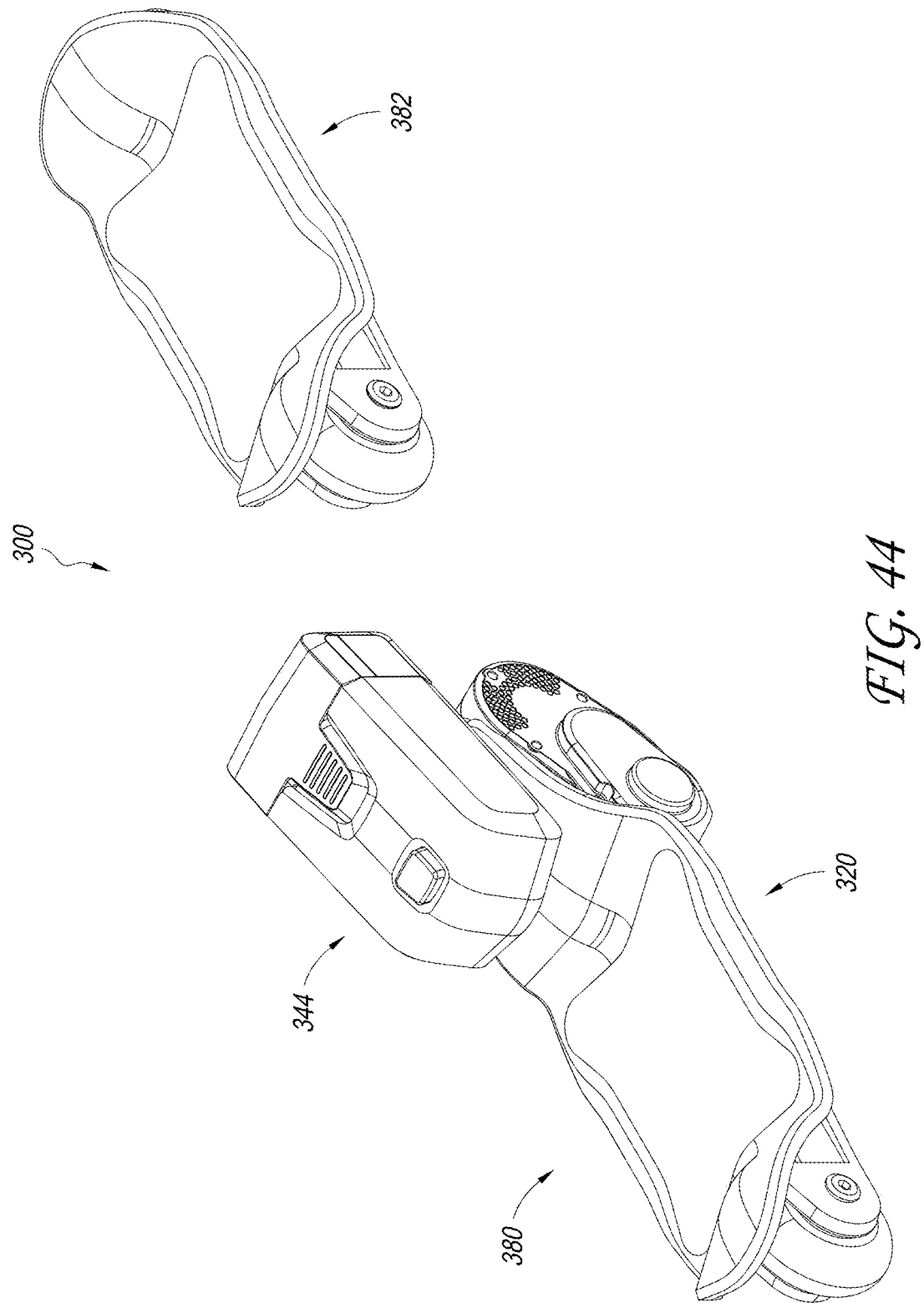
FIG. 44 is a perspective view of the wheeled skates of FIG. 43.

In operation, when the rider leans or otherwise causes a turn, the support surface 234 will tip, with one edge of the support surface 234 moving toward the axle 246, and the other edge moving away from the axle 246. As the support surface 234 tips, the axle 246 shifts its contact zone with the pivot member 290 to a new zone closer to the edge of the support surface 234 on the side where the edge of the support surface 234 moved toward the axle, as shown in FIG. 42. This axle movement results in the axle 246 pivoting with a component of the pivoting in a plane substantially parallel to plane of the travel surface or the top of the support surface 234, with the wheel 228R or 228L at one end of the axle moving forward and the wheel 228L or 228R on the other end of the axle moving rearward, in relation to the direction of travel, causing a turning effect. Depending on the location and orientation of the axle bearing surface 248 and the pivot member 290, the direction and magnitude of the turning effect can be varied, such as to be more sensitive, less sensitive, to turn in the direction of leaning or compression of the support surface 234 toward the axle 246 or away from the direction of leaning or compression of the support surface 234 toward the axle 246. When the rider shifts position to move in a different direction, the contact zone of the axle 246 with the pivot member will shift as well, with the axle 246 contacting different points along the pivot member related to the curved line interface of the pivot member and the axle bearing surface.

In some embodiments, the pivot member can be a pin or a rod. In some embodiments, the axle 246 can include a covering over at least a portion of its surface, and the pivot member can contact the exterior or interior of the covering portion of the axle 246. The pivot member can be a pin protruding from the center of the axle 246 at a right angle or another angle to the axle 246, said pin can protrude into a hole or cavity formed in a middle portion of the inclined axle bearing surface. In some embodiments, more than one pin can be utilized.

Figure 39:
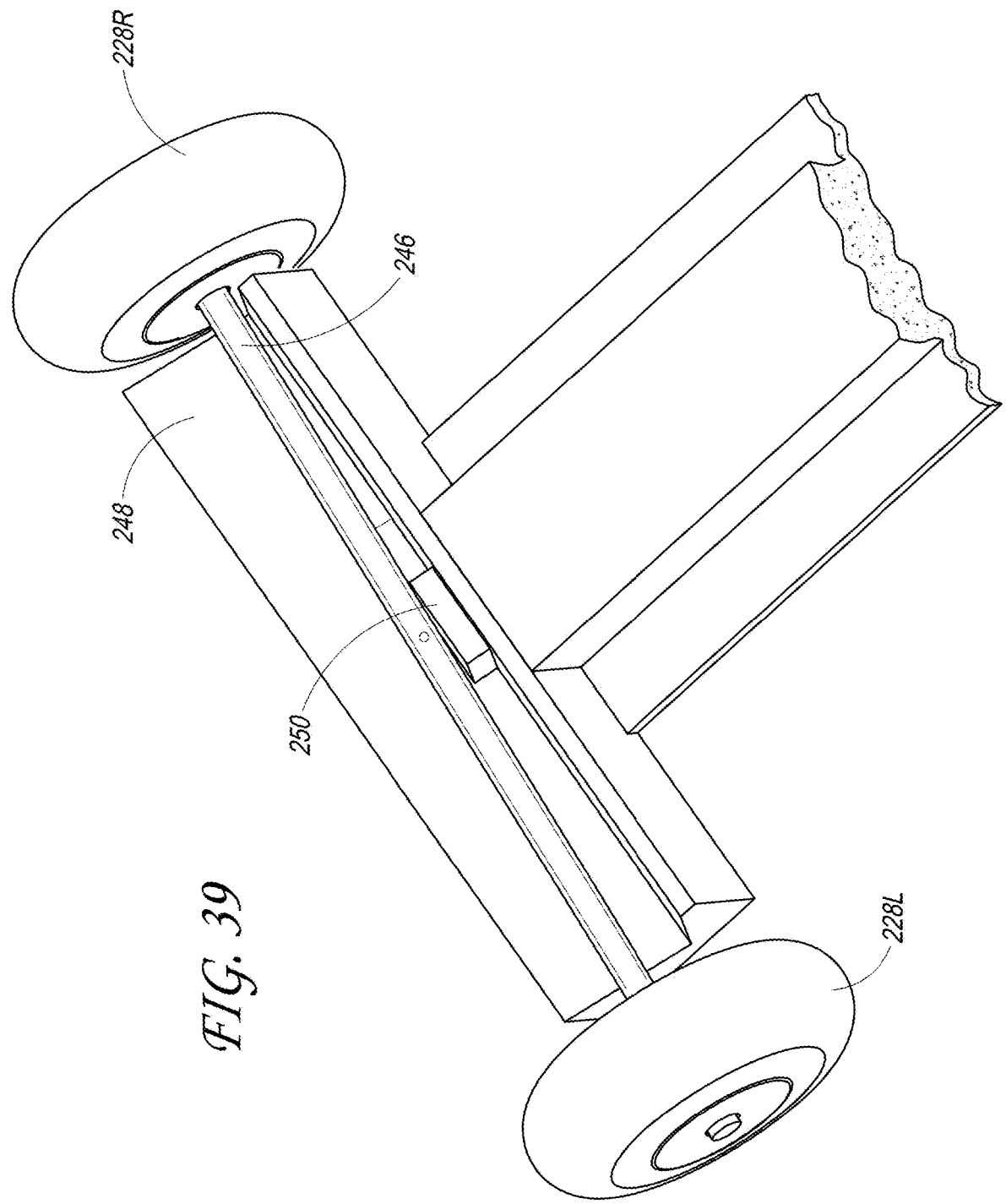
FIG. 39 is another perspective view of the steering system of FIG. 38.

For simplicity, a simple rectangular extended pivot member 250 is shown in FIG. 39, but this block could be rounded off, as long as pivoting of the axle 246 away from its position perpendicular to the long axis of the conveyance produces a shift in the central portion of the support surface 234 away from the axle 246. A suitable curved extended pivot member 290 is depicted in FIG. 40. In some embodiments, an extended pivot member can be attached to the axle 246 instead of molding it as part of, or fixing it rigidly to, a stationary part such as a portion of the support surface or the spring bearing surface.

Figure 41:
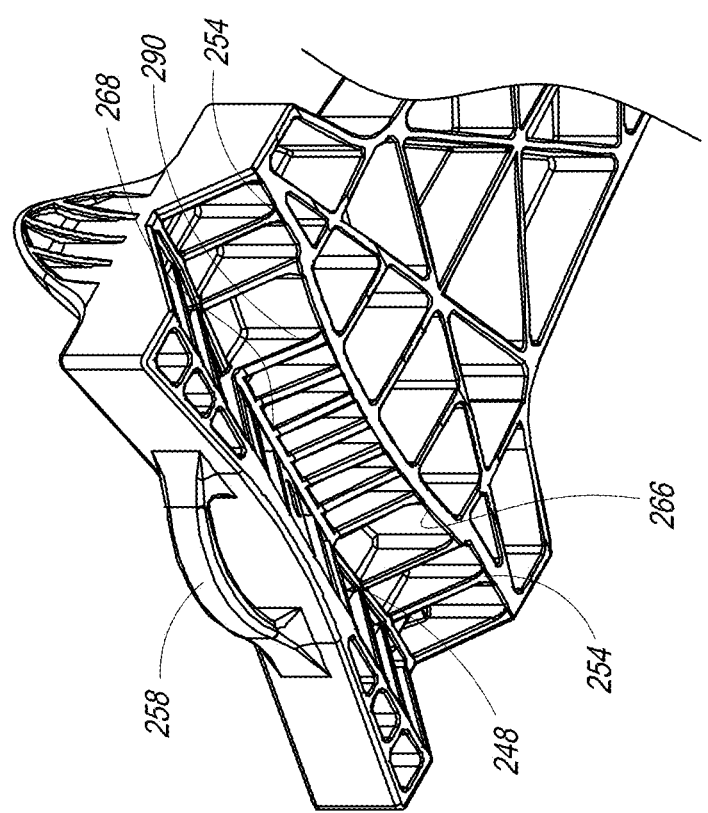
FIG. 41 is a bottom perspective view of the steering system of FIG. 38.

In some embodiments, the bearing surface can be a continuous or a discontinuous surface. Suitable discontinuous surfaces include those made up of a number of separated surfaces or surfaces interconnected with a different material or a recessed material. Individual surfaces can be made of like or unlike materials. Individual surfaces can be flat, curved, circular, rectangular, regular, a regular, interlocking, non-interlocking, or any other suitable shape as desired. In some embodiments, the surface of the pivot member can be a continuous or discontinuous surface. In some embodiments, a continuous bearing surface can be utilized with a pivot member having a discontinuous surface, or a discontinuous bearing surface can be utilized with a pivot member having a continuous surface, or both the bearing surface and the surface of the pivot member can be either continuous or discontinuous. In some embodiments, the pivot member or the bearing surface can be made up of a series of individual parts, such as in the form of ridges protruding from a support material or a separate part. Examples of discontinuous faces on the axle bearing surface and the pivot member surface are shown in FIGS. 40-42. In FIG. 41, for example, the axle bearing surfaces and pivot members surfaces are formed by an opened cell network performed by a plurality of struts, which are chosen of a spacing and thickness of material sufficient to withstand relevant forces from the axle.

In some embodiments, the pivot member can be disposed at an angle to the bearing surface, such as where the bearing surface and the surface of the pivot member intersect at the vertex 268 of an angle, as shown in FIG. 41.

The axle 246, can be prevented from sliding side to side relative to the longitudinal axis of the support surface 234. This may be accomplished in various ways. In one embodiment, a cylindrical pin is welded to the axle 246 or screwed into a cavity in the axle such that the central axis of the cylindrical pin passes through a central area of the axle. Said pin protrudes from the axle, and fits in a hole formed in a corresponding portion of the inclined axle bearing surface 248. In some embodiments, the pin can function as a pivot member. In some embodiments, the axle 246 can be positioned by two disks fastened at a fixed axial position to the axle 246 between the wheels 228L, 228R and the outermost edges of the inclined axle bearing surface 248 of the support surface 234.

In some embodiments, the axle 246 can be a solid or unitary cylinder. In some embodiments, the axle 246 can be non-solid, multi-piece, or a shape other than a cylinder. The axle 246 can have any other cross-sectional shape, including square, rectangular, variable, etc., and the axle 246 can be hollow, multi-part, a single piece, etc. In some embodiments, the axle 246 can have one or more holes, cavities, indentations, extensions, protrusions or other shape features, such as for receiving a spring, a pin, an axle retention device, etc. or for other purposes, such as to contact a bearing surface or a pivot member. In some embodiments, a second material, such as a polymer or aluminum composition can be molded over the axle to form an axle block in the region between the wheels 228R, 228L. Alternatively, the axle block may be a formed from a single material, with cylindrical axle segments formed from a second material or the same material protruding from either end. In either case, the axle block could include a flat plane to sit flush on the inclined axle bearing surface 248, or another shaped surface that can interface with a similar or matched surface of the axle bearing surface 248, which in some embodiments can reduce wear on these surfaces. In some embodiments, various features needed to retain the axle 646 and wheels laterally and vertically could be readily molded into the axle block. For example, a central locating pin transverse to the axle, or locating washers may be molded as part of the axle block.

FIGS. 43-46

FIGS. 43-46 illustrate another embodiment of a powered personal mobility vehicle, such as a pair of wheeled skates 300. The pair of wheeled skates 300 can include a powered skate 380 and a non-powered skate 382. The pair of wheeled skates 300 can include features of the vehicles 10, 210, 410. The wheeled skates can include any of the features of the powered mobility systems described in U.S. Patent Application Publication No. 2018/0015355, which is incorporated by reference herein in its entirety.

Figure 45:
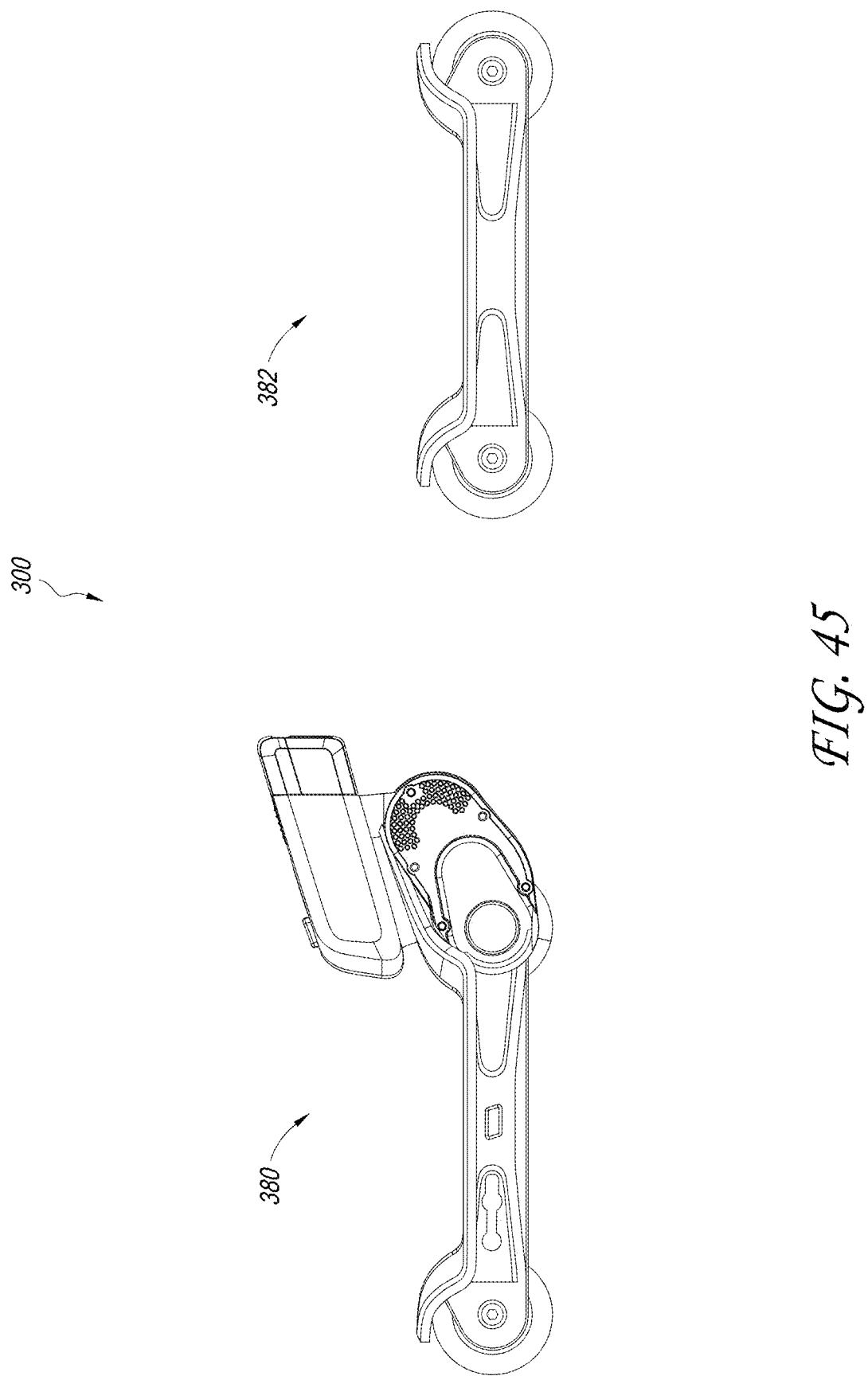
FIG. 45 is a side view of the wheeled skates of FIG. 43.

As illustrated in FIG. 43, the pair of wheeled skates 300 can be configured to be ridden sideways, such as in a direction of travel that is generally perpendicular to the longitudinal axis of the user's foot. In some variants, each of the powered skate 380 and the non-powered skate 382 can include a first wheel on a first end of the skate and a second wheel on a second end of the skate opposite the first end. The first and second wheels of the skate 380, 382 can be spaced apart such that, in use, the first wheel is disposed on one lateral side of the user's foot and the second wheel is disposed on the other lateral side of said foot. The longitudinal axis of the skate 380, 382 and the longitudinal axis of the skate's wheels can be parallel. The longitudinal axis of the skate 380, 382 and/or the longitudinal axis of the skate's wheels can be generally perpendicular to the longitudinal axis of the user's foot. In some variants, as illustrated in FIG. 45, each wheel can have an axis of rotation that is not disposed beneath a footbed portion of the skate 380, 382, which can advantageously allow for a low profile skate and/or low center of gravity. For example, the axis of rotation of each wheel can be disposed to a lateral side of the footbed portion of the skate 380, 382. In some embodiments, a portion of one or each wheel can extend above the footbed portion of the skate 380, 382 (e.g., the portion intended to receive a user's foot).

In some embodiments, the powered skate 380 is the leading skate and the non-powered skate 382 is the trailing skate. In certain implementations, the non-powered skate 382 is the leading skate and the powered skate 380 is the trailing skate.

Figure 46:
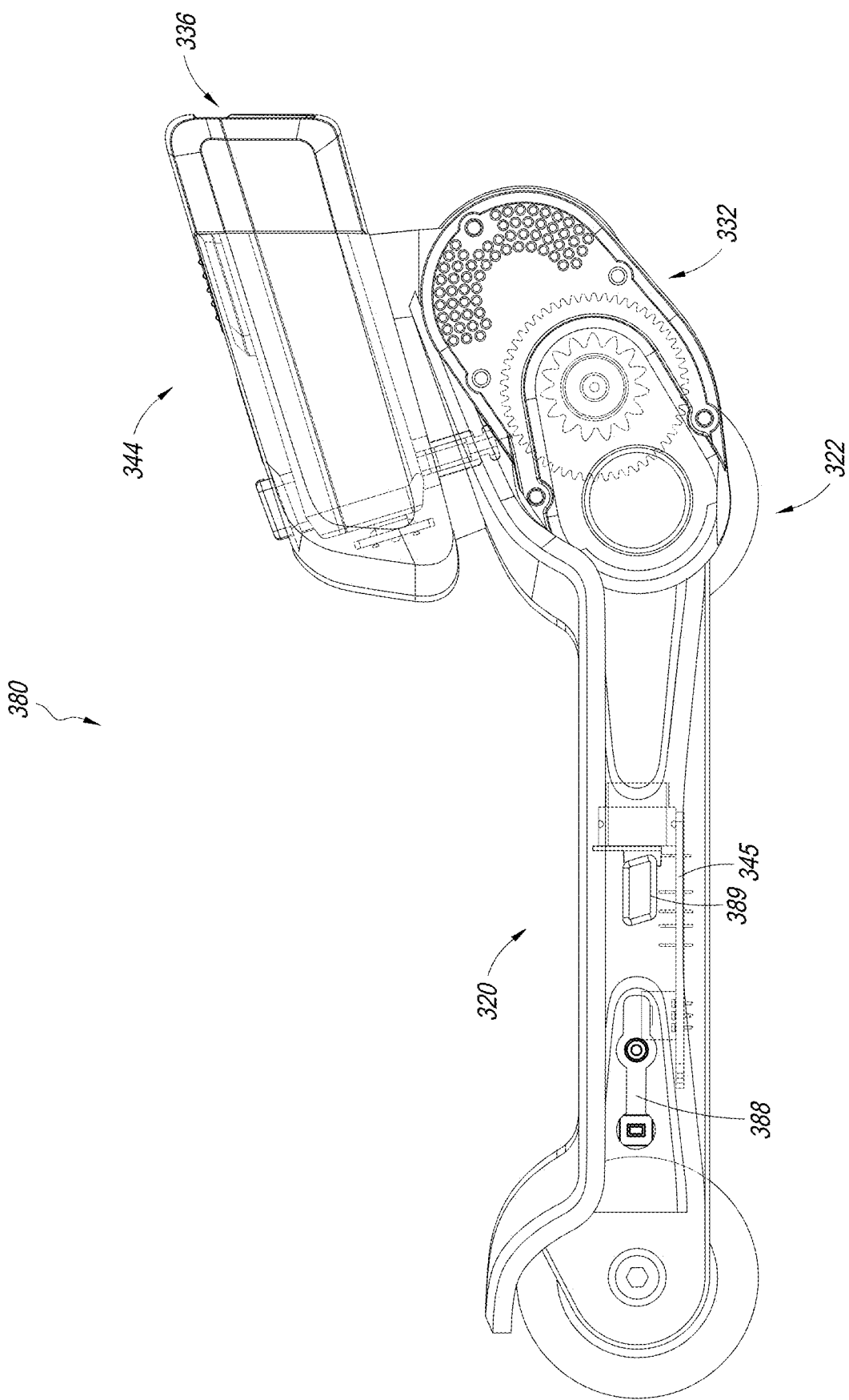
FIG. 46 is a side view of a powered skate of the wheeled skates of FIG. 43, in which a portion is shown as semi-transparent for purposes of presentation.

As shown in FIG. 46, the powered skate 380 can include a drive assembly 344. In some embodiments, the drive assembly 344 is detachable from a body 320 of the skate 380. The body 320 can include a support surface, such as a footbed. In some embodiments, the drive assembly 344 can include a motor 332 and a power supply, such as a battery 336. In some embodiments, the battery 336 is detachable from the drive assembly 344. The drive assembly 344 can include a transmission, such as one or more gears that functionally couple the motor 332 and a drive wheel 322. The drive wheel 322 can be positioned on a rear or a front of the skate 380. As shown, the powered skate 380 can include a controller 345, charging port 388, and/or a power switch 389. In some implementations, the powered skate 380 includes a wired or wireless control actuator (e.g., a lever) that communicates with the controller 345 to control the motor 332.

In various embodiments, the powered skate 380 includes a sensor 314. The sensor 314 can be configured to receive input from the user and to communicate with the controller 345 to provide operational control of the skate 380. For example, in some embodiments, the sensor 314 senses the pressure of a user's foot on the body 320, which can be used to enable driving of the skate 380. In some embodiments, the sensor 314 comprises a cut-off switch. In some embodiments, the sensor 314 detects an amount of pressure being applied by the user to the body 320. In certain implementations, in response to the signal from the sensor 314, the controller 345 modulates the speed at which the motor 332 is driving the wheel 322.

Certain Terminology

Certain terminology may be used in the description for the purpose of reference only, and thus is not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes, or tends toward, a particular value, amount, or characteristic. For example, as the context may dictate, the term "generally parallel" can mean something that departs from exactly parallel by less than or equal to 15°.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

SUMMARY

Various powered mobility systems and vehicles have been disclosed in the context of certain embodiments and examples above. However, this disclosure extends beyond the specifically disclosed embodiments to other alternative embodiments and/or uses and obvious modifications and equivalents thereof. In particular, while the powered mobility systems have been described in the context of illustrative embodiments, certain advantages, features, and aspects of the powered mobility systems may be realized in a variety of other applications. Various features and aspects of the disclosed embodiments can be combined with or substituted for one another in order to form varying modes of the improvements. The scope of this disclosure should not be limited by the particular disclosed embodiments described herein.

Additionally, various aspects and features of the embodiments described can be practiced separately, combined together, or substituted for one another. A variety of combination and subcombinations of the disclosed features and aspects can be made and still fall within the scope of this disclosure. Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Some embodiments have been described in connection with the accompanying drawings. The figures are drawn to scale, but such scale should not be interpreted as limiting, since dimensions and proportions other than what are shown are contemplated and are within the scope of this disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of powered mobility systems and vehicles have been disclosed. Although the improvements have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular embodiments described above, but should be determined only by a fair reading of the claims that follow.

The following is claimed:

1. A personal mobility vehicle comprising:
   a body having a support surface and being configured to support a user;
   a plurality of wheels comprising a driving wheel and a front wheel;
   a drive assembly configured to be selectively detached from the body, the drive assembly comprising:
     a motor and a drive shaft;
     a power supply housing;
     a transmission assembly comprising a gear transmission, the gear transmission comprising at least a driving gear connected to the drive shaft and a driven gear configured to spin the driving wheel; and
     a power supply configured to power the drive assembly and to cause the motor to spin the driving wheel; and
   a pressure sensor configured to detect pressure from the user supported by the body of the personal mobility vehicle.

2. The personal mobility vehicle of claim 1, wherein the power supply is configured to be selectively removed from the power supply housing.

3. The personal mobility vehicle of claim 1, further comprising a second front wheel.

4. The personal mobility vehicle of claim 1, wherein the drive assembly comprises the driving wheel.

5. The personal mobility vehicle of claim 1, wherein the pressure sensor is in functional communication with a controller, the pressure sensor configured to cause the controller to detect shifts of the user's weight and to change a speed of the motor.

6. The personal mobility vehicle of claim 1, wherein the body comprises a channel configured to slidably receive a portion of the drive assembly.

7. The personal mobility vehicle of claim 1, wherein the drive assembly comprises at least one actuator configured to disengage a locking mechanism securing the drive assembly with the body.

8. The personal mobility vehicle of claim 1, further comprising a braking mechanism extending rearwardly from the body and over at least a portion of the driving wheel.

9. The personal mobility vehicle of claim 8, wherein the drive assembly comprises the braking mechanism.

10. The personal mobility vehicle of claim 1, wherein the personal mobility vehicle is a wheeled board, the wheeled board having a steering system comprising an axle, an axle bearing surface, and a pivot member.

11. A drive assembly configured for use in a personal mobility vehicle, the drive assembly comprising:
    a driving wheel;
    a power supply housing;
    a motor and a drive shaft;
    a transmission assembly comprising a gear transmission, the gear transmission comprising at least a driving gear connected to the drive shaft and a driven gear configured to spin the driving wheel;
    a power supply configured to power the drive assembly and to cause the motor to spin the driving wheel, wherein the motor is configured to communicate with a controller of the personal mobility vehicle, the controller configured to receive signals from a pressure sensor on the personal mobility vehicle; and
    a locking mechanism configured to selectively secure the power supply to the personal mobility vehicle.

12. The drive assembly of claim 11, wherein the power supply is configured to be selectively removed from the power supply housing.

13. The drive assembly of claim 11, further comprising a braking mechanism extending over at least a portion of the driving wheel.

14. The drive assembly of claim 11, further comprising at least one actuator configured to disengage the locking mechanism.

15. The drive assembly of claim 11, wherein the motor is configured to be controlled by the controller of the personal mobility vehicle based at least in part on signals from the pressure sensor on the personal mobility vehicle.

16. A personal mobility system comprising:
    a powered skate comprising:
      a body comprising a first foot support surface;
      a first wheel on a first end of the powered skate and a second wheel on a second end of the powered skate opposite the first end, one of the first and second wheels being a driving wheel; and
      a drive assembly, comprising:
        a power supply housing;
        a motor and a drive shaft;
        a transmission assembly comprising a gear transmission, the gear transmission comprising at least a driving gear connected to the drive shaft and a driven gear configured to spin the driving wheel; and
        a power supply configured to power the drive assembly and to cause the motor to spin the driving wheel, the power supply configured to be selectively removed from the power supply housing; and
    a non-powered skate comprising:
      a body comprising a second foot support surface;
      a first wheel on a first end of the non-powered skate and a second wheel on a second end of the non-powered skate opposite the first end; and
    wherein a direction of travel of the personal mobility vehicle is generally perpendicular to a longitudinal axis of a user's foot.

17. The personal mobility system of claim 16, wherein the drive assembly comprises the driving wheel.

18. The personal mobility system of claim 16, wherein the drive assembly is configured to be selectively detached from the body of the powered skate.

19. The personal mobility system of claim 16, wherein each wheel of the powered skate has an axis of rotation disposed to a lateral side of the first foot support surface and each wheel of the non-powered skate has an axis of rotation disposed to a lateral side of the second foot support surface.

20. The personal mobility system of claim 16, wherein the powered skate is a leading skate and the non-powered skate is a trailing skate.

21. The personal mobility vehicle of claim 1, wherein the controller is configured to inhibit operation of the motor unless the pressure sensor detects pressure from a user supported by the body of the personal mobility vehicle.

22. A personal mobility vehicle comprising:
 a body having a support surface and being configured to support a user;
 a plurality of wheels comprising a driving wheel and a front wheel;
 a drive assembly comprising:
  a motor and a drive shaft;
  a power supply housing positioned above the driving wheel;
  a power supply configured to be received in the power supply housing and to provide electric power to the motor to cause the motor to spin the driving wheel, the power supply being removable from the power supply housing; and
 a pressure sensor configured to transmit a signal indicative of the user being supported on the body; and
 a controller configured to energize the motor at least partly in response to receipt of the signal.

23. The personal mobility vehicle of claim 22, wherein the power supply is configured to be removed in a rearward direction away from the front wheel.

24. The personal mobility vehicle of claim 22, wherein at least a portion of the support surface is positioned rearward of the front wheel and forward of the power supply when the power supply is received within the housing.

25. The personal mobility vehicle of claim 22, wherein at least a portion of the power supply is located over the motor when the power supply is received within the housing.

26. The personal mobility vehicle of claim 25, wherein at least a portion of the power supply is positioned over the driving wheel when the power supply is received within the housing.

27. The personal mobility vehicle of claim 22, further comprising a locking mechanism configured to retain the power supply in place relative to the power supply housing, and at least one actuator configured to disengage the locking mechanism.

\* \* \* \* \*